US 12,124,103 B2

(12) United States Patent
Karam et al.

(10) Patent No.: US 12,124,103 B2
(45) Date of Patent: Oct. 22, 2024

(54) LIQUID LENS

(71) Applicants: CORNING INCORPORATED, Corning, NY (US); LG INNOTEK CO., LTD, Gangseo-gu (KR)

(72) Inventors: Raymond Miller Karam, Santa Barbara, CA (US); Daniel Ohen Ricketts, Corning, NY (US); Ming Ying, Santa Barbara, CA (US)

(73) Assignees: CORNING INCORPORATED, Corning, NY (US); LG INNOTEK CO. LTD., Gangseo-gu (KR)

( * ) Notice: Subject to any disclaimer, the term of this patent is extended or adjusted under 35 U.S.C. 154(b) by 813 days.

(21) Appl. No.: 17/283,303

(22) PCT Filed: Oct. 7, 2019

(86) PCT No.: PCT/US2019/054976
§ 371 (c)(1),
(2) Date: Apr. 7, 2021

(87) PCT Pub. No.: WO2020/076686
PCT Pub. Date: Apr. 16, 2020

(65) Prior Publication Data
US 2021/0389547 A1    Dec. 16, 2021

Related U.S. Application Data

(60) Provisional application No. 62/767,625, filed on Nov. 15, 2018, provisional application No. 62/743,500, filed on Oct. 9, 2018.

(51) Int. Cl.
*G02B 7/02* (2021.01)
*G02B 3/14* (2006.01)
(Continued)

(52) U.S. Cl.
CPC .............. *G02B 7/028* (2013.01); *G02B 3/14* (2013.01); *G05D 23/2036* (2013.01); *H05B 3/10* (2013.01);
(Continued)

(58) Field of Classification Search
None
See application file for complete search history.

(56) References Cited

U.S. PATENT DOCUMENTS 7,359,124 B1    4/2008  Fang et al.
9,120,287 B2    9/2015  Ruben et al.
(Continued)

FOREIGN PATENT DOCUMENTS

CN    1947044 A     4/2007
CN    110244389 A   9/2019
(Continued)

OTHER PUBLICATIONS

Chinese Patent Application No. 201980081390.0, Office Action, dated Oct. 26, 2022, 16 pages, (8 pages of English Translation and 8 pages of Original Copy); Chinese Patent Office.
(Continued)

*Primary Examiner* — Rodney E Fuller
(74) *Attorney, Agent, or Firm* — Tamika A. Crawl-Bey

(57) ABSTRACT

A liquid lens system includes a liquid lens and a heating device disposed in, on, or near the liquid lens. The liquid lens system can include a temperature sensor. The heating device can be responsive to a temperature signal generated by the temperature sensor. A camera module can include the liquid lens system. A method of operating a liquid lens includes detecting a temperature of the liquid lens and heating the liquid lens in response to the detected temperature. Various embodiments disclosed herein can reduce,
(Continued)

impede, or prevent crosstalk between components of the liquid lens, or the effects thereof.

20 Claims, 38 Drawing Sheets

(51) Int. Cl.
  *G05D 23/20* (2006.01)
  *H05B 3/10* (2006.01)
  *H05B 3/84* (2006.01)
  *G02B 7/09* (2021.01)
  *G02B 26/00* (2006.01)
  *G05D 23/24* (2006.01)
  *G05D 23/26* (2006.01)
(52) U.S. Cl.
  CPC .............. *H05B 3/84* (2013.01); *G02B 7/09* (2013.01); *G02B 26/005* (2013.01); *G05D 23/24* (2013.01); *G05D 23/26* (2013.01); *H05B 2203/021* (2013.01)

(56) References Cited

U.S. PATENT DOCUMENTS

| | | | |
|---|---|---|---|
| 9,492,990 | B2 | 11/2016 | Karam et al. |
| 9,515,286 | B2 | 12/2016 | Dabich et al. |
| 2012/0268804 | A1 | 10/2012 | Hadwen |
| 2017/0315274 | A1 | 11/2017 | Park et al. |
| 2020/0003934 | A1 | 1/2020 | Karam et al. |
| 2021/0003748 | A1 | 1/2021 | Dawson-Elli et al. |

FOREIGN PATENT DOCUMENTS

| | | | | | |
|---|---|---|---|---|---|
| EP | 2514529 | A2 | 10/2012 | | |
| JP | 2009080187 | A | * 4/2009 | ............... | G02B 3/14 |
| WO | 2005/103768 | A2 | 11/2005 | | |
| WO | 2008/037787 | A2 | 4/2008 | | |
| WO | WO-2009052819 | A2 | * 4/2009 | ........... | G02B 3/0081 |
| WO | 2012/086311 | A1 | 6/2012 | | |
| WO | WO-2015164234 | A1 | * 10/2015 | ........... | B29C 64/124 |
| WO | 2018/148283 | A1 | 8/2018 | | |
| WO | 2018/187578 | A2 | 10/2018 | | |
| WO | 2019/146855 | A1 | 8/2019 | | |
| WO | 2019/173657 | A1 | 9/2019 | | |
| WO | 2019/183147 | A1 | 9/2019 | | |
| WO | 2019/225974 | A1 | 11/2019 | | |

OTHER PUBLICATIONS

International Search Report and Written Opinion of the International Searching Authority; PCT/US2019/054976; mailed on Mar. 5, 2020, 18 pages; European Patent Office.

* cited by examiner

LIQUID LENS

CROSS-REFERENCE TO RELATED APPLICATIONS

This application claims the benefit of priority under 35 U.S.C. § 371 of International Application No. PCT/US2019/054976, filed on Oct. 7, 2019, which claims the benefit of priority under 35 U.S.C. § 119 of U.S. Provisional Application No. 62/743,500, filed Oct. 9, 2018, and U.S. Provisional Application No. 62/767,625, filed Nov. 15, 2018, the content of each of which is incorporated herein by reference in its entirety.

BACKGROUND

Field

This disclosure relates to liquid lenses and camera modules comprising liquid lenses.

Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are liquid lens systems comprising heating devices and camera modules comprising liquid lenses and heating devices.

Disclosed herein is a liquid lens system comprising a liquid lens and a heating device disposed in, on, or near the liquid lens.

Disclosed herein is a camera module comprising the liquid lens system.

Disclosed herein is a method of operating a liquid lens. A temperature of the liquid lens is detected. The liquid lens is heated in response to the detected temperature.

Various embodiments disclosed herein can reduce, impede, or prevent crosstalk between components of the liquid lens, or the effects thereof.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
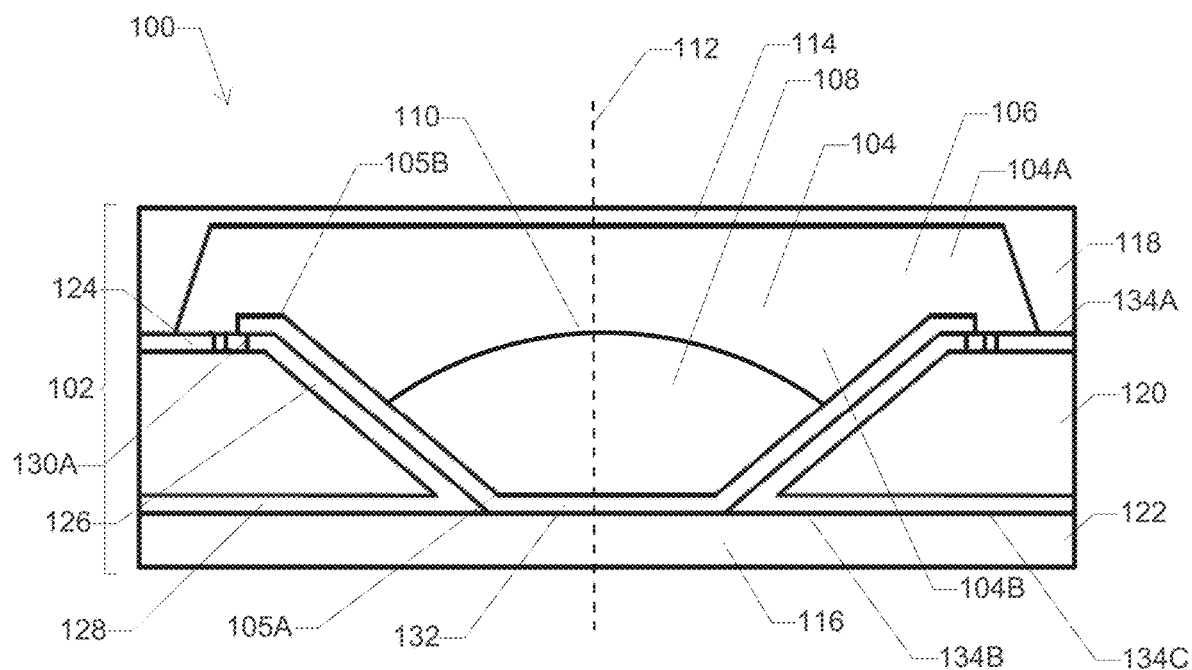
FIG. 1 is a schematic cross-sectional view of some embodiments of a liquid lens.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, a camera module comprises a liquid lens and a heating device. In some embodiments, the camera module comprises a temperature sensor. Additionally, or alternatively, the heating device is controlled in response to a temperature signal generated by the temperature sensor.

In various embodiments, a method of operating a liquid lens comprises heating the liquid lens. For example, heating the liquid lens comprises heating the liquid lens in response to a temperature of the liquid lens. Additionally, or alternatively, heating the liquid lens comprises controlling the temperature of the liquid lens.

Heating a liquid lens as described herein can enable improved speed and/or image quality of the liquid lens and/or a camera module comprising the liquid lens. Without wishing to be bound by any theory, it is believed that increasing the temperature of the liquids within the liquid lens reduces the viscosity of the liquids, thereby enabling the improved speed and/or image quality.

FIG. 1 is a schematic cross-sectional view of some embodiments of a liquid lens 100. In some embodiments, liquid lens 100 comprises a lens body 102 and a cavity 104 formed in the lens body. A first liquid 106 and a second liquid 108 are disposed within cavity 104. In some embodiments, first liquid 106 is a polar liquid or a conducting liquid. Additionally, or alternatively, second liquid 108 is a non-polar liquid or an insulating liquid. In some embodiments, first liquid 106 and second liquid 108 are substantially immiscible with each other and have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of first liquid 106 is disposed in first portion 104A of cavity 104. Additionally, or alternatively, at least a portion of second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity) is disposed within second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110. In some embodiments, adjusting interface 110 changes the shape of the interface, which changes the focal length or focus of liquid lens 100. For example, such a change of focal length can enable liquid lens 100 to perform an autofocus function. Additionally, or alternatively, adjusting interface 110 tilts the interface relative to an optical axis 112 of liquid lens 100. For example, such tilting can enable liquid lens 100 to perform an optical image stabilization (01S) function. Adjusting interface 110 can be achieved without physical movement of liquid lens 100 relative to an image sensor, a fixed lens or lens stack, a housing, or other components of a camera module in which the liquid lens can be incorporated.

In some embodiments, lens body 102 of liquid lens 100 comprises a first window 114 and a second window 116. In some of such embodiments, cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118, an intermediate layer 120, and a second outer layer 122. In some of such embodiments, intermediate layer 120 comprises a bore formed therethrough. First outer layer 118 can be bonded to one side (e.g., the object side) of intermediate layer 120. For example, first outer layer 118 is bonded to intermediate layer 120 at a bond 134A. Bond 134A can be an adhesive bond, a laser bond (e.g., a laser weld), or another suitable bond capable of maintaining first liquid 106 and second liquid 108 within cavity 104. Additionally, or alternatively, second outer layer 122 can be bonded to the other side (e.g., the image side) of intermediate layer 120. For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first window 114. In some embodiments, first outer layer 118 comprises a recess as shown in FIG. 1, and first portion 104A of cavity 104 is disposed within the recess in the first outer layer. Thus, first portion 104A of cavity 104 is disposed outside of the bore in intermediate layer 120.

In some embodiments, cavity 104 (e.g., second portion 104B of the cavity) is tapered as shown in FIG. 1 such that a cross-sectional area of the cavity decreases along optical axis 112 in a direction from the object side to the image side. For example, second portion 104B of cavity 104 comprises a narrow end 105A and a wide end 105B. The terms "narrow" and "wide" are relative terms, meaning the narrow end is narrower, or has a smaller width or diameter, than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, or glass-ceramic material. In some embodiments, outer surfaces of first outer layer 118 and/or second outer layer 122 are substantially planar. Thus, even though liquid lens 100 can function as a lens (e.g., by refracting image light passing through interface 110), outer surfaces of the liquid lens can be flat as opposed to being curved like the outer surfaces of a fixed lens. In other embodiments, outer surfaces of the first outer layer and/or the second outer layer are curved (e.g., concave or convex). Thus, the liquid lens comprises an integrated fixed lens. In some embodiments, intermediate layer 120 comprises a metallic, polymeric, glass, ceramic, or glass-ceramic material. Because image light can pass through the bore in intermediate layer 120, the intermediate layer may or may not be transparent.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, a heating device, a temperature sensor, and/or other electrical devices). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

In some embodiments, liquid lens 100 comprises an insulating layer 132 disposed within cavity 104. For example, insulating layer 132 comprises an insulating coating applied to intermediate layer 120 prior to bonding first outer layer 118 and/or second outer layer 122 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating. In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
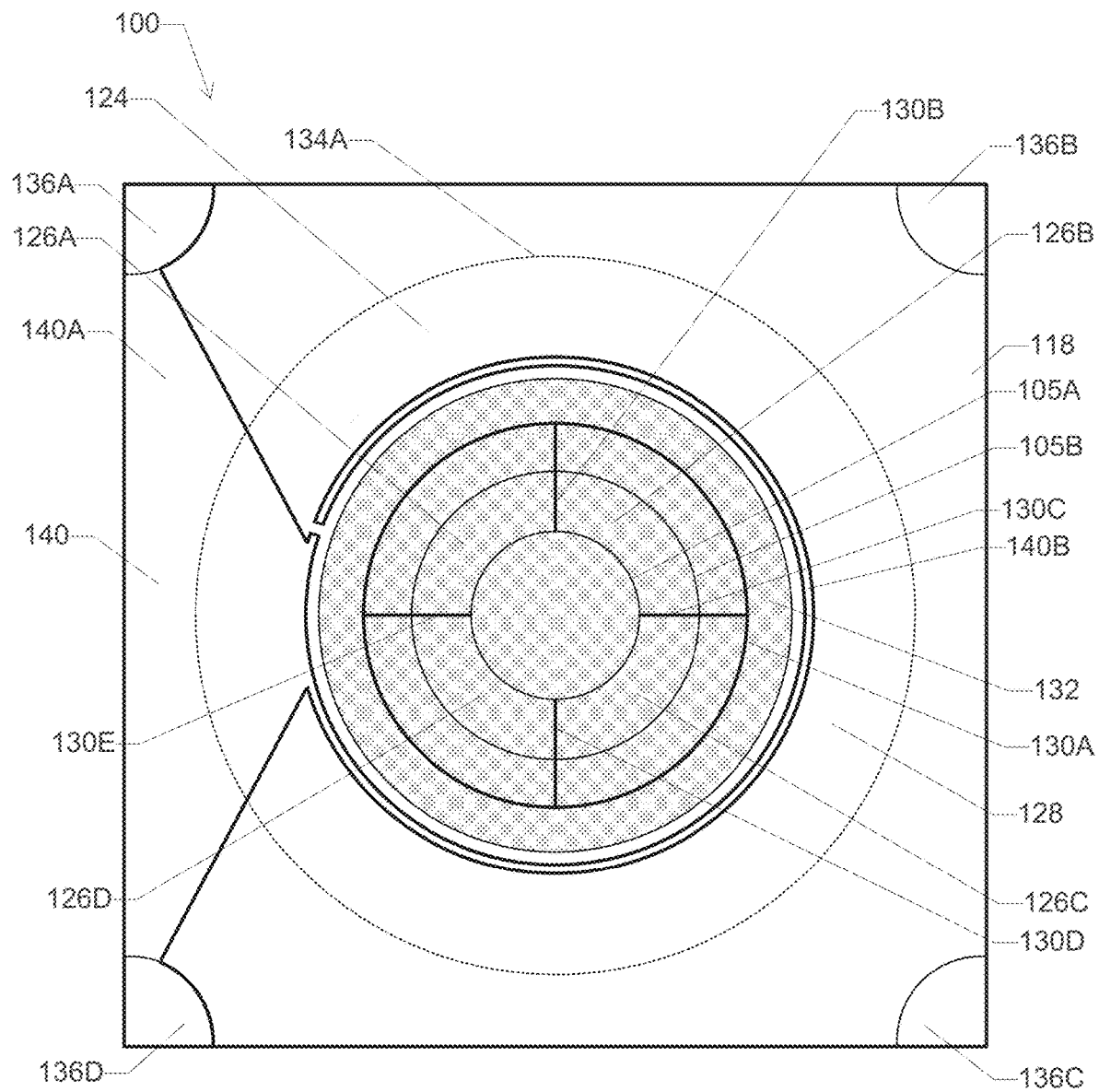
FIG. 2 is a schematic front view of the liquid lens of FIG. 1 looking through a first outer layer of the liquid lens.
Figure 3:
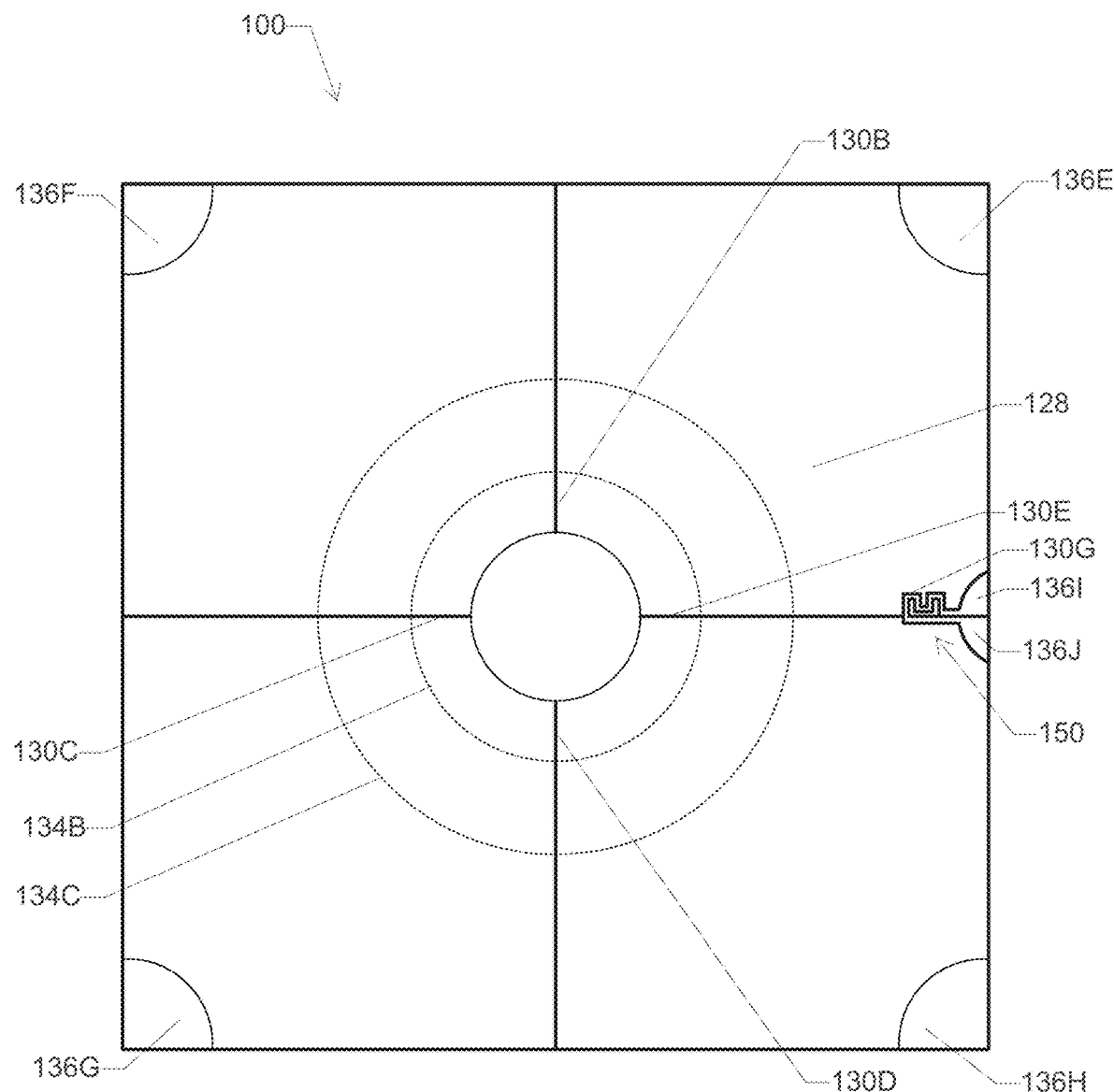
FIG. 3 is a schematic rear view of the liquid lens of FIG. 1 looking through a second outer layer of the liquid lens.

FIG. 2 is a schematic front view of liquid lens 100 looking through first outer layer 118, and FIG. 3 is a schematic rear view of the liquid lens looking through second outer layer 122. For clarity in FIGS. 2 and 3, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond. In some embodiments, liquid lens 100 comprises one or more cutouts 136 in first outer layer 118. For example, in the embodiments shown in FIG. 2, liquid lens 100 comprises a first cutout 136A, a second cutout 136B, a third cutout 136C, and a fourth cutout 136D. In some embodiments, cutouts 136 comprise portions of liquid lens 100 at which first outer layer 118 is removed to expose conductive layer 128. Thus, one or more of cutouts 136 (e.g., cutouts 136B and 136C) can enable electrical connection to common electrode 124, and the regions of conductive layer 128 exposed at cutouts 136 can serve as contacts to enable electrical connection of liquid lens 100 to a controller, a driver, or another component of a lens or camera system.

Although cutouts 136 are described herein as being positioned at corners of liquid lens 100, other embodiments are included in this disclosure. For example, in some embodiments, one or more of the cutouts are disposed inboard of the outer perimeter of the liquid lens.

In some embodiments, driving electrode 126 comprises a plurality of driving electrode segments. For example, in the embodiments shown in FIGS. 2 and 3, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 as shown in FIG. 3. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein as being divided into four driving electrode segments, other embodiments are included in this disclosure. In some other embodiments, the driving electrode is divided into two, three, five, six, seven, eight, or more driving electrode segments.

In some embodiments, bond 134B and/or bond 134C are configured such that electrical continuity is maintained between the portion of conductive layer 128 inside the respective bond and the portion of the conductive layer outside the respective bond. In some embodiments, liquid lens 100 comprises one or more cutouts 136 in second outer layer 122. For example, in the embodiments shown in FIG. 3, liquid lens 100 comprises a fifth cutout 136E, a sixth cutout 136F, a seventh cutout 136G, and an eighth cutout 136H. In some embodiments, cutouts 136 comprise portions of liquid lens 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a driver, or another component of a lens or camera system.

Different driving voltages can be supplied to different driving electrode segments to tilt the interface of the liquid lens (e.g., for OIS functionality). Additionally, or alternatively, the same driving voltage can be supplied to each driving electrode segment to maintain the interface of the liquid lens in a substantially spherical orientation about the optical axis (e.g., for autofocus functionality).

Figure 4:
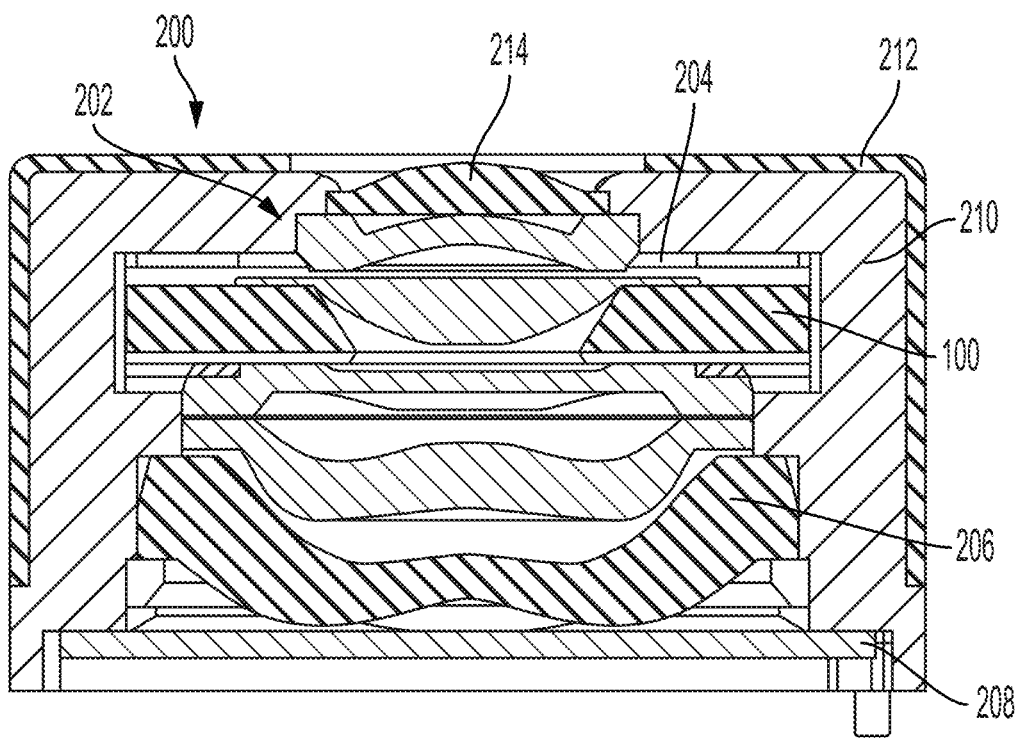
FIG. 4 is a schematic cross-sectional view of some embodiments of a camera module comprising a liquid lens.

FIG. 4 is a schematic cross-sectional view of some embodiments of a camera module 200. In some embodiments, camera module 200 comprises a lens assembly 202. For example, lens assembly 202 comprises a first lens group 204, liquid lens 100, and a second lens group 206 aligned along an optical axis. Each of first lens group 204 and second lens group 206 can comprise, independently, one or a plurality of lenses (e.g., fixed lenses).

Although lens assembly 202 is described herein as comprising liquid lens 100 disposed between first lens group 204 and second lens group 206, other embodiments are included in this disclosure. In some other embodiments, a lens assembly comprises a single lens group disposed on either side (e.g., the object side or the image side) of liquid lens 100 along the optical axis.

In some embodiments, camera module 200 comprises an image sensor 208. For example, lens assembly 202 is positioned to focus an image on image sensor 208. Image sensor 208 can comprise a semiconductor charge-coupled device (CCD), a complementary metal-oxide-semiconductor (CMOS), an N-type metal-oxide-semiconductor (NMOS), another image sensing device, or a combination thereof. Image sensor 208 can detect image light focused on the image sensor by lens assembly 202 to capture the image represented by the image light. In some embodiments, image sensor 208 can serve as a heating device to transmit heat to liquid lens 100 as described herein.

In some embodiments, camera module 200 comprises a housing 210. For example, lens assembly 202 and/or image sensor 208 are mounted in housing 210 as shown in FIG. 4. Such a configuration can help to maintain proper alignment between lens assembly 202 and image sensor 208. In some embodiments, camera module 200 comprises a cover 212. For example, cover 212 is positioned on housing 210. Cover 212 can help to protect and/or shield lens assembly 202, image sensor 208, and/or housing 210. In some embodiments, camera module 200 comprises a lens cover 214 disposed adjacent lens assembly 202 (e.g., at the object side end of the lens assembly). Lens cover 214 can help to protect lens assembly 202 (e.g., first lens group 204) from scratches or other damage.

In some embodiments, the camera module comprises a heating device. The heating device can be disposed at any suitable position within, on, or near any component of the camera module (e.g., the housing, the lens assembly, the cover, and/or the image sensor) such that the heating device is capable of transmitting thermal energy to the liquid lens and/or generating thermal energy within the liquid lens. For example, the heating device is mounted within the housing (e.g., adjacent the liquid lens) to transmit thermal energy to the liquid lens and/or generate thermal energy within the liquid lens. Additionally, or alternatively, the heating device is incorporated into the liquid lens as described herein. Additionally, or alternatively, the image sensor can be configured to serve as the heating device. For example, power can be applied to the image sensor during a time in which an image is not being captured (e.g., a time when the image sensor generally would be powered off) for transmitting heat generated by the image sensor to the liquid lens. The heating device can comprise a resistive heater, a capacitive heater, an inductive heater, a convective heater, or another type of heater. Additionally, or alternatively, the heating device can transmit thermal energy to the liquid lens through conduction, convection, and/or radiation.

In some embodiments, the camera module comprises a temperature sensor. The temperature sensor can be disposed at any suitable position within, on, or near any component of the camera module (e.g., the housing, the lens assembly, the cover, and/or the image sensor) such that the temperature sensor is capable of detecting a temperature of the camera module or a component thereof (e.g., the liquid lens). For example, the temperature sensor is mounted within the housing (e.g., adjacent the liquid lens) to detect the temperature of the liquid lens. Additionally, or alternatively, the temperature sensor is incorporated into the liquid lens as described herein. The temperature sensor can comprise a thermocouple, a resistive temperature device (RTD), a thermistor, an infrared sensor, a bimetallic device, a thermometer, a change of state sensor, a semiconductor-based sensor (e.g., a silicon diode), or another type of temperature sensing device.

In some embodiments, the heating device is controlled in response to a temperature signal generated by the temperature sensor. For example, the temperature sensor detects the temperature within the camera module and generates the temperature signal that is indicative of the detected temperature. The heating device can be adjusted (e.g., to increase or decrease the amount of heat being transmitted to the liquid lens) based on the temperature signal.

In some embodiments, the heating device is disposed within the liquid lens. For example, in the embodiments shown in FIG. 2, liquid lens 100 comprises a heating device 140. In some embodiments, heating device 140 comprises a portion of conductive layer 128. For example, heating device 140 comprises a portion of conductive layer 128 at least partially defined by a scribe 130F. In some embodiments, heating device 140 at least partially circumscribes cavity 104. For example, heating device 140 comprises a base portion 140A and a ring portion 140B that partially circumscribes cavity 104. Such a configuration can help to enable uniform heating of first liquid 106 and/or second liquid 108.

In some embodiments, ring portion 140B comprises a partial ring having a break therein. Thus, ring portion 140B partially circumscribes cavity 104 without entirely circumscribing the cavity. The break can enable electrical continuity over at least a segment of the remaining portion of conductive layer 128. For example, the break can enable electrical continuity over a segment of conductive layer 128 corresponding to common electrode 124.

In some embodiments, heating device 140 is exposed at at least one cutout 136. For example, in the embodiments shown in FIG. 2, heating device 140 is exposed at two cutouts 136, cutout 136A and cutout 136D. Thus, one or more of cutouts 136 (e.g., cutouts 136A and 136D) can enable electrical connection to heating device 140, and the regions of conductive layer 128 exposed at cutouts 136 can serve as contacts to enable electrical connection of the heating device to a controller, a driver, or another component of a lens or camera system. For example, a current can be passed through heating device 140 by making electrical connection to the heating device at the contacts (e.g., at cutouts 136A and 136D), thereby causing the temperature of the heating device to increase and/or transmit thermal energy to first liquid 106 and/or second liquid 108.

Although heating device 140 is shown in FIG. 2 as being uncovered by insulating layer 132, other embodiments are included in this disclosure. For example, in some other embodiments, the insulating layer covers the heating device or a portion thereof (e.g., a portion of the heating device disposed inside the cavity of the liquid lens). Such a configuration can insulate the heating device from the first liquid and/or the second liquid.

Although heating device 140 is described in reference to FIG. 2 as being disposed within liquid lens 100 and positioned between first outer layer 118 and intermediate layer 120, other embodiments are included in this disclosure. For example, in some other embodiments, the heating device is disposed in the liquid lens and positioned between the intermediate layer and the second outer layer. Additionally, or alternatively, the heating device is disposed on the liquid lens (e.g., on an outer surface or an outer edge of the liquid lens) and/or adjacent to the liquid lens (e.g., within the housing of the camera module).

In some embodiments, the temperature sensor is disposed within the liquid lens. For example, in the embodiments shown in FIG. 3, liquid lens 100 comprises a temperature sensor 150. In some embodiments, temperature sensor 150 comprises a portion of conductive layer 128. For example, temperature sensor 150 comprises a portion of conductive layer 128 at least partially defined by a scribe 130G. In some embodiments, temperature sensor 150 comprises a relatively thin conductive trace having a zig-zag, sawtooth, spiral, undulating, or other suitable pattern.

In some embodiments, temperature sensor 150 is exposed at at least one cutout 136. For example, in the embodiments shown in FIG. 3, temperature sensor 150 is exposed at two cutouts 136, cutout 136I and cutout 136J. Thus, one or more of cutouts 136 (e.g., cutouts 136I and 136J) can enable electrical connection to temperature sensor 150, and the regions of conductive layer 128 exposed at cutouts 136 can serve as contacts to enable electrical connection of the temperature sensor to a controller or another component of a lens or camera system. For example, a current can be passed through temperature sensor 150 by making electrical connection to the temperature sensor at the contacts (e.g., at cutouts 136I and 136J), thereby enabling a detection of the temperature at the temperature sensor (e.g., by measuring resistance).

Although temperature sensor 150 is described in reference to FIG. 3 as being disposed within liquid lens 100 and positioned between and intermediate layer 120 and second outer layer 122, other embodiments are included in this disclosure. For example, in some other embodiments, the temperature sensor is disposed in the liquid lens and positioned between the first outer layer and the intermediate layer. Additionally, or alternatively, the temperature sensor is disposed on the liquid lens (e.g., on an outer surface or an outer edge of the liquid lens) and/or adjacent to the liquid lens (e.g., within the housing of the camera module).

In some embodiments, the heating device and the temperature sensor are positioned opposite each other. Such a configuration can improve the accuracy of the temperature measurement by preventing the temperature sensor from detecting the effects of local heating near the heating device before the thermal energy is transmitted throughout the liquid lens.

Figure 5:
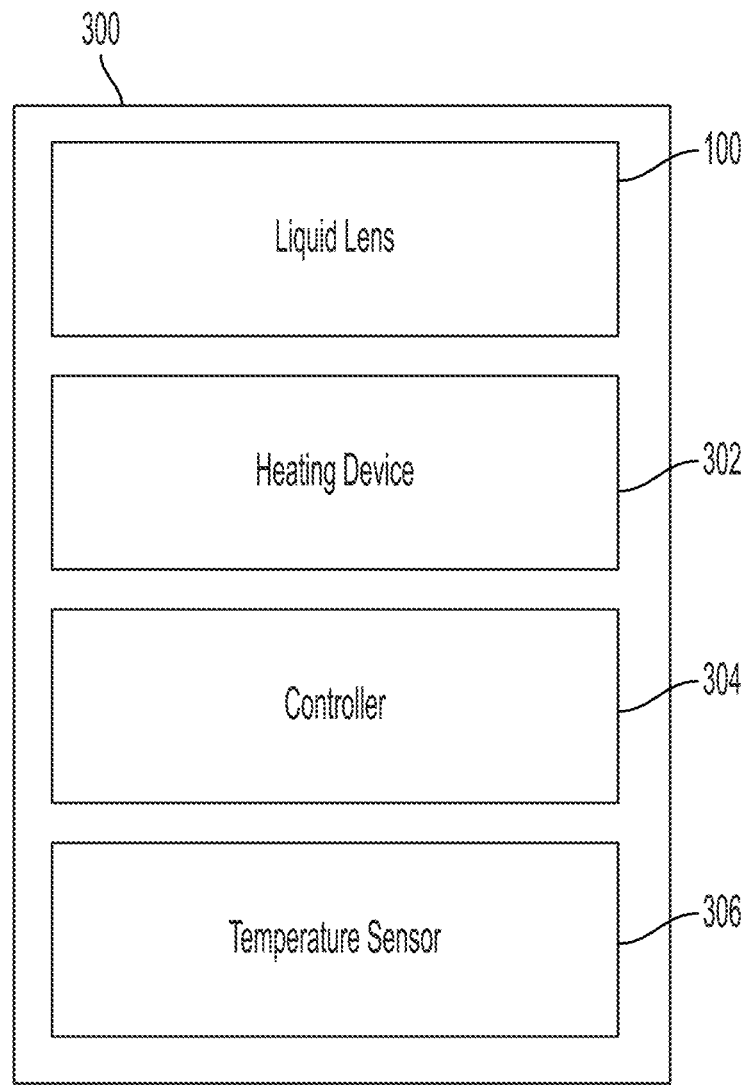
FIG. 5 is a block diagram of some embodiments of a camera module system.

FIG. 5 is a block diagram illustrating some embodiments of a camera module system 300. In some embodiments, camera module system 300 comprises a liquid lens, which can be configured as described herein with regard to liquid lens 100.

In some embodiments, camera module system 300 comprises a heating device 302, which can be configured as described herein with regard to heating device 140. Heating device 302 can be configured to transmit thermal energy to liquid lens 100 and/or generate thermal energy within the liquid lens.

In some embodiments, camera module system 300 comprises a controller 304. Controller 304 can be configured to supply a common voltage to common electrode 124 of liquid lens 100 and a driving voltage to driving electrode 126 of the liquid lens. A shape of interface 110 of liquid lens 100 and/or a position of the interface of the liquid lens can be controlled by the voltage differential between the common voltage and the driving voltage. In some embodiments, the common voltage and/or the driving voltage comprises an oscillating voltage signal (e.g., a square wave, a sine wave, a triangle wave, a sawtooth wave, or another oscillating voltage signal). In some of such embodiments, the voltage differential between the common voltage and the driving voltage comprises a root mean square (RMS) voltage differential. Additionally, or alternatively, the voltage differential between the common voltage and the driving voltage is manipulated using pulse width modulation (e.g., by manipulating a duty cycle of the differential voltage signal).

In various embodiments, controller 304 can comprise one or more of a general processor, a digital signal processor, an application specific integrated circuit, a field programmable gate array, an analog circuit, a digital circuit, a server processor, combinations thereof, or other now known or later developed processor. Controller 304 can implement one or more of various processing strategies, such as multi-processing, multi-tasking, parallel processing, remote processing, centralized processing, or the like. Controller 304 can be responsive to or operable to execute instructions stored as part of software, hardware, integrated circuits, firmware, microcode, or the like.

In some embodiments, camera module system 300 comprises a temperature sensor 306, which can be configured as described herein with regard to temperature sensor 150. Temperature sensor 306 can be configured to detect a temperature within the camera module (e.g., within liquid lens 100) and generate a temperature signal indicative of the detected temperature.

In some embodiments, a method of operating a liquid lens comprises supplying a common voltage to common electrode 124 in electrical communication with first liquid 106 and supplying a driving voltage to driving electrode 126 disposed on a sidewall of cavity 104.

In some embodiments, the method comprises detecting a temperature of the liquid lens. For example, detecting the temperature of the liquid lens comprises detecting the temperature within the liquid lens (e.g., within the cavity and/or between two layers of the liquid lens). Additionally, or alternatively, detecting the temperature of the liquid lens comprises detecting the temperature at an outer surface and/or at a position adjacent to the liquid lens. In some embodiments, detecting the temperature of the liquid lens comprises detecting the temperature of the liquid lens with the temperature sensor. In some embodiments, the method comprises generating a temperature signal indicative of the detected temperature. For example, generating the temperature signal comprises generating the temperature signal with the temperature sensor.

In some embodiments, the method comprises heating the liquid lens (e.g., transmitting thermal energy to the liquid lens and/or generating thermal energy within the liquid lens) in response to the detected temperature (e.g., in response to the temperature signal generated by the temperature sensor). For example, heating the liquid lens comprises generating thermal energy with the heating device. In some embodiments, the method comprises adjusting the heating device in response to the detected temperature. For example, if the detected temperature is below a target temperature, the heating device can be adjusted to transmit more thermal energy to the liquid lens and/or generate more thermal energy within the liquid lens. Additionally, or alternatively, if the detected temperature is above a target temperature, the heating device can be adjusted to transmit less thermal energy to the liquid lens and/or generate less thermal energy within the liquid lens. The heating device can be controlled in response to the detected temperature using a proportional integral (PI) controller, a proportional integral derivative (PID) controller, a fuzzy logic controller, a bang-bang controller, and L squared controller, a predictive controller, or another suitable controller or control strategy.

In some embodiments, the method comprises actuating the liquid lens during the heating. For example, the voltage differential between the common voltage and the driving voltage is manipulated, thereby causing the first liquid and the second liquid to flow within the cavity. In some embodiments, actuating the liquid lens comprises tilting the lens (e.g., tilting the interface between the first liquid and the second liquid relative to the optical axis). For example, tilting the lens comprises tilting the lens back and forth repeatedly in one or more different directions, which can cause the liquids to flow within the cavity. In some embodiments, actuating the liquid lens comprises sequentially tilting the liquid lens in a spiral pattern (e.g., around the plurality of driving electrode segments), which can cause the liquids to swirl within the cavity. Actuating the liquid lens during the heating can help to transmit thermal energy within the liquid lens (e.g., through the liquids), thereby improving thermal uniformity with the liquid lens.

Figure 6:
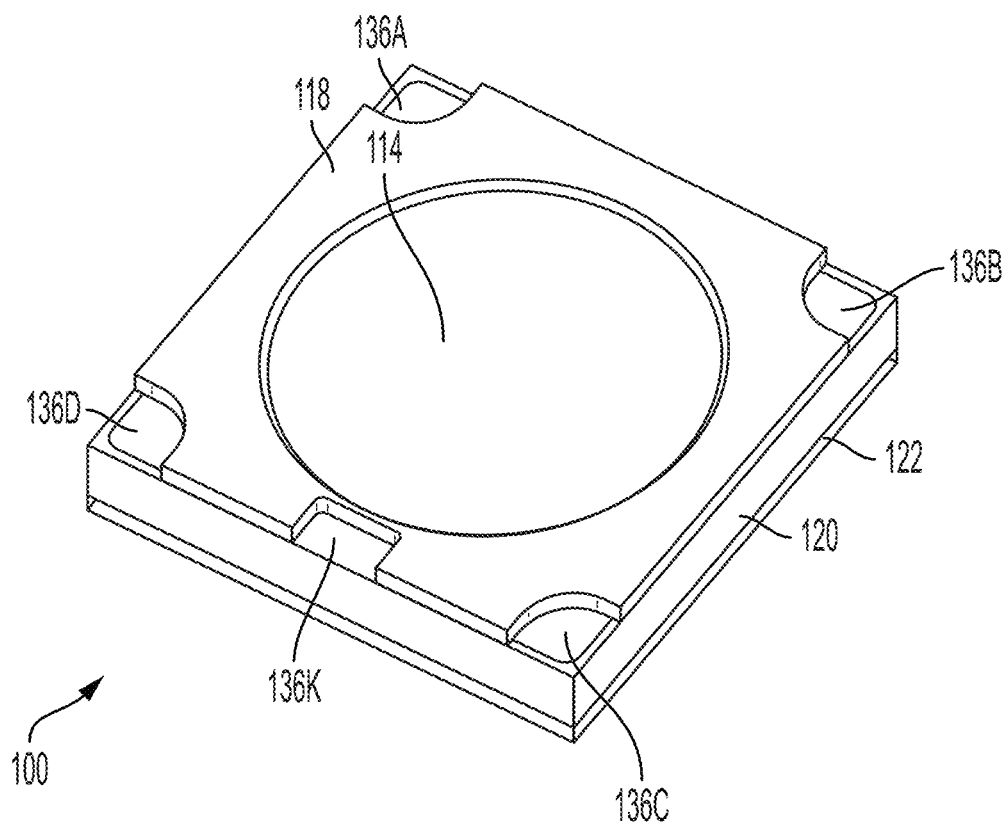
FIG. 6 is a perspective view of an example embodiment of a liquid lens.
Figure 7:
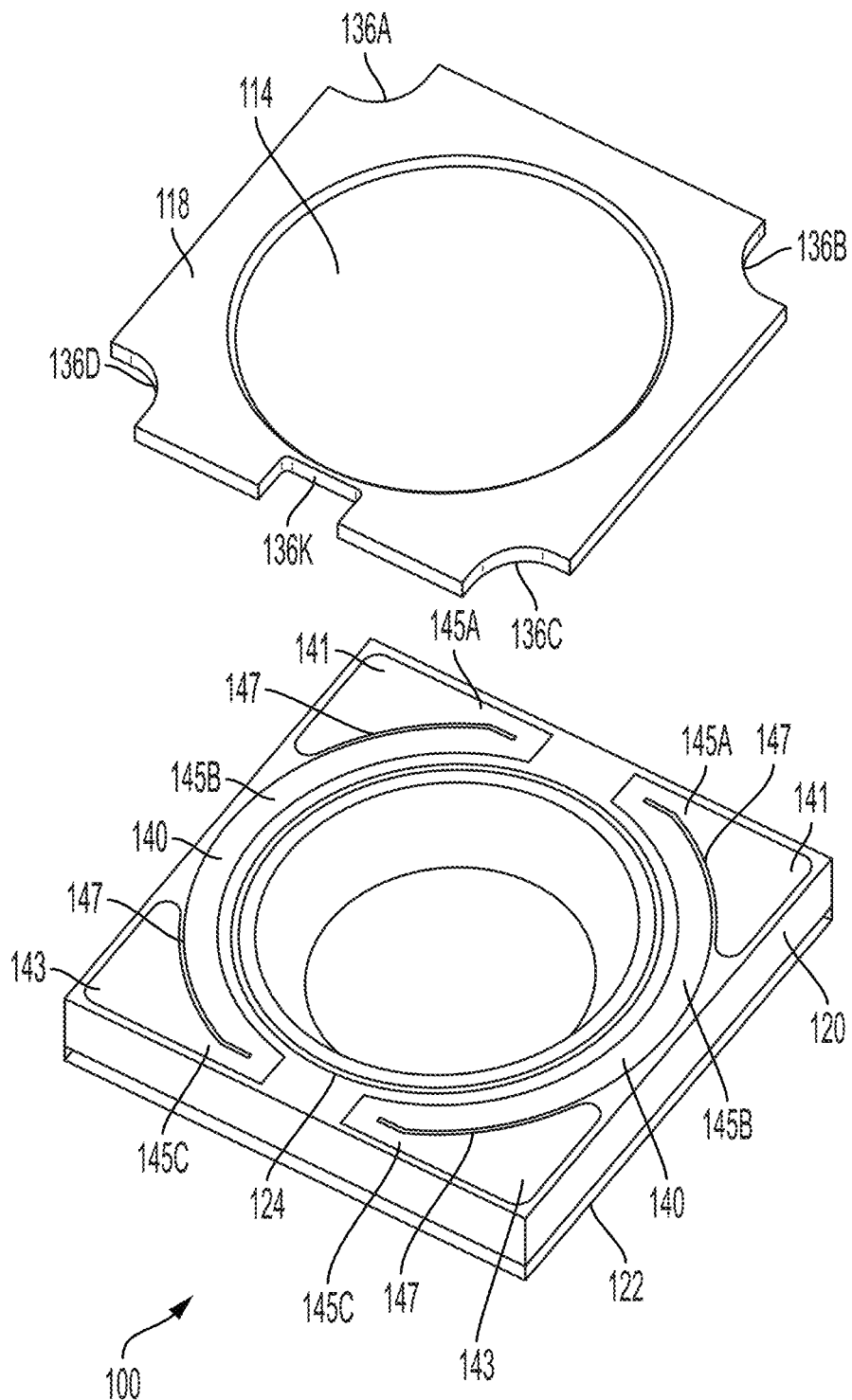
FIG. 7 is an exploded view of an example embodiment of a liquid lens.
Figure 8:
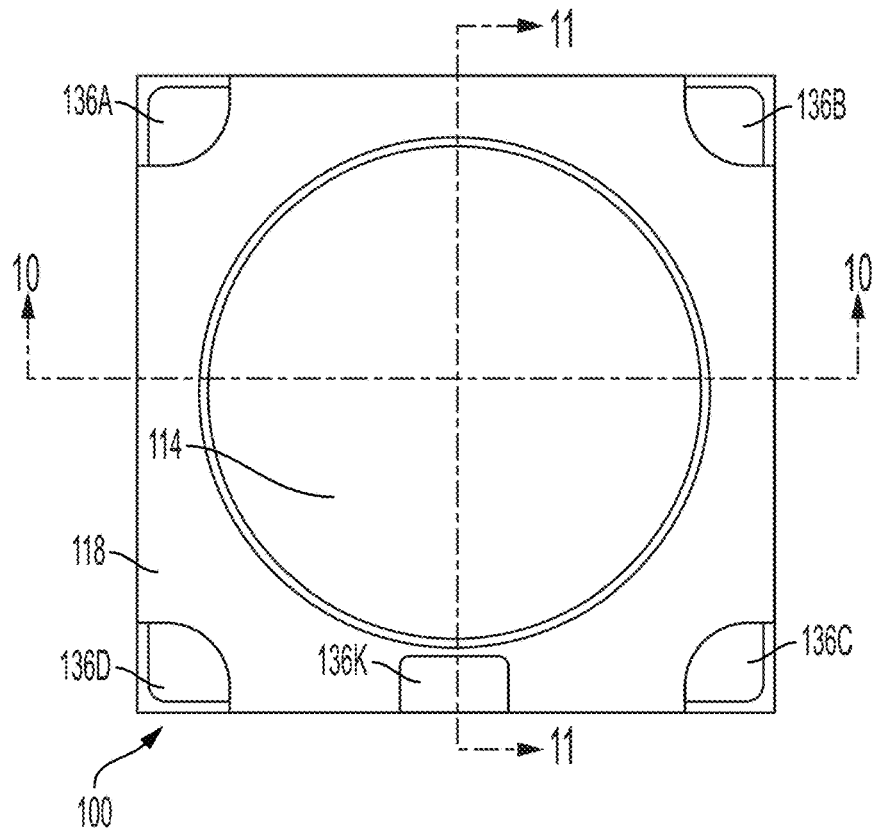
FIG. 8 is front view of an example embodiment of a liquid lens.
Figure 9:
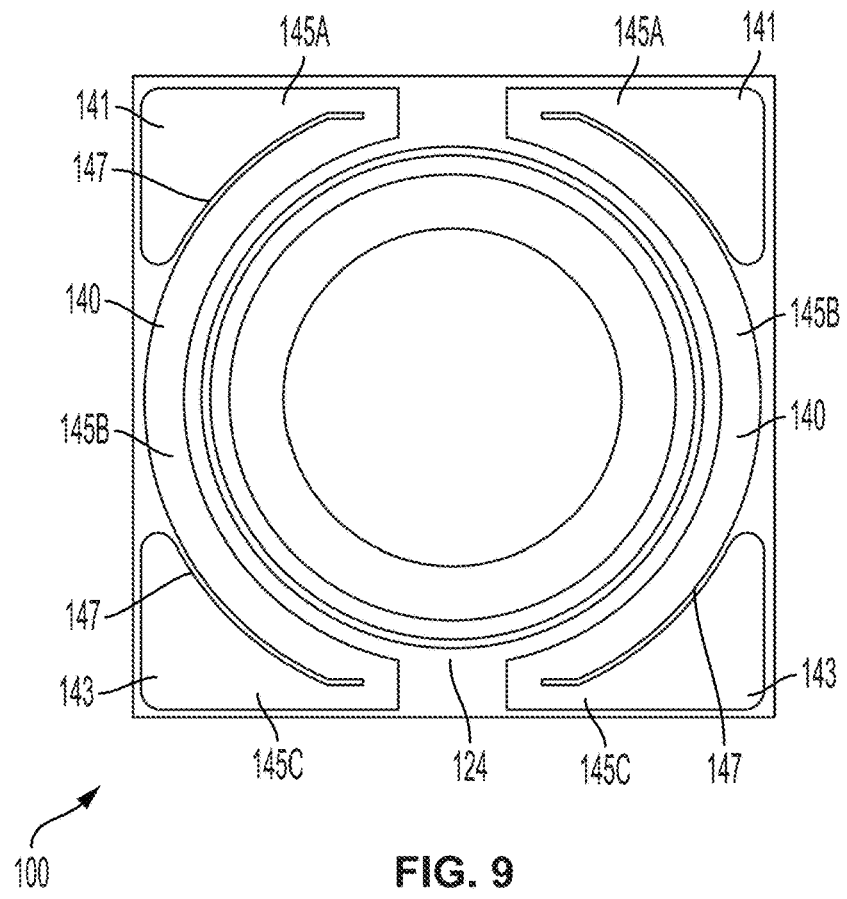
FIG. 9 is a front view of example embodiment of a liquid lens with the first window omitted from view.

FIG. 6 is a perspective view of example embodiments of a liquid lens 100. FIG. 7 shows an exploded view of the example embodiments of a liquid lens 100 with the first outer layer 118 and/or first window 114 separated to facilitate viewing of the internal components of the liquid lens 100. FIG. 8 is a front view of the example embodiments of a liquid lens 100. FIG. 9 is a front view of the example embodiments of a liquid lens 100 with the first outer layer 118 and/or the first window 114 omitted from view. The example embodiments of FIGS. 6-9 can include features that are similar to, or the same as, the other liquid lens embodiments disclosed herein, many of which are not repeated in connection with FIGS. 6-9.

In some embodiments, the liquid lens 100 can have multiple heating devices 140. For example, a first heating device can be positioned on a first side of the liquid lens 100 (e.g., a left side) and a second heating device can be positioned on a second side of the liquid lens (e.g., a right side). Any suitable number of heating devices 140 can be used, such as one, two, three, four, six, eight, or more heating devices 140. The one or more heating devices 140 can be between the first outer layer 118 and the intermediate layer 120, although other locations are also possible, as discussed herein. The first outer layer 118 and/or the first window 114 can cover the one or more heating devices, in some implementations. Cutouts in the first outer layer 118 can provide access to the one or more heating devices 140, such as for providing electrical current to the heating devices 140. Each heating device 140 can have a first end 141, which can be exposed at a first cutout (e.g., 136A for the left heating device 140) and a second end 143, which can be exposed at a second cutout (e.g., 136D for the left heating device 140). Current can be passed through the heating device 140, such as from the first end 141 to the second end 143, or from the second end 143 to the first end 141. Current can be passed through the heating devices 140 (e.g., on the right and left sides) in the same direction, or in opposite directions. The multiple heating devices 140 can be operated symmetrically, independently, or selectively. In some cases, the system can operate only one heating device 140, or a subset of the heating devices 140, such as for localized heating or for reduced heating. In some cases, substantially the same current can be applied to each of the heating devices 140. In some cases, the system can apply different amounts of current to the different heating devices 140, such as for asymmetrical heating. Current can be driven through the heating devices 140 in the same direction (e.g., from the first end 141 to the second end 143 for both heating devices 140), or in opposite directions (e.g., from the first end 141 to the second end 143 for the first heating device 140, and from the second end 143 to the first end 141 for the second heating device 140).

The heating device 140 can include conductive material that follows a winding path between the first end 141 and the second end 143. The path from the first end 141 to the second end 143 can have an omega shape. The heating device 140 can have a first section 145A that can extend from first end 141 towards the cavity 104. The first section 145A can extend towards another (e.g., opposing) heating device 140. The heating device 140 can have a second section 145B that extends from the first section 145A and generally follows a path along a periphery of the cavity 104. The heating device 140 can have a third section 145C that extends from the second end 143 to the second section 145B. The third section 145C can extend towards the cavity 104. The third section 145C can extend towards another (e.g., an opposing) heating device 140. The path of the conductive material between the first end 141 and the second end 143 can extend along the first section 145, can turn by about 90 degrees, about 120 degrees, about 150 degrees, about 180 degrees, about 210 degrees, or any values therebetween, or any ranges bounded by these values. The path can extend along the second section 145B, tracking the shape of the outer periphery of the cavity 104, such as along an arcuate or curved path. The path can then turn by an angle of about 90 degrees, about 120 degrees, about 150 degrees, about 180 degrees, about 210 degrees, or any values therebetween, or any ranges bounded by these values and can extend to the second end 143.

In some embodiments, the conductive material of the heating device 140 can turn so that different sections of the heating device 140 are disposed adjacent to each other, such as with an insulating gap 147 therebetween. A gap 147 can be disposed between sections of the heating device 140. For example, a gap 147 can be disposed between the first section 145A and the second section 145B. A gap 147 can be disposed between the second section 145B and the third section 145C. The gap 147 can be electrically insulating. The length of the gap 147 can define a length of the heating device sections that are disposed adjacent each other, and/or can affect the path length of the electrical current through the heating device 140. The shape of the heating device 140 (e.g., the length of the gap 147) can urge the electrical current to flow closer to the cavity 104, and the fluids contained therein, than if the current were to flow along a direct path from the first end 141 to the second end 143 of the heating device 140. Directing the current close to the cavity 104 can facilitate heat transfer to the fluids in the chamber 104. The heating device(s) 140 (e.g., in combination, if multiple heating devices 140 are used) (e.g., the second section(s) 145B thereof) can surround about 270 degrees, about 300 degrees, about 315 degrees, about 330 degrees, about 340 degrees, about 350 degrees, about 355 degrees, of the cavity 104, or any values therebetween, or any ranges bounded by these values, although other configurations are also possible. Adjusting the length of the gap 147 can change the resistance of the heating device 140. For example, a longer flow path (e.g., using a longer gap 147) can have more resistance than a shorter flow path (e.g., using a shorter gap 147). The gap 147 can have a width that this smaller than a width of the heating device 140. The gap(s) 147 between adjacent sections of the heating device(s) 140 can surround about 30 degrees, 60 degrees, 90 degrees, 120 degrees, 150 degrees, or 180 degrees of the cavity periphery, or any values therebetween, or any ranges bounded by these values. Various suitable shapes can be used for the conductive material of the heating devices 140 disclosed herein.

Figure 10:
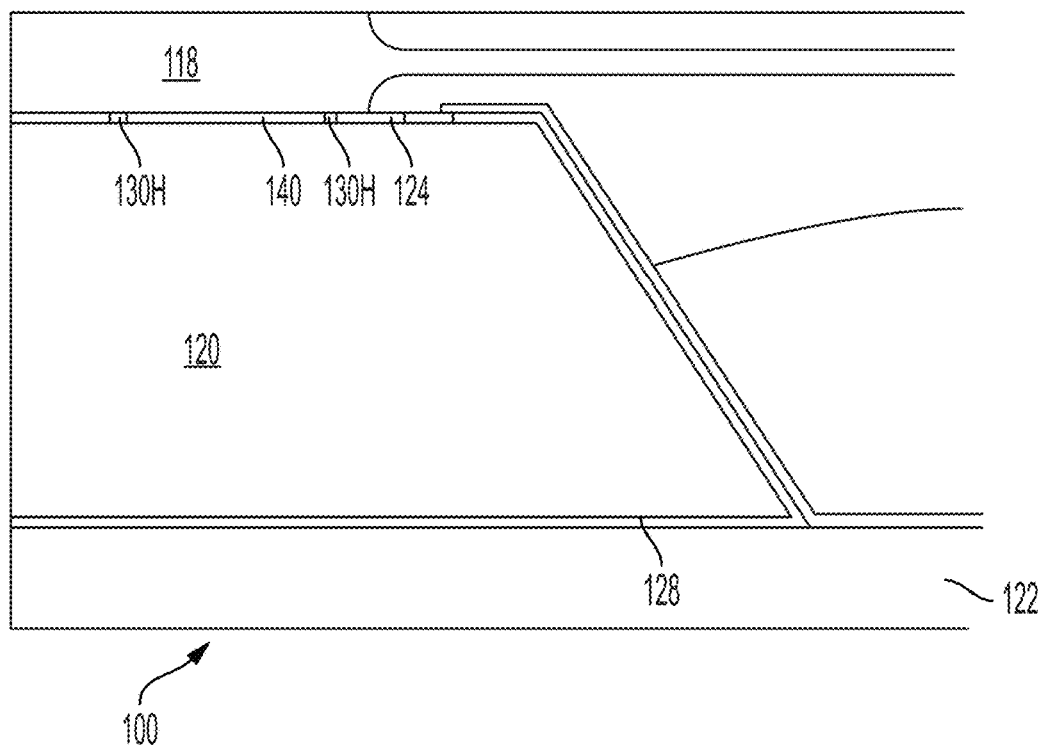
FIG. 10 is a partial cross-sectional view of an example embodiment of a liquid lens.

The heating device 140 can be insulated from the common electrode 124. In some embodiments, the heating device 140 can be made of the same material as the common electrode 124 and/or the driving electrode(s) 126. The conductive layer 128 can be used to form the heating device 140. One or more scribes 130H can isolate the heating device 140 from the common electrode 124. Additionally, or alternatively, one or more bonds can isolate the heating device 140 from the common electrode 124. In some embodiments, the bonds can be laser bonds, for example, as described in U.S. Pat. Nos. 9,492,990, 9,515,286, and/or 9,120,287, the entirety of which are incorporated herein by reference. The laser bonds can electrically isolate the heating device 140 (e.g., by diffusing the conductive layer 128 into the adjacent layers (e.g., layers 118, 120, and/or 122) of the liquid lens along the bond path, by ablating the conductive layer 128 along the bond path, or by another suitable mechanism) while also bonding or coupling the adjacent layers of the liquid lens (e.g., layers 118, 120, and/or 122) to each other. For example, in FIG. 9, the lines marking the edges of the heating devices 140 can be scribes and/or bonds that insulate the heating devices 140 from the common electrode 124. FIG. 10 is a partial cross-sectional view of the example embodiments of a liquid lens 100 taken through line 10-10 of FIG. 8. The scribe 130H can be seen in FIG. 10.

In some embodiments, the heating device 140 can include a different conductive material than the common electrode 124. The heating device 140 can include Nichrome or any other suitable conductive material. The material of the heating device 140 can have a higher resistance than the material of the common electrode 124, in some implementations.

Figure 11:
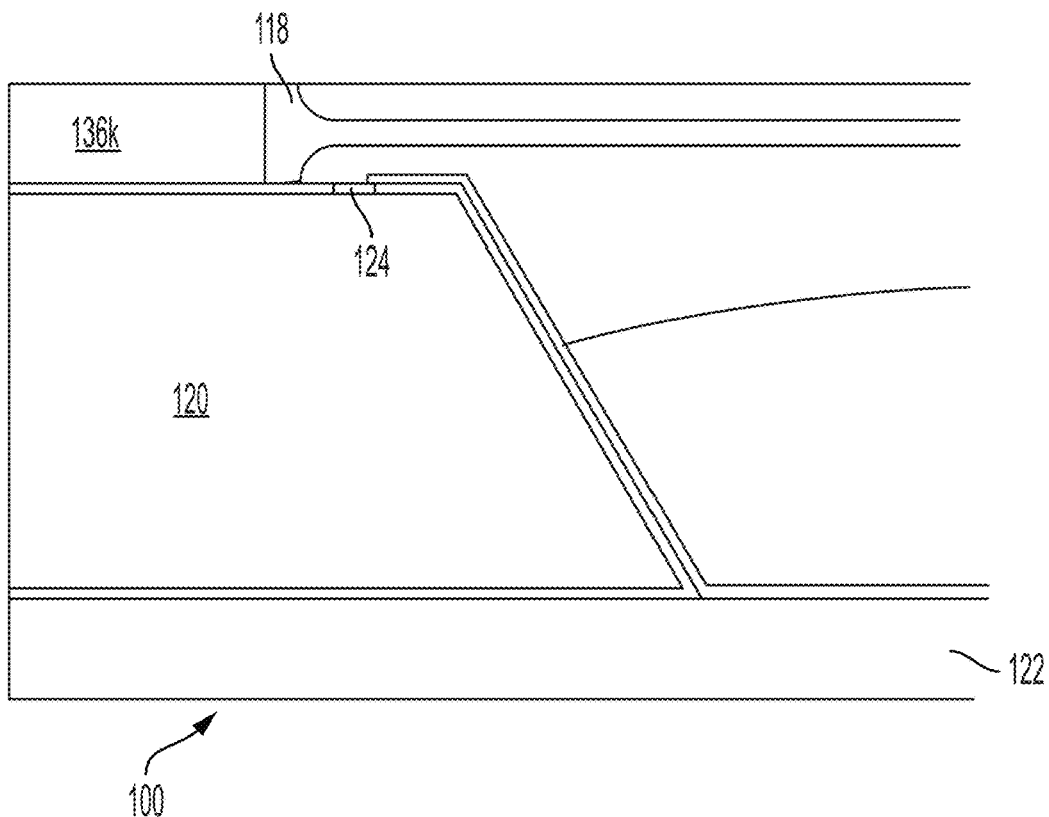
FIG. 11 is a partial cross-sectional view of an example embodiment of a liquid lens.

The first outer layer 118 can have a cutout 136k for accessing the common electrode 124. FIG. 11 is a partial cross-sectional view of the example embodiment of a liquid lens 100 taken through the line 11-11 of FIG. 8. The heating elements 140 can be spaced apart from each other (e.g., at the cutout 136K) to enable electrical communication to the common electrode 124, which can be in electrical communication with the first fluid 106. In some cases, the gap between the heating elements 140 on the side with the cutout 136K can be larger than the gap between the heating elements 140 on the side without the cutout 136K. In some cases, on the side without the cutout 136K, the heating elements 140 can be adjacent to each other, with a scribe (not shown), a bond, or another insulating later therebetween.

Figure 12:
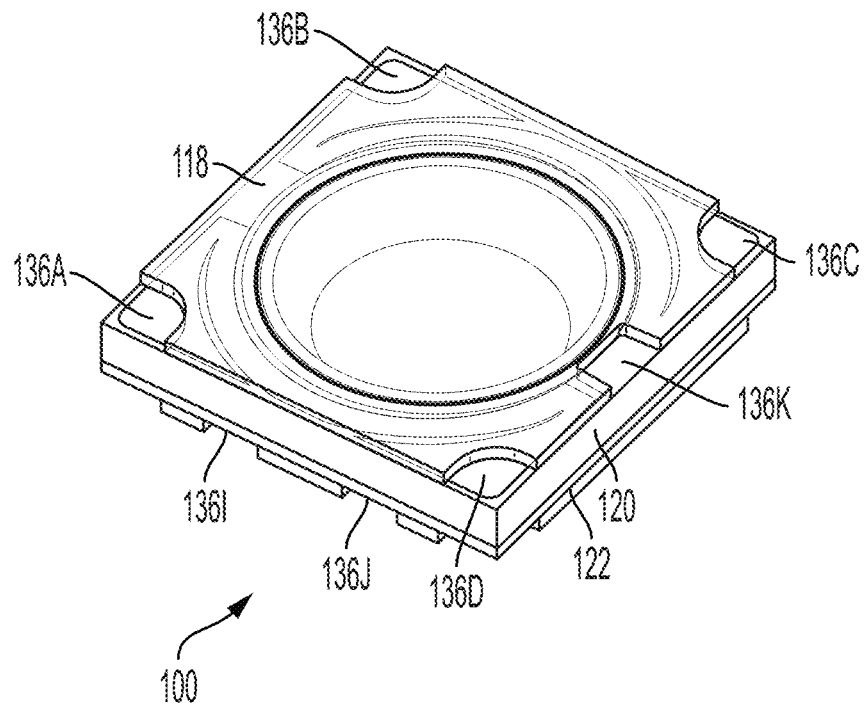
FIG. 12 is a perspective view of an example embodiment of a liquid lens.
Figure 13:
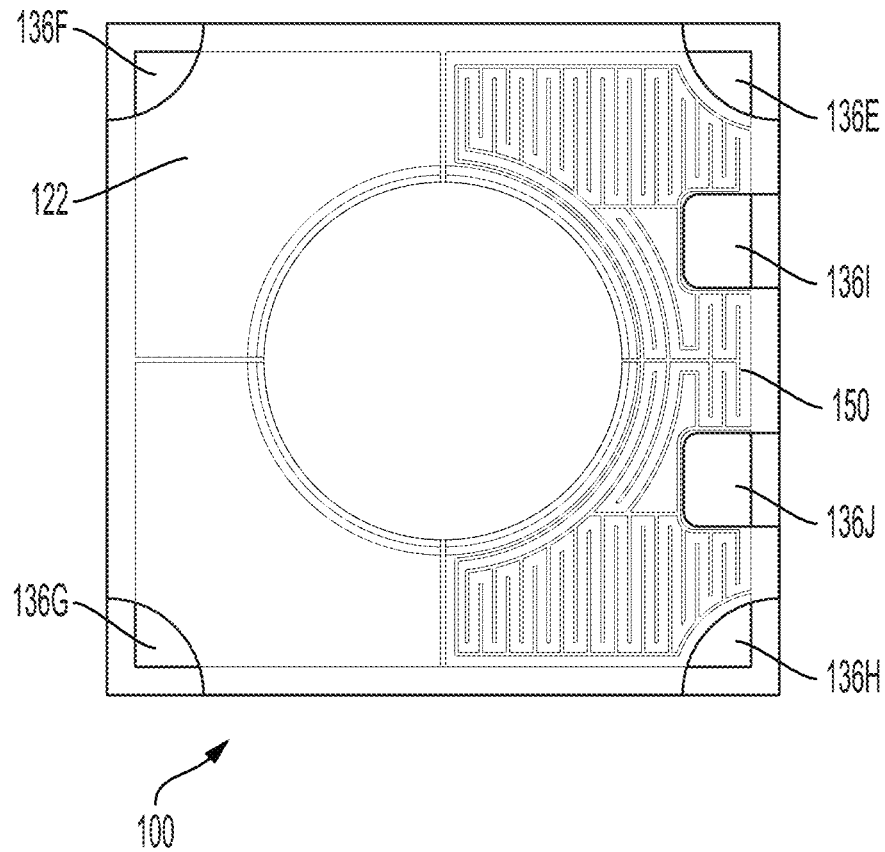
FIG. 13 is a front view of an example embodiment of a liquid lens.

In some embodiments, the liquid lens 100 can use the temperature sensor 150, as disclosed in connection with FIG. 3. Various other temperature sensors can be used, as discussed herein. FIG. 12 is a perspective view of example embodiments of a liquid lens 100. FIG. 13 is a rear view of the liquid lens 100. In FIGS. 12 and 13 the first outer layer 118 and the second outer layer 122 are shown as transparent.

The second outside layer 122 of the liquid lens 100 can have cutouts 136E-H, which can enable electrical communication with the driving electrodes 126. In the illustrated example, the liquid lens 100 includes four driving electrodes 126, although any suitable number of driving electrodes 126 can be used (e.g., 1, 2, 4, 6, 8, 10, 12, 16, or more electrodes, or any values therebetween).

The second outside layer 122 can have cutouts 136I and 136J for providing access to the temperature sensor 150. The temperature sensor 150 can be at least partially disposed between the second outside layer 122 and the intermediate layer 120. An electrical pathway of conductive material for the temperature sensor 150 can extend between the cutouts 136I and 136J. The electrical pathway for the temperature sensor 150 can include 10, 20, 30, 40, 50, 60, 70, 80, 90, 100, 110, 120, or more turns, or any values therebetween, or any ranges bounded by these values, although other designs are also possible. The electrical pathway for the temperature sensor 150 can cover an area that is about 10%, about 15%, about 20%, about 25%, about 30%, about 35%, about 40%, about 45%, about 50%, or more of the footprint area of the liquid lens 100. The electrical pathway for the temperature sensor 150 can surround about 10%, about 15%, about 20%, about 25%, about 30%, about 35%, about 40%, about 45%, about 50%, or more of the periphery of the cavity 104. The electrical pathway for the temperature sensor 150 can overlap areas of the liquid lens 100 corresponding to one or two of the driving electrodes 126. The electrical pathway for the temperature sensor 150 can have a path length that is larger than, about 1.5 times, about 2 times, about 3 times, about 5 times, about 10 times, about 15 times, about 20 times, about 25 times, about 30 times, about 35 times, about 40 times, about 45 times, or about 50 times the width or diameter of the cavity 104 (e.g., at the narrow end 105A or the wide end 105B) and/or the length of a side of the liquid lens 100.

The electrical pathway for the temperature sensor 150 can be made of the same material as the driving electrodes 126, the common electrode 124, and/or the heating device 140. In some cases, the electrical pathway for the temperature sensor 150 can be made of a portion of the conductive layer 128 that is electrically isolated from the driver electrode(s) 126, such as by one or more scribes and/or bonds. In some embodiments, the electrical pathway for the temperature sensor 150 can include a different conductive material than the driver electrode(s) 126. The electrical pathway for the temperature sensor 150 can include titanium, gold, Nichrome, platinum, or various other conductive materials.

In some embodiments, the temperature can be determined based on the resistance of the conductive pathway for the temperature sensor 150. As the fluid is heated, some heat will be transferred to the conductive pathway of the temperature sensor 150, and the heat can cause the resistance of the conductive material to change (e.g., increase). Accordingly, the resistance along the conductive pathway for the temperature sensor 150 can be indicative of the temperature (e.g., of the fluid in the liquid lens). In some cases, the resistance of the conductive pathway for the temperature sensor 150 can be determined, such as using a Wheatstone bridge. For example, a bridge can have one or more reference resistors on a first side of the bridge, and can have a variable resistor and the conductive pathway for the temperature sensor with an unknown resistance on a second side of the bridge. The variable resistor can be adjusted until the two sides of the bridge are balance (e.g., no voltage differential between the two sides of the bridge), and the resistance of the conductive pathway for the temperature sensor 150 can be determined based at least in part on the resistance that was applied to the variable resistor to balance the bridge. The temperature (e.g., of the conductive pathway for the temperature sensor 150) can be determined based on the determined resistance. In some cases, the temperature can be determined directly from the resistance applied to the variable resistor, without the intermediate determination of the resistance of the conductive pathway for the temperature sensor 150. Various other types of temperature sensors can be used, as discussed herein.

Figure 14:
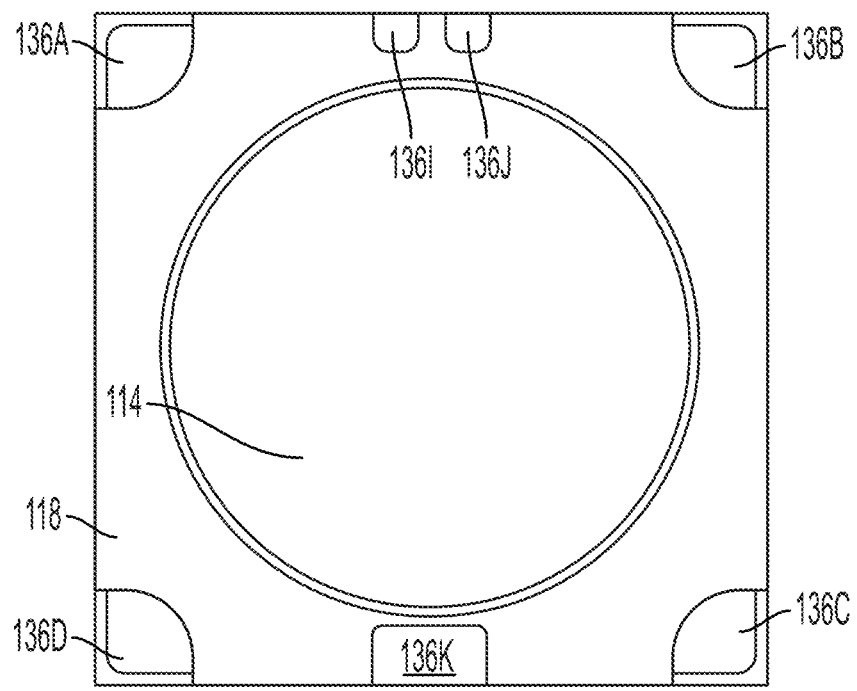
FIG. 14 is a front view of an example embodiment of a liquid lens.
Figure 15:
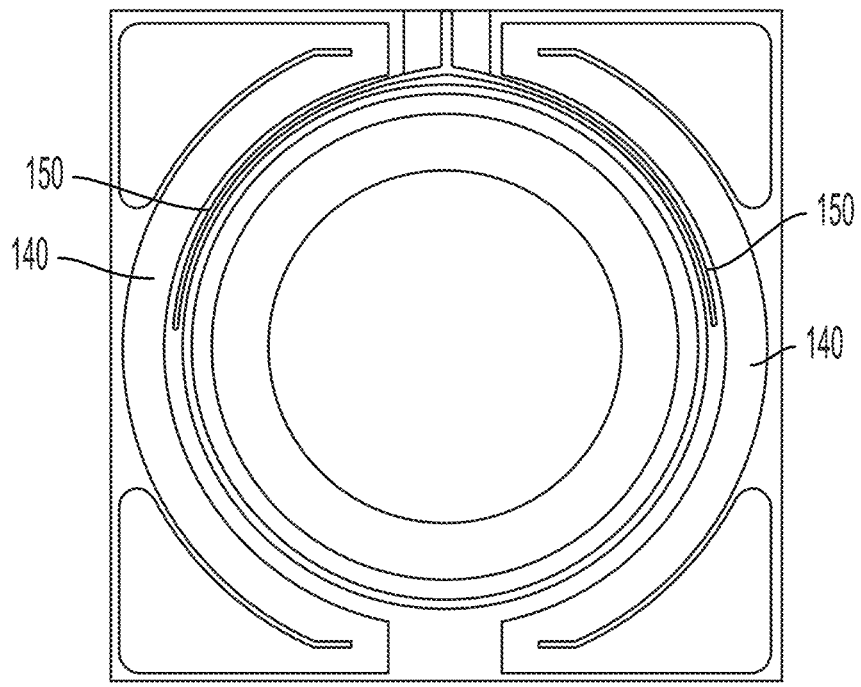
FIG. 15 comprises a front view of an example embodiment of a liquid lens with the first outside layer omitted from view.

In some embodiments, the temperature sensor 150 can be implemented on a front side of the liquid lens 100. At least a portion of the temperature sensor 150 can be between the first outside layer 118 and the intermediate layer 120. FIG. 14 is an example embodiment of a liquid lens 100, which can have the temperature sensor 150 on a front side thereof. FIG. 15 shows the example embodiment with the first outside layer 118 removed to facilitate viewing the inside of the liquid lens 102. The first outside layer 118 can have cutouts 136I and 136J to provide electrical access to the temperature sensor 150. A conductive pathway can extend between the cutouts 136I and 136J, for example similar to the other embodiments disclosed herein, except that the conductive pathway can be between the first outside layer 118 and the intermediate layer 120. In the illustrated example of FIG. 15, the conductive pathway can extend from the cutout 136I, along a first side (e.g., left side of FIG. 15) of the liquid lens 100, then the conductive pathway can turn back along the first side, transition to extend along a second side (e.g., right side of FIG. 15) of the liquid lens for a distance, and then turn back along the second side to the cutout 136J. In the illustrated embodiment, the conduct pathway of the temperature sensor 150 can surround about half of the cavity 104, although other sizes and patterns are possible.

The cutouts 130 discussed herein are not necessarily created by cutting out material, and any recess or absence of material can be used for the cutouts 130 regardless of how the cutouts 130 were formed. For example, the cutouts 130 can be formed in the first outer layer 118 and/or the second outer layer 122 prior to bonding the respective layer to the intermediate layer 120.

Figure 16:
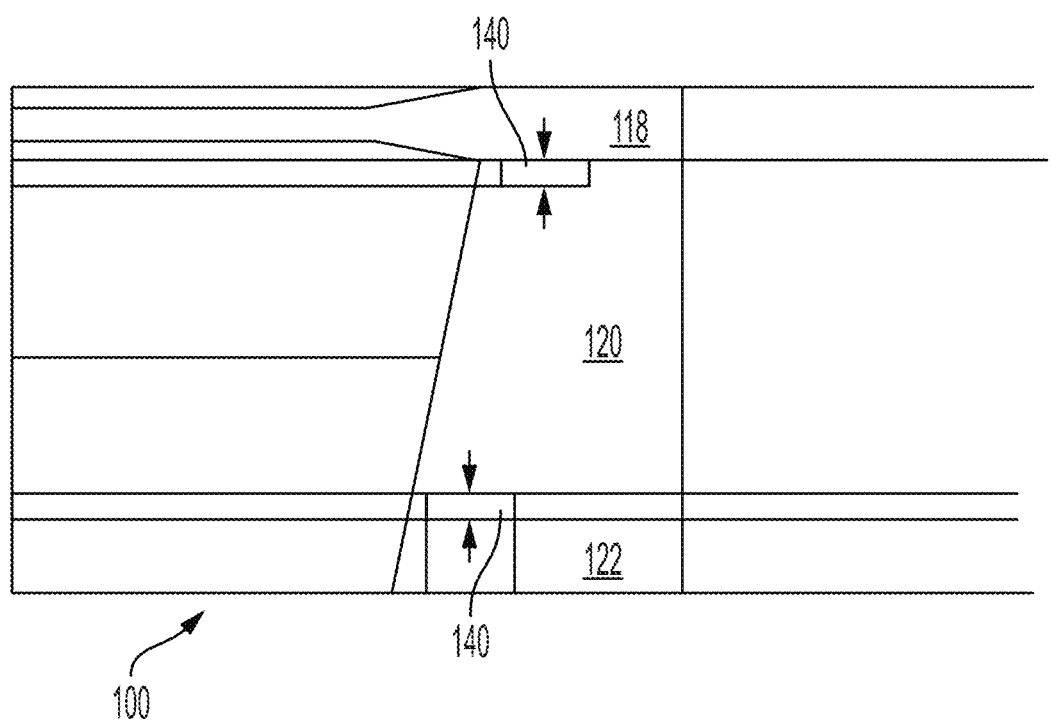
FIG. 16 is a partial cross-sectional view showing another example embodiment of a liquid lens.

With reference to FIG. 16, in some embodiments, the liquid lens 100 can have a first one or more heaters 140 on a front of the liquid lens 100, such as between the first outer layer 118 and the intermediate layer 120, and a second one or more heaters 150 on the back of the liquid lens 100, such as between the second outer layer 122 and the intermediate layer 120. This can facilitate more uniform distribution of the applied heat to the fluids, and can enable the system to apply more heat than if fewer heating devices 140 were used.

Figure 17:
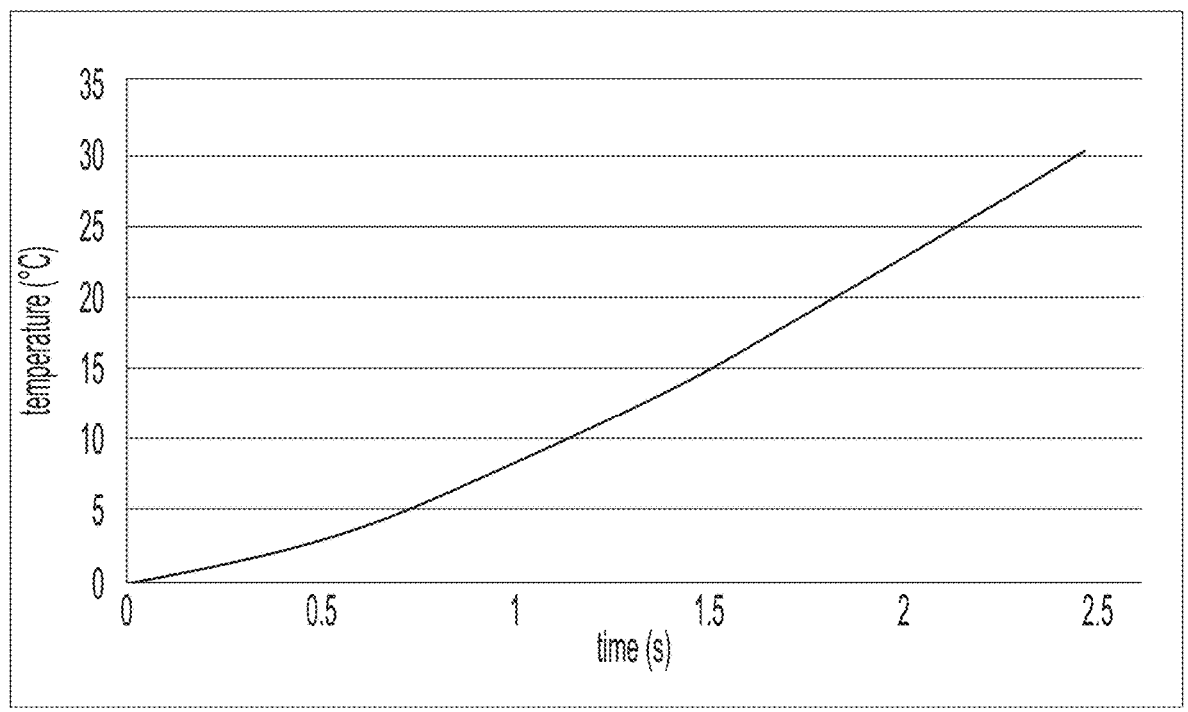
FIG. 17 is a plot showing the temperature in a liquid lens rising as heat is applied.

FIG. 17 is a plot showing the increase in temperature from 0 degrees Celsius to 30 degrees Celsius by applying 400 mW using a heater between the first outside layer 118 and the intermediate layer 120. In this example, it took about 2.5 seconds for the heating device 140 to heat the fluid of the liquid lens 100 from 0 degrees Celsius to 30 degrees Celsius.

Various embodiments and features disclosed herein can be used in combination with the embodiments and features that are disclosed in U.S. Provisional Patent Application No. 62/645,641, filed Mar. 20, 2018, and titled Self-Heating Liquid Lens and Self-Heating Methods for the Same (the '641 Patent Application), which is hereby incorporated by reference. The features disclosed in the '641 Patent Application can be used with the embodiments disclosed in the present application. Similarly, the features disclosed in the present application can be applied to the embodiments of the '641 Patent Application.

Figure 18:
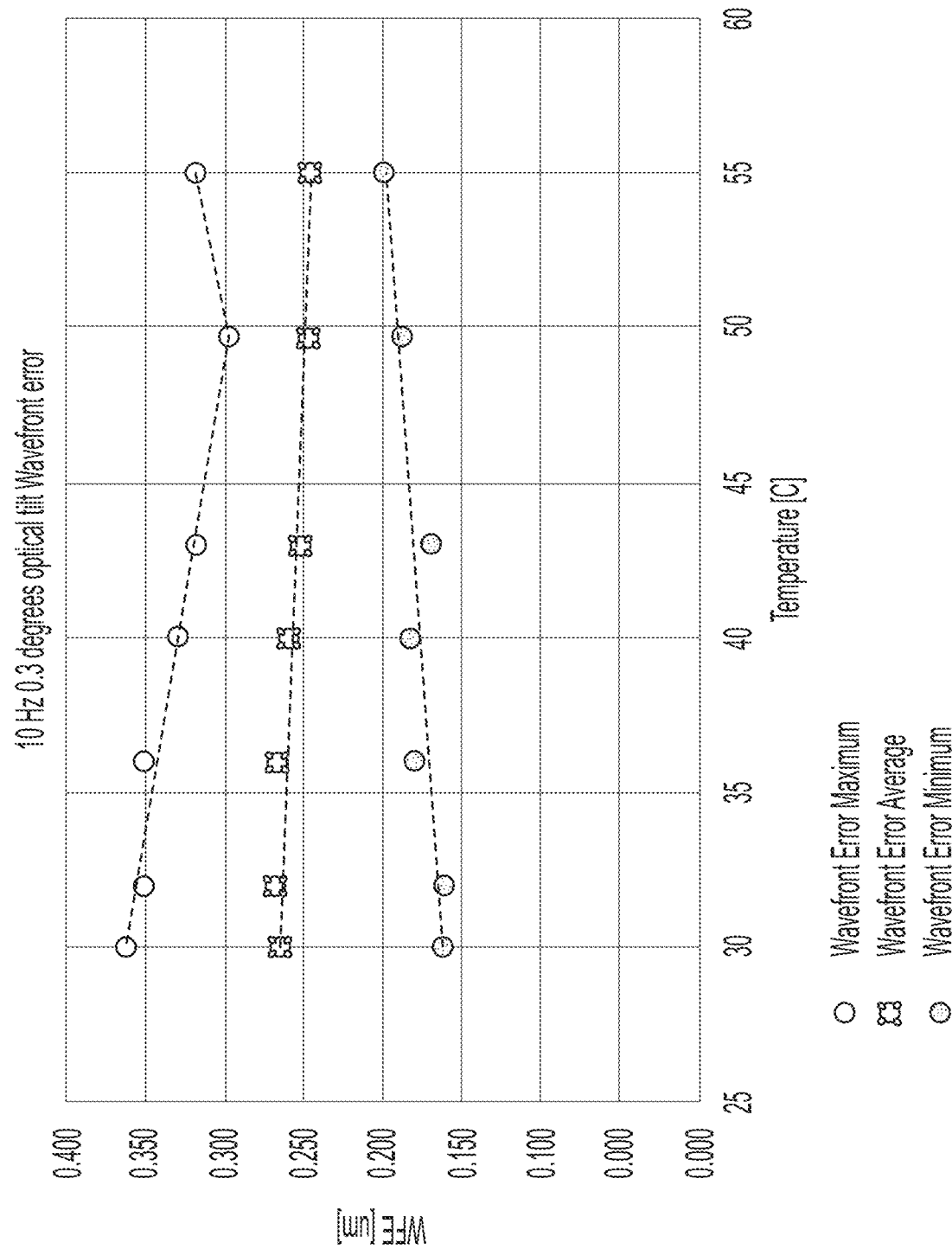
FIG. 18 is a plot showing wavefront error measurements for an example embodiment of a liquid lens at different temperatures.

In some embodiments, heating the liquid lens can reduce optical aberrations and/or wavefront error. FIG. 18 is a plot showing wavefront error measurements taken for an example embodiment of a liquid lens in which the fluid interface is oscillated (e.g., by a cosine wave) at a frequency of 10 Hz, with an optical tilt of about 0.3 degrees. For a single period of oscillation, the minimum wavefront error, the average wavefront error, and the maximum wavefront error were measured. The measurements were taken at various temperatures for the liquid lens between 30 degrees C. and 55 degrees C. As can be seen in FIG. 18, the average wavefront error was reduced as the temperature increased from 30 degrees C. to 55 degrees C.

Without being bound or limited by theory, it is believed that the maximum wavefront error for the period is heavily influenced by coma optical aberration that can peak when the angular velocity of the tilting fluid interface is at the highest, which can occur as the fluid interface crosses the untilted position, in some cases. The side of the fluid interface that is moving downward can have an upward bulge, and the side of the fluid interface that is moving upward can have a downward bulge. The bulges can result from the fluid interface "pumping" the fluid laterally across the liquid lens. The bulging of the fluid interface as it moves can produce a dynamic wavefront error (e.g., coma). It is believed that the minimum wavefront error occurs when relatively little coma optical aberration is produced, which can occur when the fluid interface angular velocity is at the slowest. As the fluid interface approaches the peak tilt amplitude (e.g., to produce 0.3 degrees of optical tilt in this example) the movement of the fluid interface can slow down until the motion of the fluid interface changes direction. As the fluid interface slows down, the bulges in the fluid interface shape can be reduced, which can result in less coma aberration, and reduced wavefront error. Accordingly, the difference between the minimum wavefront error and the maximum wavefront error can correlate to the amount of coma optical aberration, in this example. Other optical aberrations, such as trefoil, can be present, and can vary based on the position of the fluid interface, accordingly, the difference between the maximum and minimum wavefront errors may not correspond directly or perfectly to the amount of coma optical aberration, but a general correlation is believed to exist between the amount of coma optical aberration and the difference between the maximum and minimum wavefront errors in the example of FIG. 18. In some cases, dynamic wavefront error (e.g., resulting from the motion of the fluid interface) can be at a maximum when the fluid interface is moving most rapidly, and the dynamic wavefront error can be at a minimum when the fluid interface is stopped or the motion is slowest. Accordingly, the different between the maximum total wavefront error and the minimum total wavefront error can be indicative, in some cases, of how much of the wavefront error is attributable to the dynamic wavefront error (which can include coma, for example).

As can be seen in FIG. 18, the amount of coma optical aberration can be reduced as the temperature of the liquid lens is increased, such as using a heater, as disclosed herein. At 30 degrees C., the difference between the maximum and minimum wavefront errors is about 200 nm. At 32 degrees C. the difference between the maximum and minimum wavefront errors is about 190 nm. At 36 degrees C. the difference between the maximum and minimum wavefront errors is about 172 nm. At 40 degrees C. the difference between the maximum and minimum wavefront errors is about 147 nm. At 43 degrees C. the difference between the maximum and minimum wavefront errors is about 149 nm. At 49.7 degrees C. the difference between the maximum and minimum wavefront errors is about 110 nm. At 55 degrees C. the difference between the maximum and minimum wavefront errors is about 118 nm. At 32 degrees C. the difference between the maximum and minimum wavefront errors is about 190 nm. Accordingly, as the temperature of the liquid lens was increased from 30 degrees C. to 50 degrees C., the dynamic wavefront error (e.g., coma) decreased by about 45%. The average wavefront error was reduced from about 265 nm to about 245 nm when the temperature was increased from 30 degrees C. to 55 degrees C. The maximum wavefront error was decreased from about 363 nm to about 297 nm when the temperature was increased from 30 degrees C. to 50 degrees C.

FIG. 18 shows that increasing the temperature from 50 degrees C. to 55 degrees C. caused the total wavefront error to increase. Without being bound or limited by theory, it is believed that increasing the temperature beyond a threshold amount can cause the viscosity of the fluids to be reduced to the point that the fluid interface overshoots the target location. The threshold temperature can depend on the properties of the fluids used.

The heater can be used to raise the temperature of the liquid lens to a temperature or range of temperatures, such as using a feedback control system and a temperature sensor. The heater can raise the temperature to about 30 degrees C., about 32 degrees C., about 34 degrees C., about 34 degrees C., about 36 degrees C., about 38 degrees C., about 40 degrees C., about 42 degrees C., about 44 degrees C., about 46 degrees C., about 48 degrees C., about 50 degrees C., about 52 degrees C., about 54 degrees C., about 56 degrees C., about 58 degrees C., about 60 degrees C., or any values therebetween, or any ranges bounded by any combination of these values.

The temperature can also affect (e.g., reduce) the static wavefront error (e.g., optical aberrations that are produced by the driven shape of the fluid interface without motion of the fluid interface). The static wavefront error can include trefoil in some embodiments.

In some embodiments, using additional driving electrodes can reduce the static wavefront error (e.g., including trefoil). For example, additional driving electrodes can provide more control over the fluid interface, and can result is smaller voltage steps between adjacent electrodes, which can reduce the wavefront error. For example, by using 8 driving electrodes, a liquid lens can be made having trefoil wavefront error of about 10 nm, about 12 nm, about 15 nm, about 20 nm, about 25 nm, about 30 nm or less, or any values therebetween, or any ranges bounded by any combination of these values. By heating the liquid lens, the dynamic wavefront error (e.g., coma) can be plus or minus about 30 nm, about 35 nm, about 40 nm, about 45 nm, about 50 nm, about 55 nm, about 60 nm, about 65 nm, about 70 nm or any values therebetween, or any ranges bounded by any combination of these values.

A liquid lens 100 can include one or more heaters 140 (sometimes referred to as heating devices) between the intermediate layer 120 (e.g., having truncated cone structure) and the first outer layer 118 (e.g., an upper window), or between the intermediate layer 120 and the second outer layer 122 (e.g., lower window), or both. A liquid lens can include one or more temperature sensors 150 between the intermediate layer 120 and the first outer layer 118, or between the intermediate layer 120 and the second outer layer 122, or both. In some embodiments, a heater 140 and a temperature sensor 150 can be disposed side-by-side, and can be formed from the same layer of material, such as in FIGS. 14 and 15. In some embodiments, a heater 140 and a temperature sensor 150 can be disposed at different layers. This can impede the temperature sensor 150 from reading artificially higher temperatures due to the close proximity to the heater 140. This can also provide more area for the heater 140 and/or the temperature sensor 150, as compared to side-by-side configurations.

The liquid lens 100 can have a truncated cone structure having a wide end (e.g., between the intermediate layer 120 and the first outer layer 118) and a narrow end (e.g., between the intermediate layer 120 and the second outer layer 122), as can be seen in FIG. 1. The narrow end can provide more area for the heater 140 or temperature sensor 150 than the wide end. In some cases, the one or more heaters 140 can be disposed at, or closer to, the wide end of truncated cone (e.g., between the intermediate layer 120 and the second outer layer 122), and the temperature sensor 150 can be disposed at, or closer to, the narrow end of the truncated cone (e.g., between the intermediate layer 120 and the first outer layer 118). A heater 140 that covers a larger area can provide faster heating to the liquid lens. The one or more heaters 140 can cover about 20%, about 25%, about 30%, about 35%, about 40%, about 45%, about 50%, about 55%, about 60%, about 65%, about 70%, about 75%, about 80%, about 85%, or about 90% of the footprint area of the liquid lens 100, or any values therebetween, or any ranges bounded by any combination of these values.

The heater 140 can have a current path length (e.g., from a first contact, such as at cutout 136A, to a second contact, such as at cutout 136D, in FIG. 14), which can be longer than a length of a side of the liquid lens 100. The heater current path length can be about 50%, about 75%, about 90%, about 100%, about 110%, about 120%, about 130%, about 140%, about 150%, about 175%, about 200%, about 225%, about 250%, about 275%, about 300%, of the side length of the liquid lens. The temperature sensor 150 can have a current path length (e.g., from a first contact, such as at cutout 136I, to a second contact, such as at cutout 136J) that can be about 25%, about 50%, about 75%, about 90%, about 100%, about 110%, about 120%, about 130%, about 140%, about 150%, about 175%, about 200%, about 225%, about 250%, about 275%, about 300%, about 350%, about 400%, about 500%, about 600%, about 700%, about 800%, about 900%, about 1,000%, about 1,250%, about 1,500%, about 1,750%, about 2,000%, about 2,500%, about 3,000%, about 3,500%, about 4,000%, about 4,500%, about 5,000% of the side length of the liquid lens, or any values therebetween, or any ranges bounded by any combination of these values.

Figure 19:
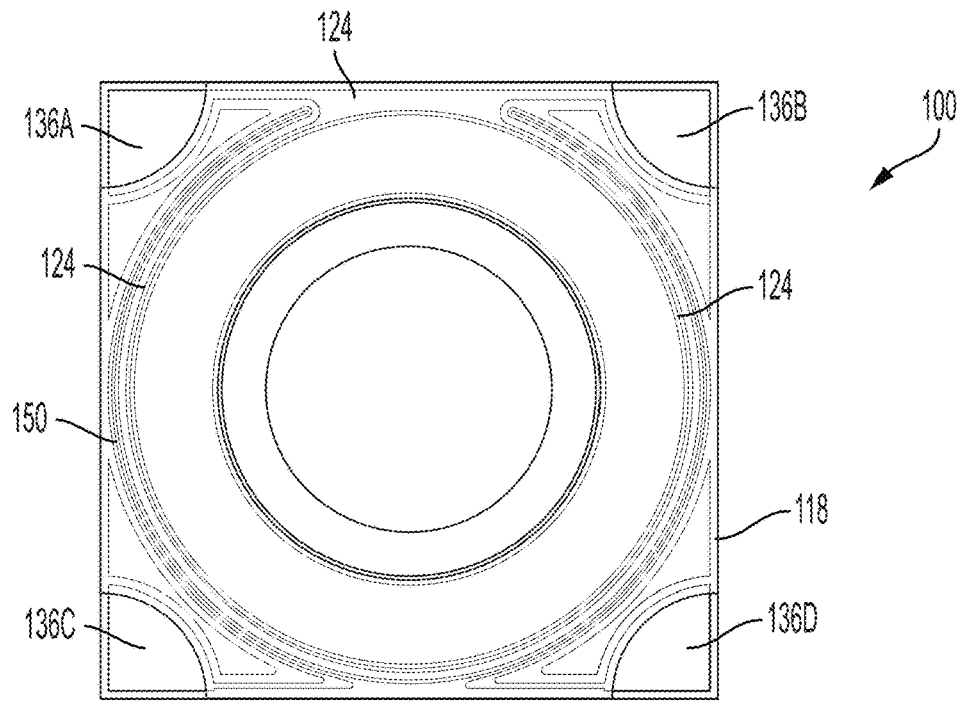
FIG. 19 shows an example embodiment of a liquid lens having a temperature sensor.

FIG. 19 is a top-down view of an example embodiment of a liquid lens 100. In FIG. 19, the first outer layer 118 (e.g., upper window) is transparent so that underlying components are visible. The first outer layer 118 can have openings 136A, 136B, 136C, and 136D, which can be cutouts, and which can be positioned at the corners of the first outer layer 118. The liquid lens 100 can have a common electrode 124, which can be electrically accessible through either or both of the openings 136A and 136B. The common electrode 124 can be in electrical communication with the first fluid 106 (e.g., a polar fluid or electrically conductive fluid, such as an aqueous solution). In some cases, the common electrode 124 can extend around the periphery of the cavity, and the contact area between the common electrode 124 and the first fluid 106 can extend around some or all of the circumference of the cavity.

The liquid lens can have a temperature sensor 150. The temperature sensor 150 can be electrically accessible through the openings 136C and 136D. At opening 136C the temperature sensor 150 can receive input signals (e.g., voltage), and at opening 136D the temperature sensor 150 can be electrically coupled to ground. A conductive path can extend from the opening 136C to the opening 136D. Various conductive paths can be used. For example, as shown in FIG. 19, the conductive path can extend from the input contact (e.g., at opening 136C) towards the output contact (e.g., at opening 136D), can turn (e.g., by more than 90 degrees) and extend away from the output contact, can follow a path (e.g., curved) outside the periphery of the cavity to the side of the liquid lens opposite the first and second contacts, can turn (e.g., by about 180 degrees) and extend back along the outside of the periphery of the cavity, passing the first contact, passing the second contact, and extending along the other side along the outside of the periphery of the cavity to the side of the liquid lens opposite the first and second contacts, can then turn (e.g., by about 180 degrees) and extend back along the outside of the periphery of the cavity, past the second contact, can turn (e.g., by more than 90 degrees), and can extend to the second contact. The sensor can have an omega shape. Various other sensor conductive paths are possible, with some examples described and shown herein.

In some instances, the conductive material of the electrode 124 (or the first fluid 106 that is in electrical contact with the electrode 124) can be sufficiently close to the conductive material of the temperature sensor 150 that crosstalk can occur between the signals of the electrode 124 and the temperature sensor 150. For example, capacitive coupling, inductive coupling, and/or direct coupling can occur between the electrode 124 and the temperature sensor 150. In some cases, current can flow between the electrode 124 (or the first fluid 106) and the temperature sensor 150. In some cases, the electrode 124 (or the first fluid 106) and the temperature sensor 150 can form an effective capacitor. The electrode 124 and the temperature sensor 150 can form a coplanar capacitor. The electrode 124 and the temperature sensor 150 can be formed of the same conductive material, or can be formed from the same layer (e.g., conductive layer 128), such as with an insulating material or area (e.g., a scribe) disposed between the electrode 124 and the temperature sensor 150.

The electrodes 124 and 126 can be ungrounded. The driving signals delivered to the electrodes 124 and 126 can float relative to ground. The voltage differentials between the electrodes 124 and 126 can control the liquid lens, regardless of how the voltages applied to the electrodes 124 and 126 compares to ground, or to the voltages applied to the temperature sensor 150. Accordingly, in some instances a significant voltage differential can exist between the electrode 124 and the temperature sensor 150. In some embodiments, the temperature sensor 150 can be grounded. For example, input signals can be delivered to the contact at opening 136C and the contact at opening 136D can be coupled to ground. The grounded temperature sensor 150 can create a path to ground for the crosstalk signal. This can result in current flowing through the electrode 124, transferring via crosstalk to the temperature sensor, and then flowing to ground. The current can cause electrolysis in the first fluid. The first fluid can be an aqueous solution. The electrolysis can separate the water into hydrogen and oxygen. The oxygen can react with the metal inside the chamber (e.g., the contact area between the electrode 124 and the first fluid 106), which can produce an oxide, which in some instances and impede the transfer of signals from the electrode 124 to the first fluid 106 and can therefore interfere with the operation of the liquid lens 100. The hydrogen can form a bubble in the chamber of the liquid lens 100. The bubble can degrade optical performance, such as by refracting light in undesired directions. The bubble can cause pressure to increase inside the liquid lens, for example as temperature increases in the liquid lens. In some cases, increased pressure can cause the liquid lens 100 to burst. The current produced by crosstalk can interfere with operation of the temperature sensor 150. For example, incorrect temperature measurements can result due to the crosstalk signals.

Figure 20:
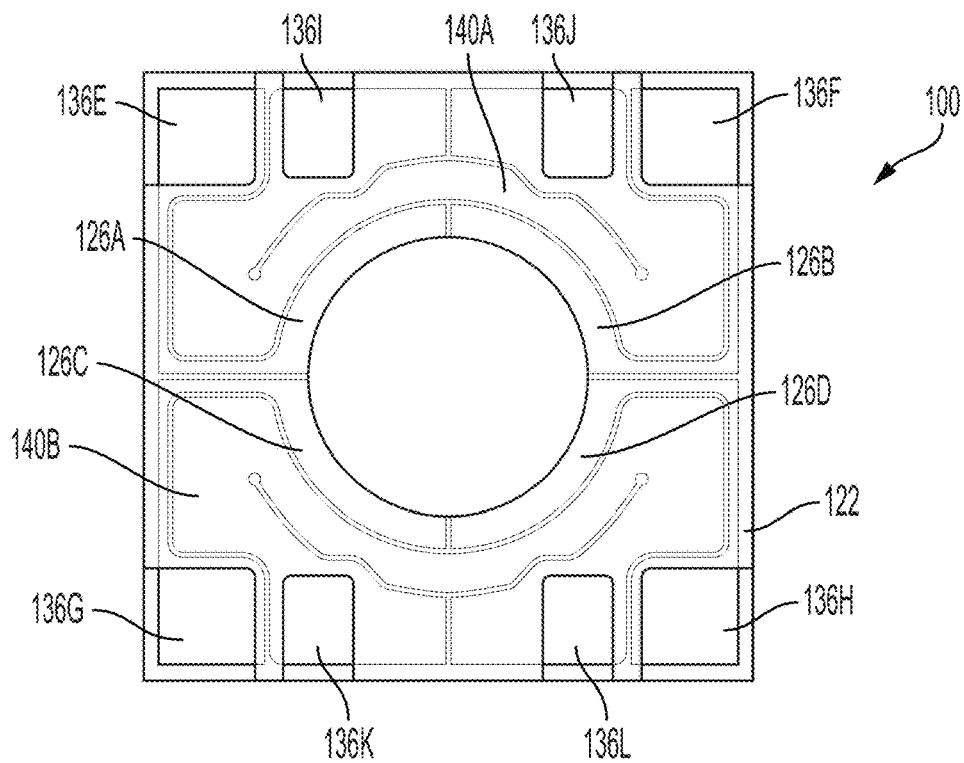
FIG. 20 shows an example embodiment of a liquid lens having a heater.

FIG. 20 is a bottom-up view of the example embodiment of a liquid lens 100. In FIG. 20, the second outer layer 122 (e.g., lower window) is transparent so that underlying components are visible. The liquid lens 100 can have one or more electrodes 126 for driving the liquid lens 100. In FIG. 20, the liquid lens has four driving electrodes 126A, 126B, 126C, and 126D, which can be positioned at four quadrants of the liquid lens, as discussed herein. The driving electrodes 126A-D can be accessible via openings 136E-H (e.g., cutouts in the second outer layer 122 or lower window) respectively. The liquid lens 100 can have one or more heaters 140. In FIG. 20, the liquid lens has two heaters 140A and 140B. The heaters 140A and 140B can be similar to the other heater embodiments disclosed herein. The heater 140A can be accessible via openings 136I and 136J, and the heater 140B can be accessible via the opening 136K and 136L (which can be cutouts in the second outer layer 122). In some embodiments, the heaters 140A and 140B can be grounded, for example, similar to the temperature sensor 150. For example input signals to the heater 140A can be delivered through the contact at opening 136I, and the contact at the opening 136J can be coupled to ground. Various other designs are possible. For example, in some cases a single heater 140, or any suitable number of heaters 140, can be used.

Similar to the discussion above regarding crosstalk between the electrode 124 and the temperature sensor 150, in some cases, the heater 140 can be sufficiently close to the one or more electrodes 126 that crosstalk can occur between the signals of the one or more electrodes 126 and the heater 140. For example, capacitive coupling, inductive coupling, and/or direct coupling can occur between the one or more electrodes 126 and the heater 140. In some cases, current can flow between the one or more electrodes 126 and the heater 140. In some cases, the one or more electrodes 126 and the heater 140 can form an effective capacitor. The one or more electrodes 126 and the heater 140 can form a coplanar capacitor. The one or more electrodes 126 and the heater 140 can be formed of the same conductive material, or can be formed from the same layer (e.g., conductive layer 128), such as with an insulating material or area (e.g., a scribe) disposed between the one or more electrodes 126 and the heater 140. Similar to the discussion herein, the crosstalk can cause current to flow between the one or more electrodes 126 and the heater 140, especially when the heater 140 is grounded so that a pathway to ground is provided to the crosstalk signal. The crosstalk can interfere with operation of the liquid lens 100 and the heater 140. For example, the heater can run at undesired times because of the current produced by the crosstalk. Also, the driver signals can be misapplied to the liquid lens because of the crosstalk with the heater or the temperature sensor.

The embodiments of FIGS. 19 and 20 were discussed as having a temperature sensor 150 at an upper portion of the liquid lens 100, and a heater 140 at a lower portion of the liquid lens 100. This approach can be advantageous to provide more surface area for the heater 140. However, various other designs can be used. The positions of the heater 140 and temperature sensor 150 can be switched, or one or both of the temperature sensor 150 and heater 140 can be omitted. Accordingly, crosstalk can occur between the electrode 124 and either a heater or temperature sensor, and crosstalk can occur between the one or more electrodes 126 and either a heater or temperature sensor.

By way of example, the heater 140 and/or temperature sensor 150 can be driven by a 2.8 volt alternating current (AC) signal. One terminal can be grounded, as discussed herein. The electrodes 124 and 126 can be driven by a 70 volt AC signal, which can float relative to ground. A resistance between the heater 140 or sensor 150 and the electrodes 124 and/or 126 can allow current to flow from the electrodes 124 and/or 126 to ground. In some cases, crosstalk can occur by direct coupling. In some cases, driving the 70 volt AC signal on the electrodes 124 and/or 126 can induce an AC voltage in the heater 140 and/or sensor 150. In some cases, crosstalk can occur by capacitive coupling or inductive coupling. Various different voltages can be used for driving the liquid lens electrodes, heater, and/or temperature sensor. The liquid lens driving signals can have a voltage that is higher than the voltage for operating the heater 140 and/or temperature sensor 150, such as by about 2 time, about 3 times, about 4 times, about 5 times, about 7 times, about 10 times, about 15 times, about 20 times, about 25 times, about 30 times, about 40 times, about 50 times, about 60 times, about 70 times, about 80 times, about 90 times, about 100 times, or more, or any values therebetween, or any ranged bounded therein, although other voltages outside these ranges could also be used. It will be understood that in some cases, crosstalk can still occur if the heater and/or the temperature sensor are not grounded. In some cases, the path to ground can increase the severity of the crosstalk.

Various liquid lenses and systems disclosed herein can be configured to impede, reduce, or remove the crosstalk, and/or the effects thereof. In some embodiments, the electrodes 124 and/or 126 can be sufficiently insulated from the heater 140 and/or temperature sensor 150 so that the crosstalk is impeded. In some embodiments, the size of the common electrode 124 can be reduced, as compared to prior approaches, which can impede crosstalk. In some embodiments, the size of the contact area between the common electrodes 124 and the first fluid can be reduced, as compared to prior approaches, which can impede the crosstalk and/or the resulting electrolysis. In some cases, the heater and/or temperature sensor can be ungrounded, which can reduce or impede the crosstalk. In some cases, the heater and/or temperature sensor can be AC coupled to ground, which can impede the crosstalk current from flowing to ground. The liquid lens driver can use one or more snubbers to produce driving signals that cause less crosstalk. The liquid lens driver can use a sine wave, or a rounded rectangle wave, which can produce less crosstalk, such as compared to a rectangle wave. Various approaches for reducing, impeding, or removing crosstalk are discussed in detail herein. The various approaches disclosed can be used independently, or in any suitable combination.

In some embodiments, the electrodes 124 and/or 126 can be insulated from the temperature sensor 150 and/or heater 140 by an insulator resistance of about 0.1 gigaohms, about 0.2 gigaohms, about 0.3 gigaohms, about 0.4 gigaohms, about 0.5 gigaohms, about 0.6 gigaohms, about 0.75 gigaohms, about 1 gigaohm, about 1.25 gigaohms, about 1.5 gigaohms, about 1.75 gigaohms, about 2 gigaohms, about 2.5 gigaohms, about 3 gigaohms, about 4 gigaohms, about 5 gigaohms, about 6 gigaohms, about 7 gigaohms, about 8 gigaohms, about 9 gigaohms, about 10 gigaohms, about 12 gigaohms, about 15 gigaohms, about 17 gigaohms, about 20 gigaohms, about 25 gigaohms, about 50 gigaohms, about 75 gigaohms, about 100 gigaohms, or any values therebetween, or any ranges bounded by any combination of these values, although other values can be used, such as depending on the size of the liquid lens. In some cases, the liquid lens 100 can have a footprint area of about 4 mm squared, about 5 mm squared, about 7 mm squared, about 10 mm squared, about 12 mm squared, about 15 mm squared, about 17 mm squared, about 20 mm squared, about 25 mm squared, about 30 mm squared, about 35 mm squared, about 40 mm squared, about 50 mm squared, about 75 mm squared, about 100 mm squared, about 125 mm squared, about 150 mm squared, about 175 mm squared, about 200 mm squared, about 250 mm squared, about 300 mm squared, about 350 mm squared, about 400 mm squared, about 500 mm squared, or any values therebetween, or any ranges bounded by any of these values, although other sizes of liquid lenses can be used, such as for larger industrial applications.

Figure 21:
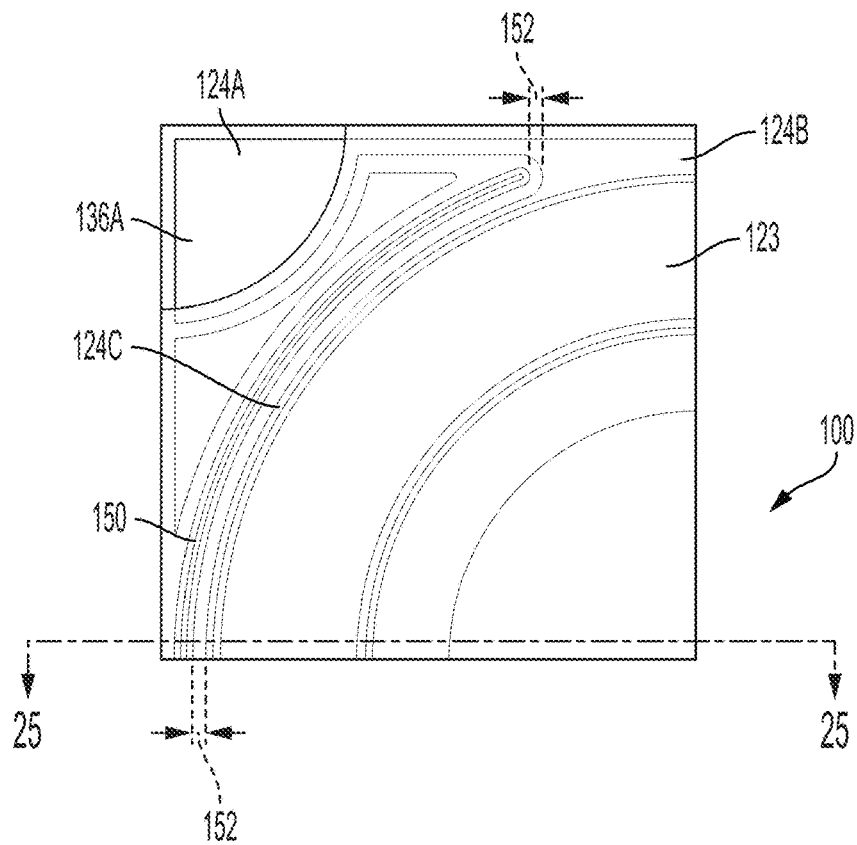
FIG. 21 shows a detailed view of the embodiment of FIG. 19.
Figure 22:
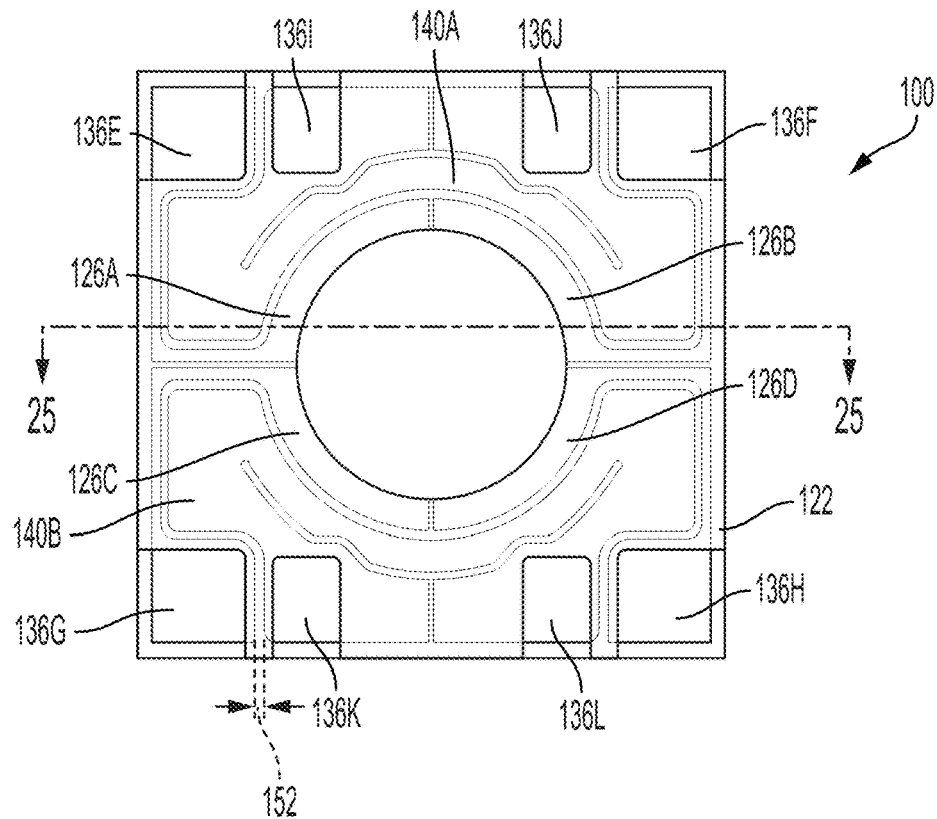
FIG. 22 shows an example embodiment of a liquid lens having a heater.

FIG. 21 shows a detailed view of a portion of FIG. 19. As shown in FIG. 21, the electrode 124 can be separated from the temperature sensor 150 by gap having a distance 152. Similarly, with reference to FIG. 22, the one or more electrodes 126 can be separated from the one or more heaters 140 by a distance 154. The distances 152 and 154 can be the same or different. In FIG. 22, a larger gap distance 154 is used as compared to FIG. 20. For example, the embodiment of FIG. 20 can use a gap distance 154 of 30 microns, while the embodiment of FIG. 22 can use a gap distance 154 of 60 microns. In some cases, the insulating gaps between the electrodes 126A-D and/or between ends of the heaters 140 can use gap distances of the same sizes discussed in connection with the gap distances 152 and 154. The gap distance 152 and/or 154 can be about 10 microns, about 15 microns, about 20 microns, about 25 microns, about 30 microns, about 35 microns, about 40 microns, about 45 microns, about 50 microns, about 60 microns, about 70 microns, about 80 microns, about 90 microns, about 100 microns, about 120 microns, about 140 microns, about 150 microns, about 160 microns, about 180 microns, about 200 microns, about 225 microns, about 250 microns, about 275 microns, about 300 microns, about 350 microns, about 400 microns, about 450 microns, about 500 microns, or any values therebetween, or any ranges bounded thereby, although other distances can be used. In some areas, such as between the contact for the electrode 124 (e.g., at opening 136A) and the sensor 150, the gap distance can be greater than at other areas. In some embodiments, no portion of the temperature sensor 150 is within less than the gap distance 152 of the electrode 124. In some embodiments, no portion of the heater 140 is within less than the gap distance 154 of the one or more electrodes 126. The gap distances 152 and 154 can define a minimum separation distance between the electrodes 124 and/or 126 and the temperature sensor 150 and/or the heater 140.

In some cases, some or all of the heater 140, the one or more electrodes 126, the temperature sensor 150, and the electrode 124, can be formed from the material, and/or from the same layer, such as conductive layer 128. For example, the conductive layer 128 can be formed on the intermediate layer 120 (e.g., glass), such as on the top, bottom, and side thereof. Then the conductive layer 128 can be divided into different areas to form the heater 140, the one or more electrodes 126, the temperature sensor 150, and/or the electrode 124. Insulating gaps can separate the areas of the conductive material 128. In some embodiments, scribes can separate the areas of the conductive material 128. In some embodiments, one or more bonds can separate the areas of the conductive material 128, such as to isolate the heater 140, the one or more electrodes 126, the temperature sensor 150, and/or the electrode 124, from each other. In some embodiments, the bonds can be laser bonds, for example, as described in U.S. Pat. Nos. 9,492,990, 9,515,286, and/or 9,120,287, the entirety of which are incorporated herein by reference. The laser bonds can electrically isolate the areas of the conductive material by diffusing the conductive material 128 into the adjacent layers (e.g., layers 118, 120, and/or 122, which can be glass or any other suitable material) of the liquid lens along the bond path, by ablating the conductive layer 128 along the bond path, or by another suitable mechanism) while also bonding or coupling the adjacent layers of the liquid lens (e.g., layers 118, 120, and/or 122) to each other. In some embodiments, the laser bonding can form an electrically isolating bond (e.g., a hard bond). In some embodiment, the laser bonding can form a structural bond that does not form electrical isolation (e.g., a soft bond). For example, in some cases, enough of the conductive material can be left undiffused or unablated so that electrical conductivity can be preserved across the bond (e.g. a soft bond). In some cases, the laser bonds can be performed at room or ambient temperature. Laser bonding (e.g., hard bonds) can be used to form the insulating gaps with distances 152 and/or 154.

With reference to FIGS. 19 and 21, in some embodiments, the electrode 124 can be isolated to only portions of the area outside the sensor 150. For example, laser bonding (e.g., hard bonds) can contain the electrode 124 to areas that are spaced away from the sensor 150. The sensor can have a first side that extends up and back along a first side of the liquid lens, and the sensor can have a second side that extends up and back along the second side of the liquid lens. The two turn-around locations of the conductive path of the sensor 150 can be spaced apart. The conductive path of the sensor can extend around about 180 degrees, about 210 degrees, about 240 degrees, about 270 degrees, about 300 degrees, about 315 degrees, about 330 degrees, about 345 degrees, about 350 degrees, about 355 degrees, or any values or ranges bound therein. A gap between the conductive path portions of the sensor 150 can be positioned at the remaining area of the circumference. The electrode 124 can extend through the gap between the conductive path portions of the sensor 150. The electrode 124 can extend around some or all of the circumference along a path that is radially inward of the sensor 150. In some embodiments, the electrode 124 can be positioned radially outward of the sensor 150 across a limited area. For example, in FIGS. 19 and 21, the electrode 124 extends from the contact at opening 136A to the gap between the conductive path portions of the sensor 150 along an area that is radially outward of the sensor 150. The electrode 124 can be positioned radially outward of the sensor 150 across 0 degrees, about 5 degrees, about 10 degrees, about 15 degrees, about 20 degrees, about 25 degrees, about 30 degrees, about 40 degrees, about 45 degrees, about 50 degrees, about 60 degrees, about 70 degrees, about 80 degrees, about 90 degrees, about 100 degrees, about 120 degrees, about 140 degrees, about 160 degrees, about 180 degrees, about 200 degrees, about 250 degrees, about 300 degrees, or any values therebetween, or any ranges bounded thereby, although other configurations are possible. In some embodiments, the electrode 124 can be closer to the temperature sensor 150 on the radially inward side of the temperature sensor 150 than on the radially outward side of the temperature sensor.

Figure 23:
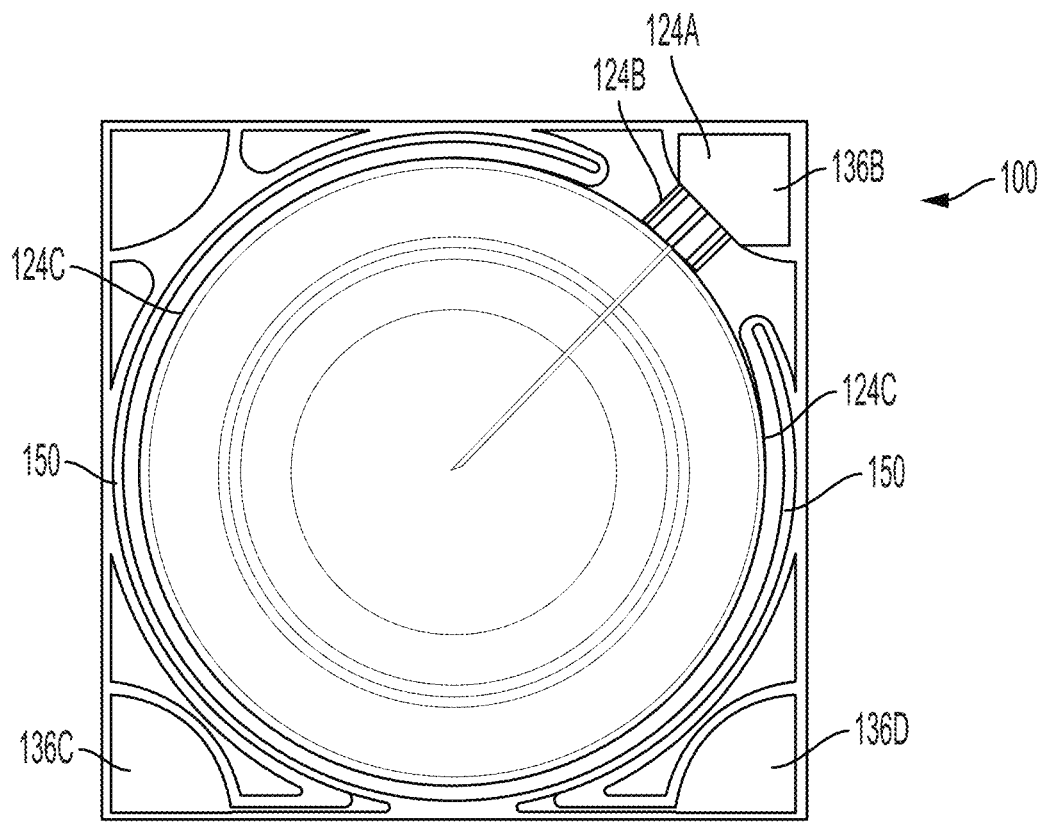
FIG. 23 shows an example embodiment of a liquid lens having a temperature sensor and common electrode.

With reference to FIG. 23, in some embodiments, electrode 124 has no portion that is radially outward of the sensor 150. For example, the contact area (e.g., at opening 136B) can be radially outward of the gap between the conductive path portions of the sensor 150. In FIG. 13, the opening 136A can be omitted, and the electrode 124 can be electrically accessible through a single contact (e.g., at opening 136B). The conductive path arms of the sensor 150 can be asymmetrical. For example, one conductive path arm can be longer than the other conductive path arm. In FIG. 23, for example, a left conductive path arm extends around more than 180 degrees of the liquid lens, while a right conductive path arm extends around about 120 degrees of the liquid lens. One conductive path arm can be longer than the other by about 5%, about 10%, about 15%, about 20%, about 25%, about 30%, about 35%, about 40%, about 50%, about 55%, about 60%, or any values therebetween, or any ranges bounded thereby.

The electrode 124 include a contact portion 124A, which can provide electrically accessibility to an outside component or system (e.g., a driver). The contact portion 124A can be a coupling pad. The contact portion 124A can be exposed by an opening 136B (e.g., a cutout) in the first outside layer 118. In FIG. 19, multiple contact portions 124A can be used. The electrode 124 a fluid contact portion 124C that is in electrical communication with the first fluid 106. The electrode 124 can include one or more lead portions 124B that couple the contact portion 124A to the fluid contact portion 124C. In FIG. 23, six contact portions are shown. Although one, two, four, or any suitable number of contact portions can be used. In some cases, the width of the contact portion 124A can extend radially inward for form the lead portion 124B and/or the fluid contact portion 124C, similar to FIG. 24.

Figure 24:
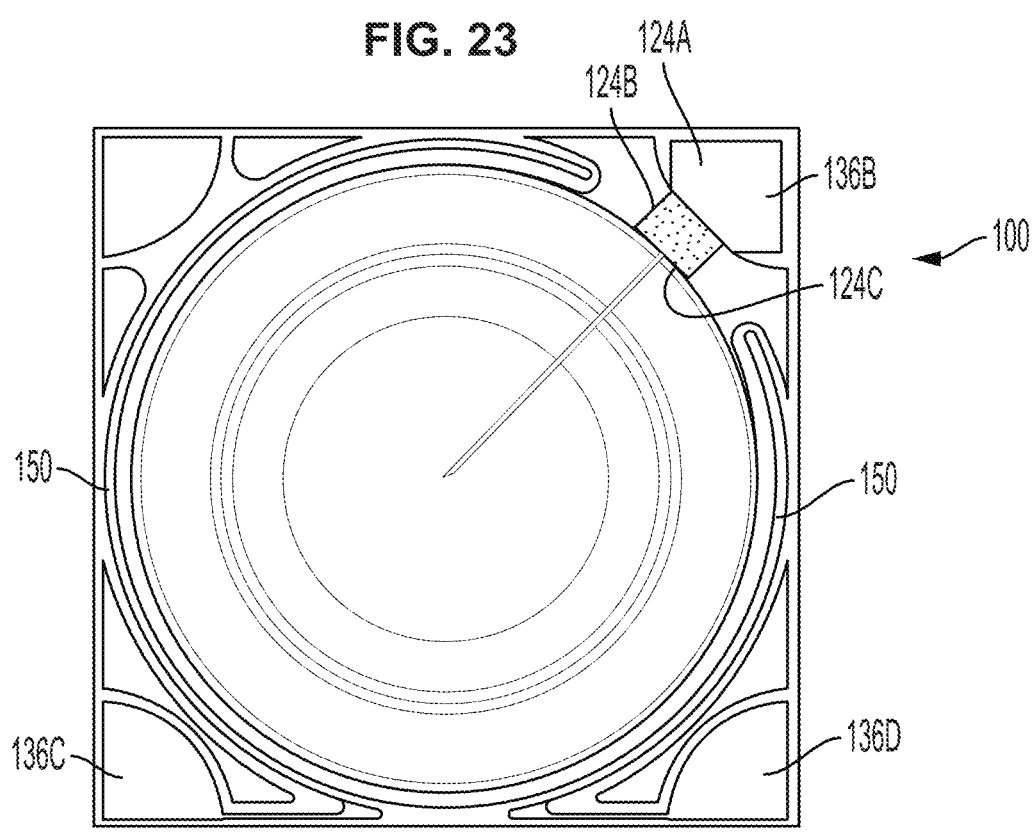
FIG. 24 shows an example embodiment of a liquid lens having a temperature sensor and common electrode.

In FIG. 23, the fluid contact portion 124C of the electrode 124 extends the full 360 degree circumference around the cavity. In FIG. 24, the fluid contact portion 124C of the electrode 124 extends around less than the full 3690 degree circumference. The fluid contact portion 124C of the electrode 124 can extend around about 1 degree, about 2 degrees, about 5 degrees, about 10 degrees, about 15 degrees, about 20 degrees, about 25 degrees about 30 degrees, about 45 degrees, about 60 degrees, about 90 degrees, about 120 degrees, about 150 degrees, about 180 degrees, about 210 degrees, about 240 degrees, about 270 degrees, about 300 degrees, about 330 degrees, or 360 degrees, or any values therebetween, or any ranges bounded therein. In some embodiments, the electrode 124 can cover an area that is about 25% or less, about 20% or less, about 15% or less, about 10% or less, about 7% or less, about 5% or less, about 3% or less, about 2% or less, about 1% or less, or about 0.5% or less, of the footprint area of the liquid lens, or any value therebetween, or any ranges bounded therein. In some embodiments, the fluid contact area between the electrode 124 and the first fluid can cover an area that is about 10% or less, about 7% or less, about 5% or less, about 3% or less, about 2% or less, about 1% or less, about 0.5% or less, about 0.4% or less, about 0.3% or less, about 0.2% or less, about 0.1% or less, about 0.075% or less, about 0.05% or less, about 0.025% or less, about 0.01% or less, of the footprint area of the liquid lens, or any value therebetween, or any ranges bounded therein. In some cases, reducing the contact area between the electrode 124 and the first fluid 106 can reduce or impede electrolysis.

Figure 25:
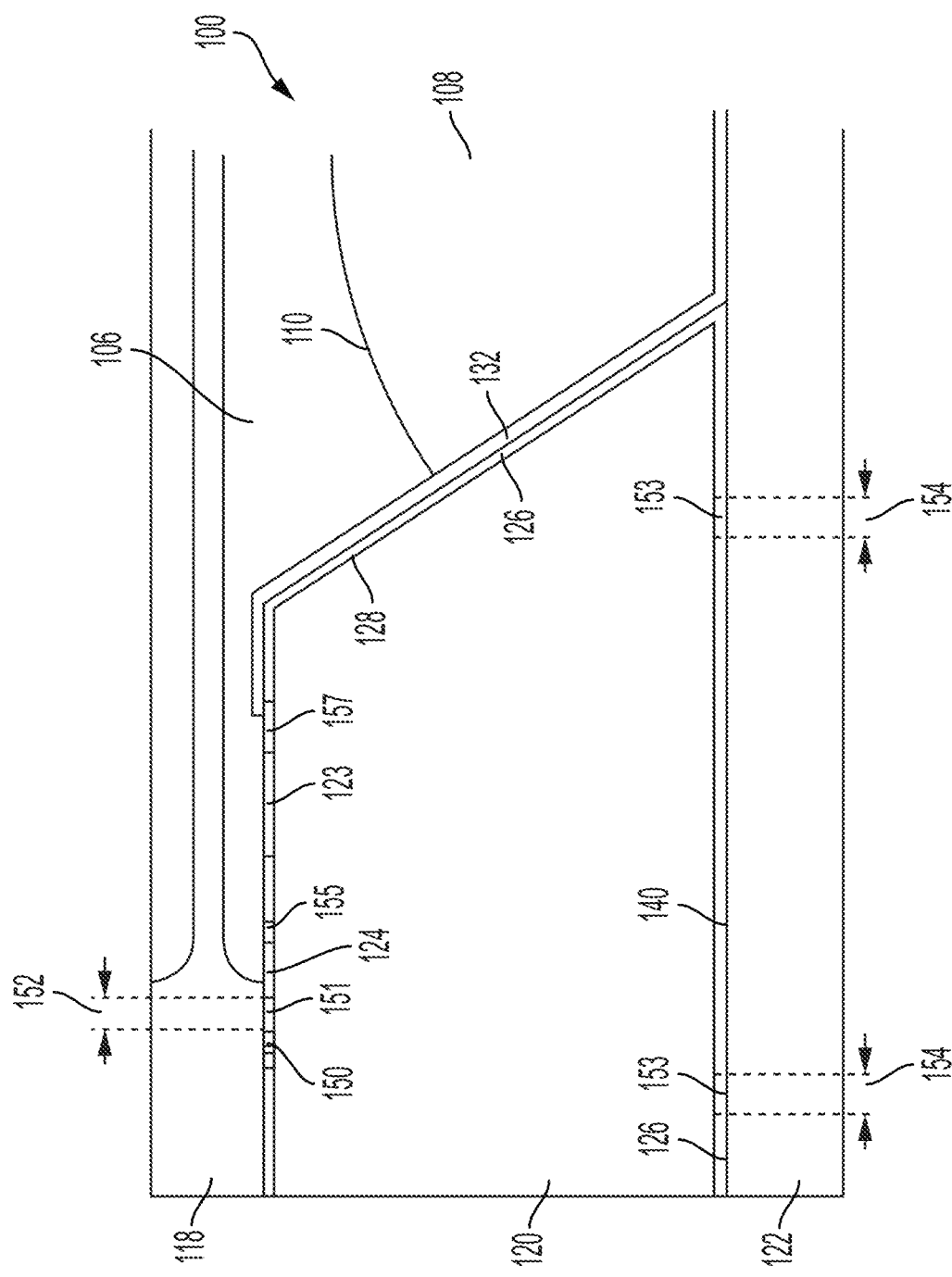
FIG. 25 is a partial cross-sectional view of an example embodiment of a liquid lens that have a heater and a temperature sensor.

FIG. 25 is a partial cross-sectional view taken through line 25-25 in FIGS. 21 and 22. In some embodiments, the liquid lens 100 can include an area of undriven conductive material 123 (e.g., metal), which can be in contact with the first fluid 106. The conductive material 123 can be the same material, and/or made from the same layer 128, as the electrode 124.

The electrode 124 can be insulated from the temperature sensor 150, such as by the insulating gap 151 with distance 152. The electrode 124 can be insulated from the area of conductive material 128 by an insulating gap 155. The insulating gap 155 can be formed by laser bonding (e.g., a hard bond), can be a scribe, or any other suitable barrier to provide electrically insulation. The gap 155 can be similar to the insulating gap 151, such as in size and insulating resistance. The area of conductive material 123 can be insulated from the one or more electrodes 126 by insulating gap 157, which can be similar to scribe 130A (in FIG. 1), to the gap 151, or any other suitable isolating barrier. The insulating material 132 can extend past the end of the electrode 126, and at least partially onto the insulating gap 157, or at least partially onto the conductive material 123. Some or all of the conductive material 123 can be exposed to the cavity of the liquid lens, such as in contact with the first fluid 106. Separating the undriven conductive material 123 from the electrode 124 can reduce the contact area between the electrode 124 can the first fluid 106, as compared to a liquid lens in which the electrode 124 were to extend to the insulating gap 157 (e.g., similar to FIGS. 10 and 11). A reduced contact area between the electrode 124 and the first fluid 106 can reduce or impede electrolysis.

Figure 26:
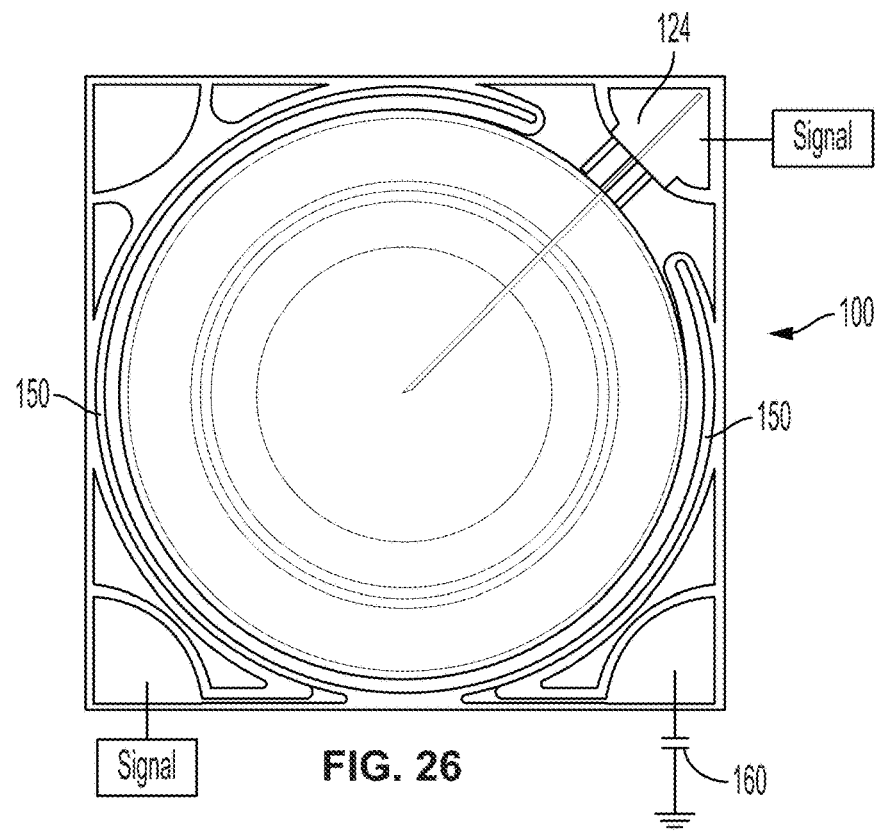
FIG. 26 shows an example embodiment of a liquid lens having a temperature sensor.

FIG. 26 schematically shows an example embodiment of a liquid lens with a temperature sensor, similar to various embodiments disclosed herein. The electrode 124 can receive signals for driving the liquid lens. The temperature sensor 150 can receive signals at a first contact. The sensor signals can be AC signals, although direct current (DC) signals or any suitable signals can be used. The temperature sensor 150 can be coupled to ground at a second contact. In some cases, the temperature sensor can be AC coupled to ground. For example, at least one capacitor 160 can be disposed between the temperature sensor (e.g., the second contact) and ground. The at least one capacitor 160 can be an AC coupling capacitor. The capacitor 160 can impede crosstalk signals from passing through the sensor 150 to ground.

Figure 27:
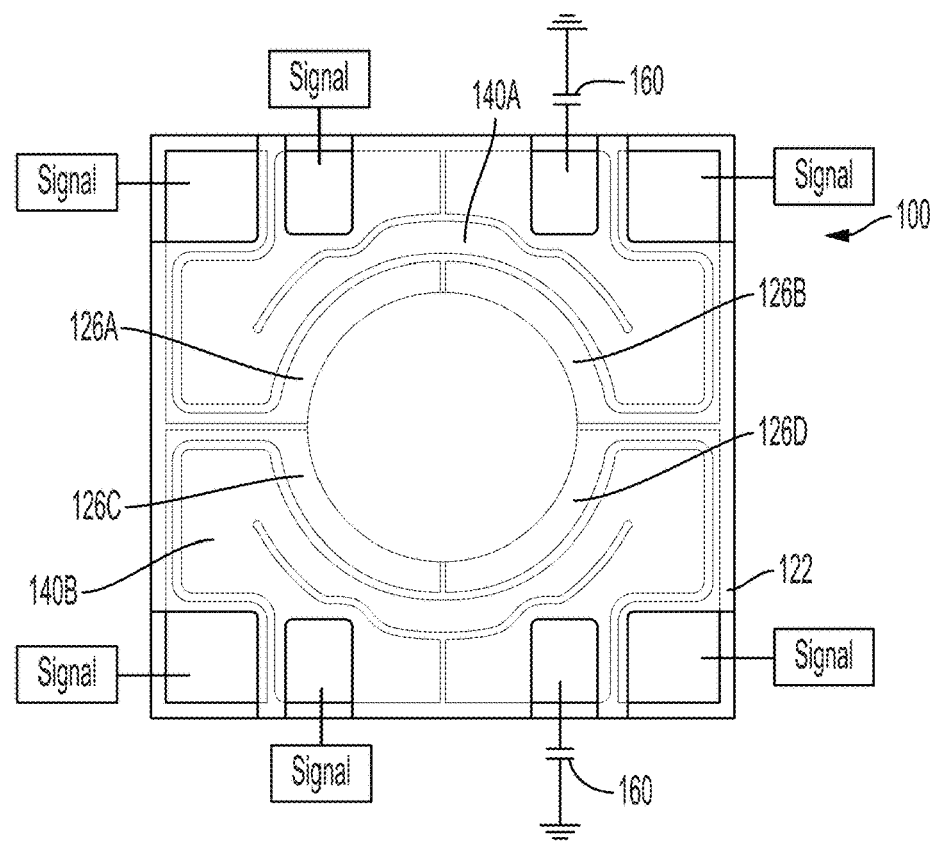
FIG. 27 shows an example embodiment of a liquid lens having a heater.

FIG. 27 schematically shows an example embodiment of a liquid lens with a heater, similar to various embodiments disclosed herein. The electrodes 126A-D can receive signals for driving the liquid lens. The heaters 140A-B can receive signals at respective first contacts. In some cases, a single heater can be used, or any suitable number of heaters. The heater signals can be AC signals, although direct current (DC) signals or any suitable signals can be used. The heaters 140A-B can be coupled to ground at respective second contacts. In some cases, the heaters 140A-B can be AC coupled to ground. For example, at least one capacitor 160 can be disposed between the heater (e.g., the second contact) and ground. The at least one capacitor 160 can be an AC coupling capacitor. The capacitor 160 can impede crosstalk signals from passing through the heaters 140A-B to ground.

In some embodiments, the AC coupling circuit (e.g., capacitor 160) can impede the crosstalk signals, while permitting the sensor and/or heater signals to pass. For example, the driver signals (e.g., delivered to the electrode 124) can operate at a different frequency than the sensor and/or heater signals. The driver signals can have a lower frequency (e.g., 5 kHz) than the frequency of the sensor and/or heater AC signals (e.g., which can be in the mega Hz range). The sensor and/or heater signals can have a frequency that is about 2 times, about 5 times, about 10 times, about 25 times, about 50 times, about 75 times, about 100 times, about 150 times, about 200 times, about 250 times, about 300 times, about 400 times, about 500 times, about 600 times, about 700 times, about 800 times, about 900 times, about 1,000 times, about 1,250 times, about 1,500 times, about 1,750 times, about 2,000 times the frequency of the driver signals, or any values or ranges bounded therein, although other frequencies could be used. The AC circuit (e.g., the capacitor 160) can operate as a high pass filter, which can permit higher frequency signals such as the heater or sensor signals to pass substantially unimpeded (e.g., above a threshold frequency), while substantially impeding lower frequency signals such as crosstalk signals produced from the slower lens driver signals (e.g., below a threshold frequency). By impeding the crosstalk current's path to ground, the flow of current due to crosstalk can be reduced, impeded, or stopped.

Figure 28:
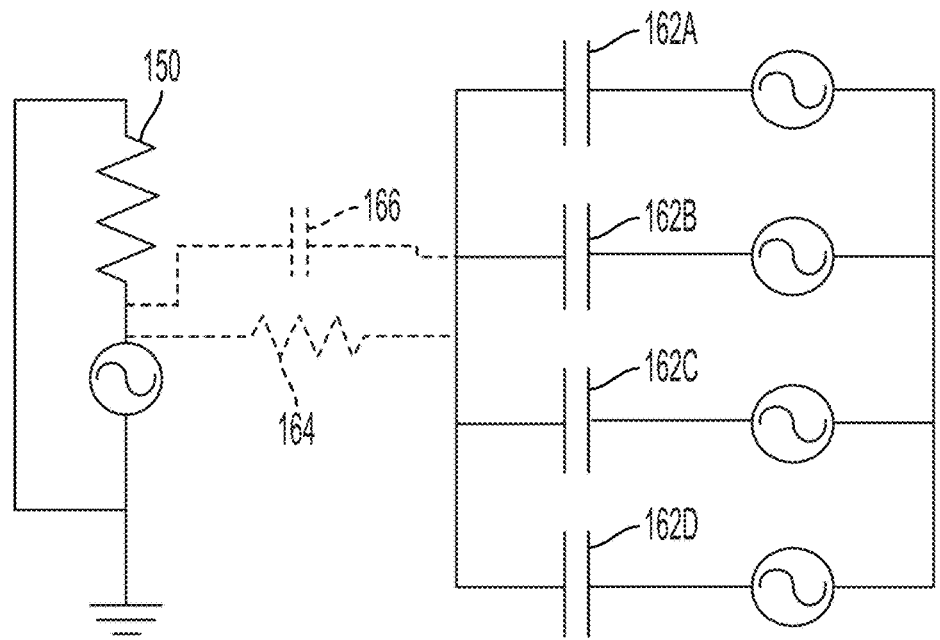
FIG. 28 is a schematic diagram of a liquid lens with a temperature sensor that is coupled to ground.

FIG. 28 is a schematic drawing showing an example embodiment with crosstalk between liquid lens electrodes and a temperature sensor 150. In FIG. 28, the temperature sensor 150 is shown as a resistor, which can vary depending on the temperature. FIG. 28 shows a resistive temperature sensor, although various other types of temperature sensors can be used, such as capacitive temperature sensors or inductive temperature sensors, or any other suitable type of sensor. The temperature sensor 150 can be coupled to ground. An AC signal can be used to operate the temperature sensor. The system can determine the resistance of the resistive temperature sensor 150 based on signals that are sent through it, and the determined resistance can be used to determine a temperature.

In FIG. 28, the capacitors 162A-D represent the effective capacitors that can be produce between the electrodes 126A-D and the first fluid of the liquid lens. Although four separate effective capacitors are shown in FIG. 28 (e.g., due to this embodiment having four driving electrodes 126A-D), the first fluid can be shared between the four effective capacitors. Accordingly the first fluid can act as a common "plate" for the four capacitors shown. Since the common electrode 124 drives the voltage of the first fluid, the common electrode 124 can be considered a common "plate" for the four capacitors shown. AC drive signals can used to drive the liquid lens, such as to change the shape of the fluid interface 110, such as for varying the focal distance of the liquid lens, or for changing the focal direction (e.g., by tilting the lens, such as for optical image stabilization). In some cases AC drive signals can be provided to the electrodes 126A-D. In some cases, pulsed drive signals (e.g., pulsed DC signals) can be provided to the electrodes 124 and 126A-D, and the pulsed drive signals can be offset to produce AC voltage differentials between the electrode 124 and the electrodes 126A-D. More information regarding driving of the liquid lens is provided in PCT Application No. PCT/US2018/026268, filed Apr. 5, 2018, tilted LIQUID LENS FEEDBACK AND CONTROL, the entirety of which is hereby incorporated by reference. The liquid lens embodiments disclosed herein can use the features and details disclosed in the '268 application, such as for driving the liquid lens 100.

In FIG. 28, the resistor 164 and capacitor 166 (shown in dashed lines) represents crosstalk between the one or more of the electrodes 124 and 126A-D and the temperature sensor. The resistor 164 can represent direct coupling crosstalk. The capacitor 166 can represent capacitive coupling crosstalk.

Figure 29:
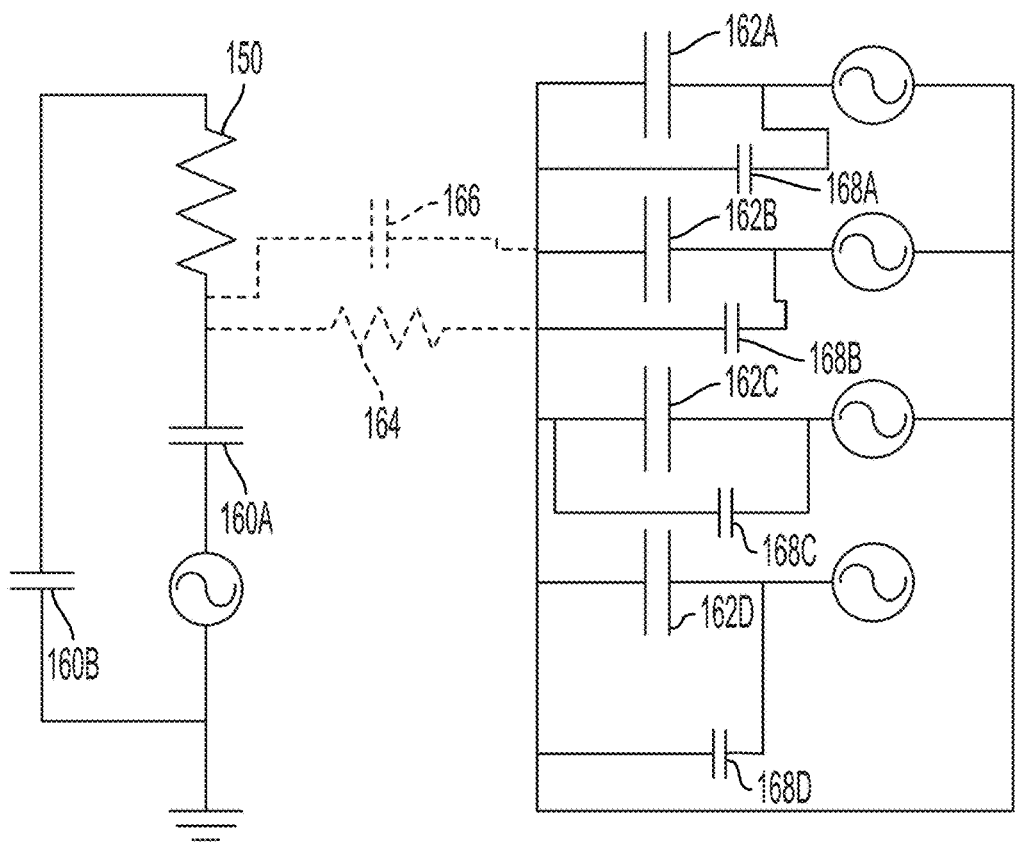
FIG. 29 is a schematic diagram of a liquid lens with a temperature sensor that is AC coupled to ground.

FIG. 29 is a schematic diagram similar to FIG. 28. In FIG. 29, the temperature sensor 150 can be AC coupled to ground. The AC coupling circuit can include one or more capacitors. For example, the signal side can include a first capacitor 160A and the reference side can include a second capacitor 160B. The capacitors 160A and 160B can operate as a high pass filter, as discussed herein.

In FIG. 29, the lens driver circuitry can include one or more snubbers. For example, the snubbers can include capacitors 168A-D. In some cases, the snubbers can include a capacitor in series with a resistor (not shown in FIG. 29). In some cases, each of the driving electrodes 126A-D can have associated snubber circuitry, which can modify the driving signals provided to the electrodes 126A-D. Although not shown in FIG. 19, the electrode 124 can have an associated snubber circuitry for modifying the driver signals provided to the electrode 124. The snubber circuitry can be configured to reduce crosstalk. For example, in some embodiments, square wave or rectangle wave drive signals can be used to drive the liquid lens. The fast rise and fall time of the voltages of the drive signals can produce significant crosstalk, in some cases. In some cases, the higher rate of change of the voltage can produce higher crosstalk current (e.g., I=dv/dt). The snubbers can reduce the rate of change of the voltage driving signals, which can reduce crosstalk. In some embodiments, the snubbers can be used to reduce crosstalk without the sensor being AC coupled to ground as in FIG. 29. For example, in some embodiments, FIG. 29 can be modified to use the sensor circuit of shown on the left side of FIG. 29. Also, in some embodiments, the snubbers of FIG. 29 can be omitted, for example the AC coupled sensor can be used with or without the snubbers. FIG. 29 can be modified to use the liquid lens driver approach on the right side of FIG. 29. In some embodiments, the liquid lens driver can deliver driver signals as sine waves or sawtooth waves, with less abrupt changes in voltage, which can reduce crosstalk compared to square or rectangle wave driver signals.

In some embodiments, the sensor that is AC coupled to ground can be used together with the snubbers, as shown in FIG. 29. The snubbers can be configured to reduce oscillations in the driver signals. For example, when the driver signal (e.g., a rectangle or square wave) rises abruptly it can oscillate before settling at the higher voltage, and/or when the driver signal drops to a lower voltage it can oscillate before settling at the lower voltage. In some cases, the oscillation can cause crosstalk as the voltage changes due to the oscillation, and that component of the crosstalk signal can have a higher frequency than the driver signal. For example, with a driver signal frequency of 5 kHz, the oscillation frequency can be higher (e.g., 10 kHz, 50 kHz, etc.). The higher frequency of the oscillation component can cause the oscillation component of the crosstalk signal to more easily pass through the AC coupling circuit to ground. By reducing or removing the oscillation in the driver signals (e.g., using the snubbers), the AC coupling circuitry can more effectively prevent the crosstalk signals from passing to ground. Accordingly, a synergistic effect is produced by using both the AC coupled circuit and the snubbers, as shown in FIG. 29.

The heaters 140 disclosed herein can be AC coupled similar to FIG. 29. For example, FIG. 29 can be modified to use the resistor labeled as 150 as a resistive heater. In some embodiments, both the sensor 150 and the heater 140 can be AC coupled to ground, although only one is shown in FIG. 29.

Figure 30:
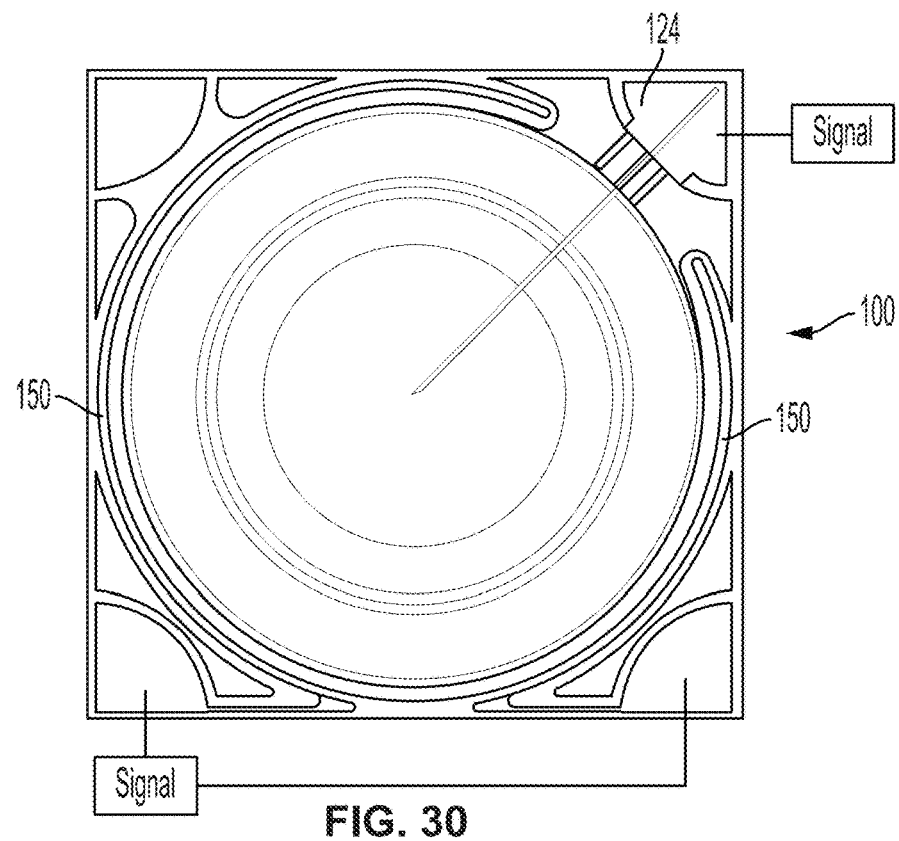
FIG. 30 shows an example embodiment of a liquid lens having a temperature sensor that is not coupled to ground.
Figure 31:
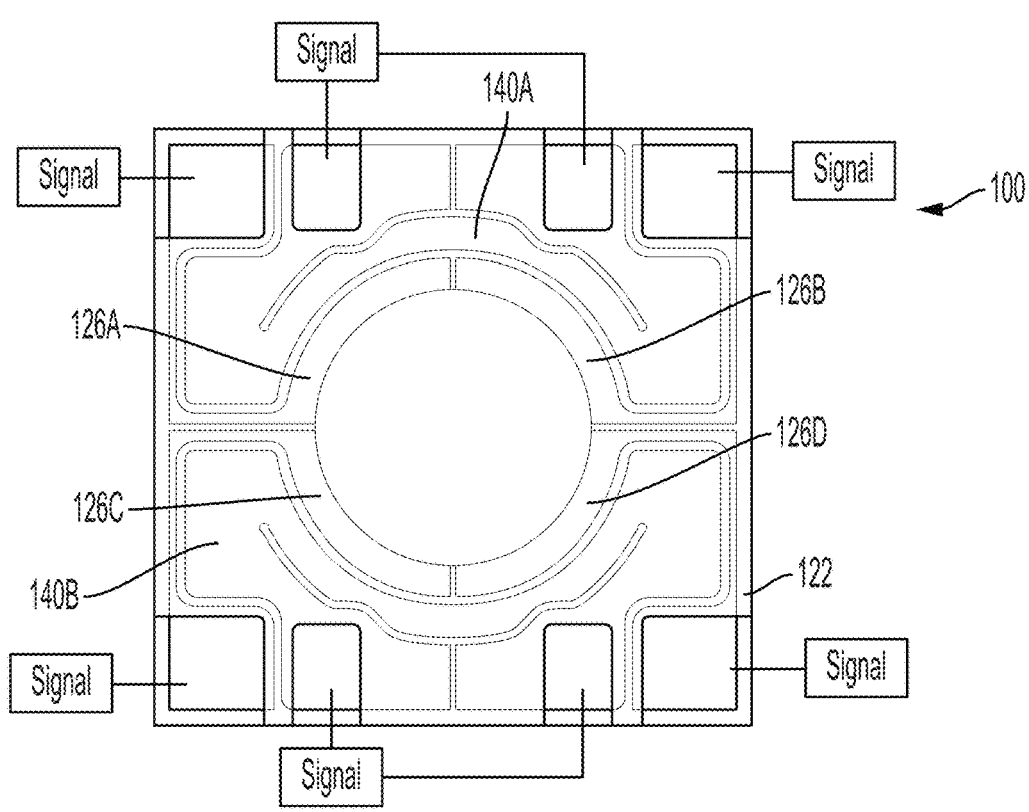
FIG. 31 shows an example embodiment of a liquid lens having a heater that is not coupled to ground.

FIG. 30 shows an example embodiment of a liquid lens having a temperature sensor 150 that is not grounded. For example, the signals provided to the sensor 150 can float relative to ground. FIG. 31 shows an example embodiment of a liquid lens having heaters 140A-B that are not grounded. The signals provided to the heaters 140A-B can float relative to ground. By denying the crosstalk signals a path to ground, the crosstalk can be reduced. In some cases, crosstalk can occur even without a path to ground, such as if a significant voltage different exists between the driver signals and the heater and/or sensor signals (which in some cases can both float relative to ground and/or relative to each other).

Figure 32:
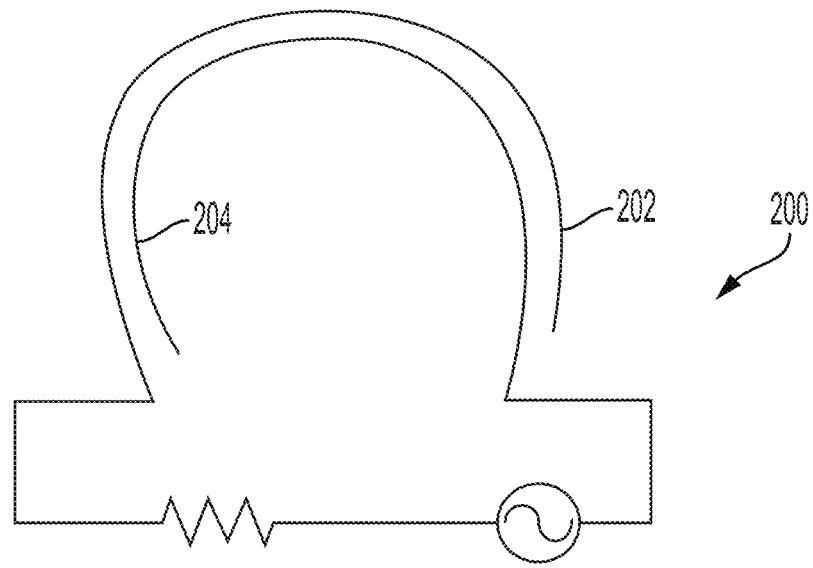
FIG. 32 shows an example embodiment of a capacitive temperature sensor.

Various embodiments are discloses herein as using a resistive temperature sensor. Various other types of temperature sensors can be used. FIG. 32 shows an example embodiment of a capacitive temperature sensor. The capacitive sensor can have a first conductive pathway 202 and a second conductive pathway 204, which can be separated, such as by an insulating or dielectric material. The first and second conductive pathways can form a capacitor, and the capacitance can vary depending on the temperature, such as of the first and/or second conductive pathways, and/or of the material between the first and second conductive pathways. In some embodiments, a cavity containing a fluid can be disposed between the first and second conductive pathways 202 and 204. That fluid can be the same as the first fluid 106. For example, a portion of the first fluid 106 can be trapped in the cavity between the first and second conductive pathways during manufacturing of the liquid lens. The capacitive sensor can be configured to determine the temperature based at least in part on the capacitance. The capacitive sensor can have an AC signal driver and a resistor, in some embodiments, although various suitable designs can be used. The first and second conductive pathways 202 and 204 can be built into the liquid lens similar to the conductive pathways of the resistive sensors shown herein, such as between the intermediate layer 120 and the first outer layer 118, or between the intermediate layer 120 and the second outer layer 122. Crosstalk from the conductive sensor can be reduced or impeded similar to the other embodiments disclosed herein.

Figure 33:
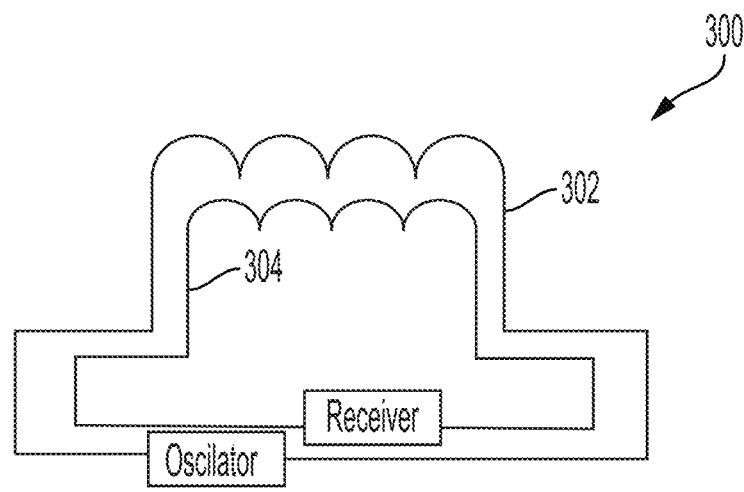
FIG. 33 shows an example embodiment of an inductive temperature sensor.

FIG. 33 shows an example embodiments of an inductive temperature sensor 300. The sensor 300 can include a first conductive pathway 302, which can form a first inductor, and a second conductive pathway 304, which can form a second inductor. An oscillator can provide an AC signal to the first conductive pathway 302, which can induce an AC signal in the second conductive pathway 304. The induced AC signal can be delivered to a receiver. In some embodiments, eddy currents can vary depending on the temperature. The inductive temperature sensor can be configured to determine the temperature based at least in part on measurements of the eddy currents. Various other designs can be used. The first and second conductive pathways 302 and 304 can be built into the liquid lens similar to the conductive pathways of the resistive sensors shown herein, such as between the intermediate layer 120 and the first outer layer 118, or between the intermediate layer 120 and the second outer layer 122. Crosstalk from the inductive sensor can be reduced or impeded similar to the other embodiments disclosed herein.

The liquid lens can use resistive heaters, capacitive heaters, inductive heaters, or any other suitable heater type. Any combination of resistive heaters, capacitive heaters, inductive heaters, resistive sensors, capacitive sensors, and/or inductive sensors can be used, as well as any other suitable types of heaters or sensors. The heaters and sensors can be disposed on opposite sides of the liquid lens (e.g., one between the intermediate layer 120 and the first outer layer 118, and the other between the intermediate layer 120 and the second outer layer 122), or they can both be used on the same side (e.g., similar to FIG. 15). In some cases both sides can include heaters, and/or both sides can include temperature sensors.

The features described herein can be used to reduce, impede, or prevent crosstalk, or the effects thereof, in any resistive element in a liquid lens. Various embodiments described herein relate to crosstalk involving a heater or temperature sensor. These approaches can be used to address crosstalk involving other types of sensors or other resistive components, which can encounter crosstalk from the electrodes of the liquid lens, for example.

Figure 34:
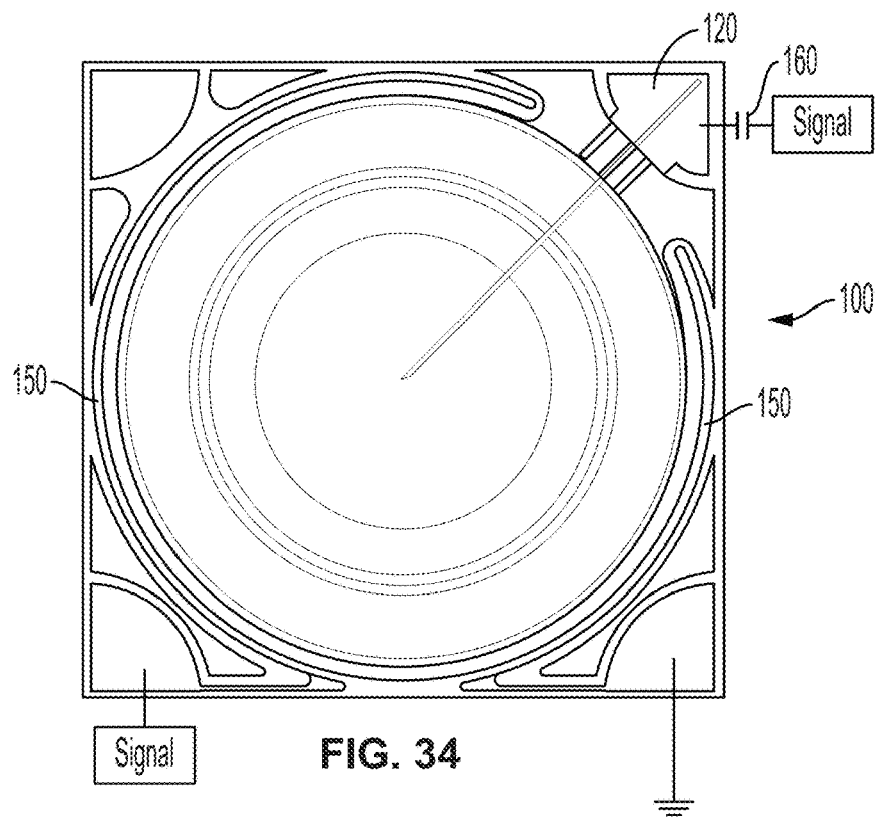
FIG. 34 shows an example embodiment of a liquid lens having a temperature sensor.
Figure 35:
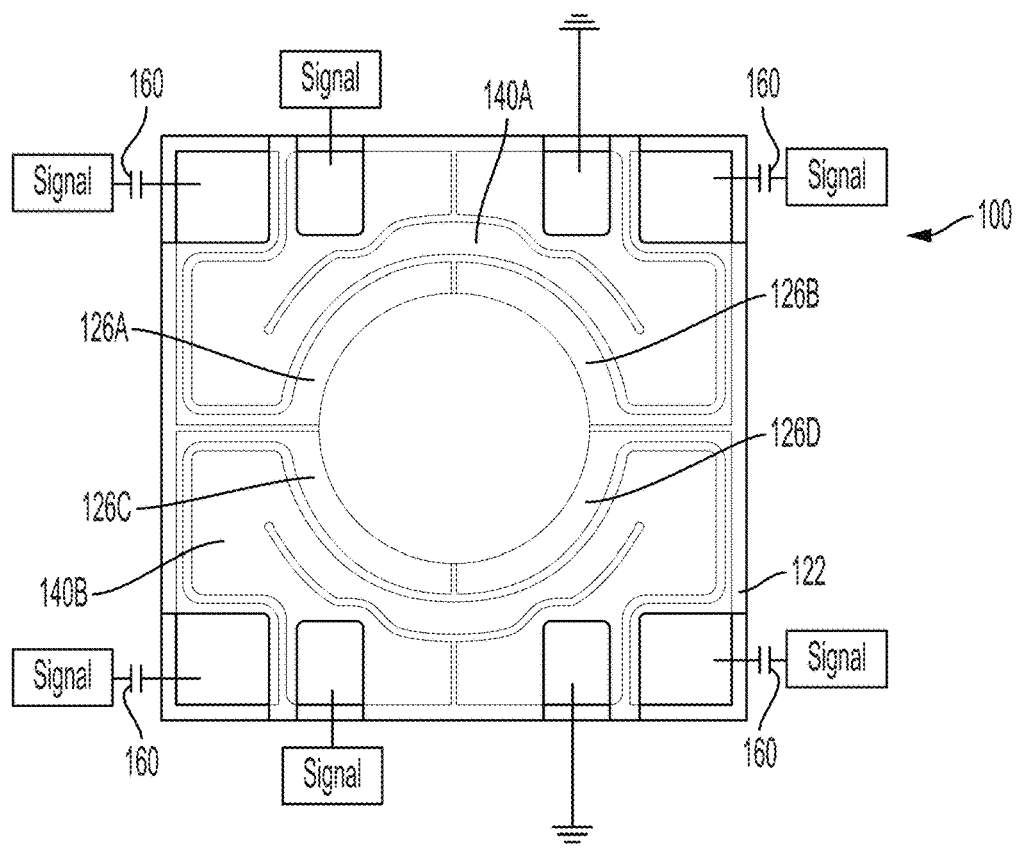
FIG. 35 shows an example embodiment of a liquid lens having a heater.

In some embodiments, one or more of the electrodes 124 and/or 126A-D can be AC coupled, such as to a drive signal source (such as an application specific integrated circuit (ASIC) or other driver) or to ground. FIGS. 34 and 35 show an example embodiment of a liquid lens with the electrodes 124 and 126A-D AC coupled to the driving signals. For example, at least one capacitor 160 can be disposed between the common electrode 124 and the driver signal source. Similarly, at least one capacitor 160 can be disposed between each of the electrodes 124A-D and the associated driver signal source(s). The capacitors 160 can be AC coupling capacitors. The capacitors 160 can impede crosstalk signals from passing through the heater 140 and/or the temperature sensor 150 to ground. The capacitors 160 can impede DC current flow through the electrodes 124 and/or 126A-D to the heater 140 and/or sensor 150. A common driver can be used to send drive signals to the electrode 124 and the electrodes 126A-D, although in some cases separate drivers can be used. The AC coupling circuitry can impede DC current flow through the electrodes 124 and/or 126A-D, while permitting AC drive signals to be delivered to the electrodes 124 and/or 126A-D.

In some embodiments, only the common electrode 124 is AC coupled to the signal source, while the electrodes 126A-D are not AC coupled. For example, the capacitors 160 in FIG. 35 can be omitted while the capacitor 160 in FIG. 34 can be included. In some embodiments, the electrodes 126A-D can be AC coupled to the signal source(s) while the common electrode 124 is not AC coupled. For example, the capacitor 160 of FIG. 34 can be omitted while the capacitors 160 in FIG. 35 can be included. In the embodiment of FIGS. 34 and 35, the sensor 150 can be on the upper portion of the liquid lens 100, the heater 140 can be on the lower portion of the liquid lens 100, the common electrode 124 can be on the upper portion of the liquid lens 100, and the driving electrodes 126A-D can be on the lower portion of the liquid lens 100. Many suitable variations are possible. For example, the heater 140 and sensor 150 can be positioned together (e.g., co-planar) on either the upper portion (e.g., FIG. 34) of the lower portion (e.g., FIG. 35) of the liquid lens. The positions of the heater 140 and sensor 150 can be swapped compared to FIGS. 34 and 35, so that the heater 140 is disposed on the upper portion and the sensor is disposed on the lower portion. Either or both of the heater 140 and the sensor 150 can be omitted.

One advantage of AC coupling the electrodes is that the heater 140 and/or the sensor 150 can be direct coupled to ground. In some embodiments, the heater 140 and/or the sensor 150 are not AC coupled (e.g., to ground). However, in some implementations, the heater 140 and/or the sensor 150 can be AC coupled (e.g., to ground) and one or more of the electrodes 124 and/or 126A-D can also be AC coupled to the associated driver source(s). Accordingly, a liquid lens system can include the AC coupling capacitors 160 of FIGS. 26 and 27 as well as FIGS. 34 and 35.

Figure 36:
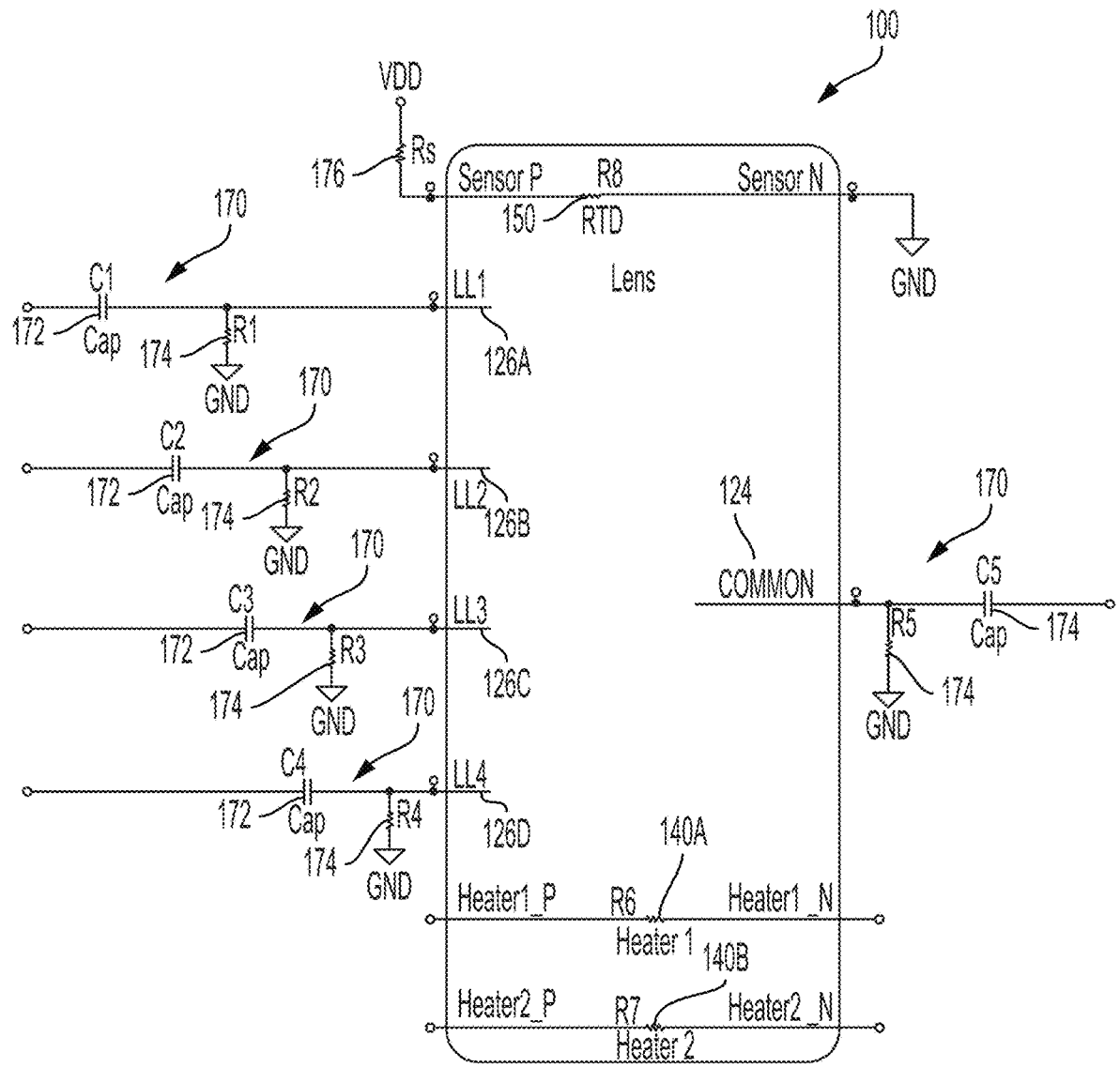
FIG. 36 shows an example embodiment of a liquid lens having a temperature sensor and heater

Various types of passive electrical components can be disposed between the electrodes 124 and/or 126A-D and the driving signals, which can impede crosstalk or DC current flow through the electrodes. For example, the AC coupling capacitors 160 can be used, as discussed in connection with FIGS. 34 and 35. In some embodiments, snubbers can be disposed between the electrodes 124 and/or 126A-D and the driver (e.g., similar to the discussion of FIG. 29). In some embodiments, with reference to FIG. 36, a high pass filter can be disposed between the electrodes 124 and/or 126A-D and the driver. The high pass filter can block or impede signals DC current or voltage signals with a frequency below a threshold, and the high pass filter can permit signals with a frequency above a threshold to pass through to the electrodes 124 and/or 126A-D. The driver signals can be AC or pulsed signals having a frequency that is above the threshold of the high pass filter(s). With reference to FIG. 36, the high pass filters 170 can be implemented using a capacitor 172 and a resistor 174 on a branched path to ground. In some cases, a low pass filter or a band pass filter can be disposed between the electrodes 124 and/or 126A-D and the driver signal source. In some cases, a low pass filter (not shown in FIG. 36) and a high pass filter 170 can be combined to produce the band pass filter. The low pass filter can be implemented using a capacitor and resistor but in opposite configuration as the high pass filters of FIG. 36. The path to ground (e.g., through the resistor 174) can provide a discharge pathway so that the liquid lens can discharge excess charge that could build up in the liquid lens.

The liquid lens 100 of FIG. 36 can have features similar to the other liquid lens embodiments disclosed herein, such as an optional heater 140A-B and an optional temperature sensor 150, which can be disposed on the same or different layers of the liquid lens structure, in any suitable configuration as disclosed herein. The sensor 150 can include a resistive element, which can be inside the liquid lens, and can also include a reference resistor 176, which can be coupled in series with the resistive element of the temperature sensor 150. Any suitable type temperature sensor can be used. Although not shown in FIG. 36, the one or more heaters 140A-B can be coupled to a voltage source at one end and to ground at the other end, although any suitable heater design can be used. The liquid lens is shown as having four driving electrodes 126A-D, although any suitable number can be used, and can have the various passive electrical components disposed between the electrodes and the driving signal source(s). In some embodiments, the resistors 174 can be omitted, and the capacitors 172 can AC couple the electrodes 124 and/or 126A-D to the drive signals (e.g., sent from a driver or signal generator).

The capacitance values for the AC coupling capacitors 160, or the capacitors used to make the high pass filter, low pass filter, or band pass filter, can have a capacitance value that is about 0.25 time, about 0.5 times, about 0.75 times, about 1 times, about 1.5 times, about 2 times, about 5 times, about 7.5 times, about 10 times, about 25 times, about 50 times, about 75 times, about 100 times, about 150 times, about 200 times, about 500 times, about 750 times, about 1000 times, about 1250 times, about 1500 times, the nominal value of the capacitance formed between the electrodes 126A-D and the first fluid 106 during normal operation of the liquid lens, or any values therebetween, or any ranges bounded therein, although other values could be used in some cases. For example, for an internal capacitance of the liquid lens of 100 pF, capacitors of 100,000 pF provided sufficiently high capacitance (e.g., for AC coupling), and for an internal capacitance of the liquid lens of 15 to 60 pF, then capacitors of 0.1 pF provided sufficiently high capacitance (e.g., for AC coupling). The capacitors can have sufficient capacitance so that the internal capacitance can be sensed without being substantially affected by the external capacitors.

In some embodiments, different passible electrical components can be used (or omitted) for the different electrodes 124 and/or 126A-D. For example, the high pass filters 170 of FIG. 36 can be omitted for any of the electrodes 124 and/or 126A-D. In some cases, a first electrode (e.g., electrode 124) can include a high pass filter 170, while a second electrode (e.g., one or more of electrodes 126A-D) can use an AC coupling capacitor 160, or vice versa, or either can use a snubber, etc. In some embodiments, the heater 140 or sensor 150 can be coupled to a high pass filter (e.g., similar to the high pass filters 170 of FIG. 36).

Figure 37:
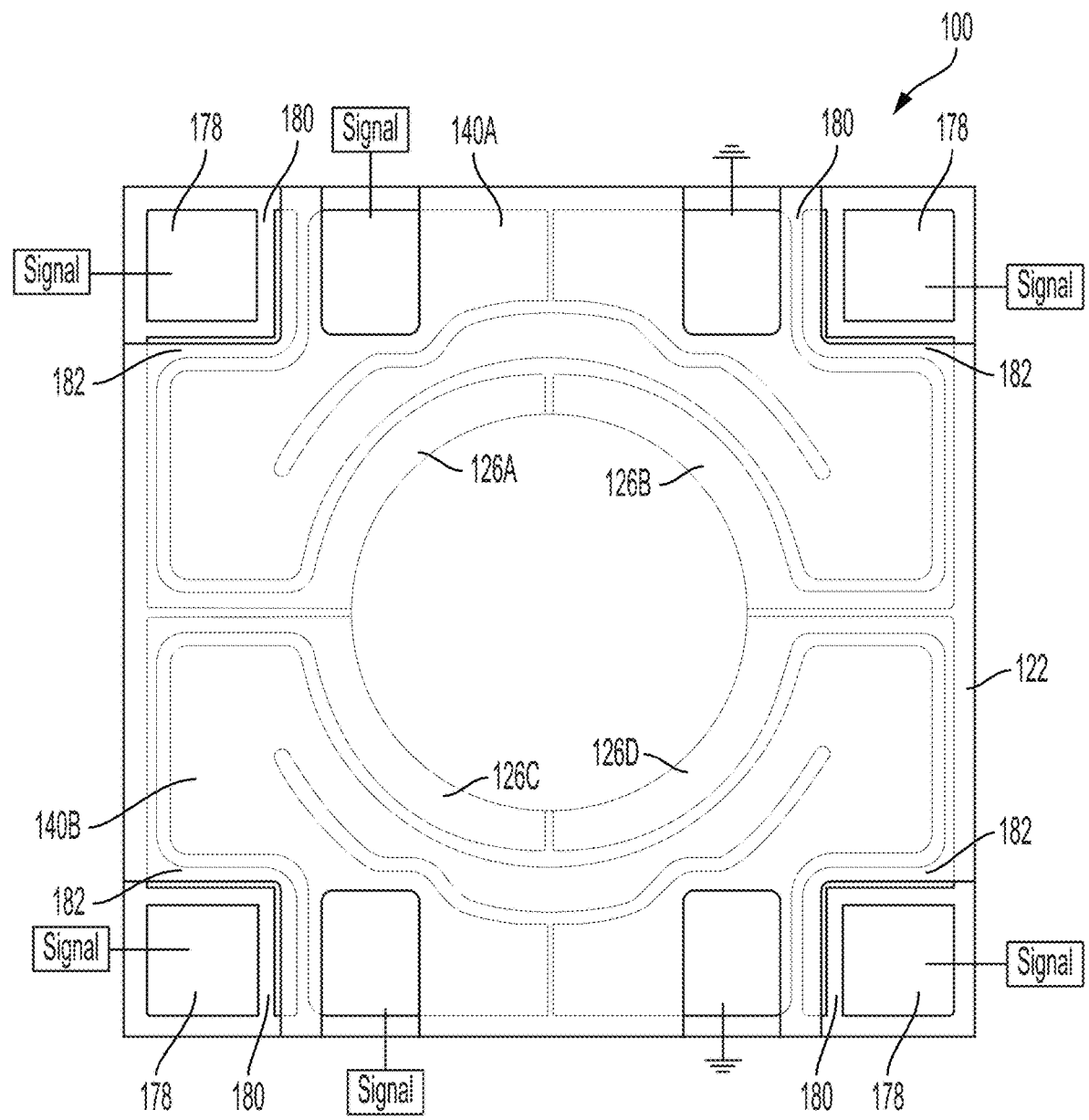
FIG. 37 shows an example embodiment of a liquid lens having a heater.

The passive electrical components (e.g., the capacitors, resistors, high pass filters, snubbers, etc.) can be disposed between the driver or signal generator and the liquid lens 100 (e.g., as discrete components), can be incorporated into the driver or signal generator, and/or can be incorporated into the liquid lens 100. For example, in some embodiments, the structure of the liquid lens can implement a capacitor, which can AC couple the signal to the corresponding electrode. With reference to FIG. 37, the liquid lens can have a dielectric barrier that implements a capacitor along the electrical path from an input location (e.g., an electrical contact pad) to the corresponding electrode. In FIG. 37, the liquid lens can have contact pads 178 that are associated with the driving electrodes 126A-D. A lead 182 can electrically couple the contact pad 178 to the corresponding electrode 126A-D. A dielectric barrier 180 can be disposed at some location between the contact pad 178 and the corresponding electrode 126A-D so that the contact pad 178 can be capacitively coupled to the corresponding electrode 126A-D. For example, a gap between the contact pad 178 and the lead 182 can have an insulating or dielectric material. The insulating gap 180 can be formed using photo resist, lithography, an ablation laser, or any other suitable technique. The gap 180 can include glass, or any other suitable dielectric or insulating material.

In some cases, the lead 182 can wrap around about 45 degrees, about 60 degrees, about 75 degrees, about 90 degrees, about 105 degrees, about 120 degrees, about 135 degrees, about 150 degrees, about 165 degrees, about 180 degrees, about 195 degrees, about 210 degrees, about 225 degrees, about 240 degrees, about 255 degrees, about 270 degrees, about 285 degrees, about 300 degrees, about 315 degrees, about 330 degrees, about 345 degrees, or about 360 degrees around the contact pad 178, or any values therebetween, or any ranges bounded therein. In the embodiments shown in FIG. 37, the lead 182 extends along two sides of a rectangular contact pad, so cover about 180 degrees of the periphery of the contact pad 178. Many alternatives are possible. For example, the lead 182 can wrap fully or mostly around the contact pad 178. The larger length or area of close proximity between the lead 182 and the contact pad 178 can facilitate the performance of the effective capacitor. The contact pad 178 effectively becomes the first plate of a parallel plate capacitor, with the lead 182 effectively forming the second plate.

The dielectric barrier 180 can be located as various other suitable positions in the liquid lens. For example, the lead 182 can be in direct contact with (e.g., integrally formed from the same conductive layer as) the contact pad 178. And an insulting gap or other dielectric barrier (e.g., similar to gap 180) can be formed between the lead 182 and the corresponding electrode 126A-D. For example, a portion of the lead 182 can extend along the periphery of the electrode 126A-D, such as covering an arc or path of about 10 degrees, about 20 degrees, about 30 degrees, about 40 degrees, or about 45 degrees, or any values therebetween, or any ranged bounded therein. In some embodiments a first lead portion can be in direction electrical contact with the contact pad 178, and a second lead portion can be in direct electrical contact with the corresponding electrode 126A-D, and dielectric barrier (e.g., insulating gap) can be disposed between the first lead portion and the second lead portion, which in some cases can track parallel to each other for a length sufficient to produce an effective capacitor. In FIG. 37, the gap 180 is not shown to scale. For example, the gap in FIG. 37 can be shown enlarged to facilitate illustration of the gap.

Figure 38:
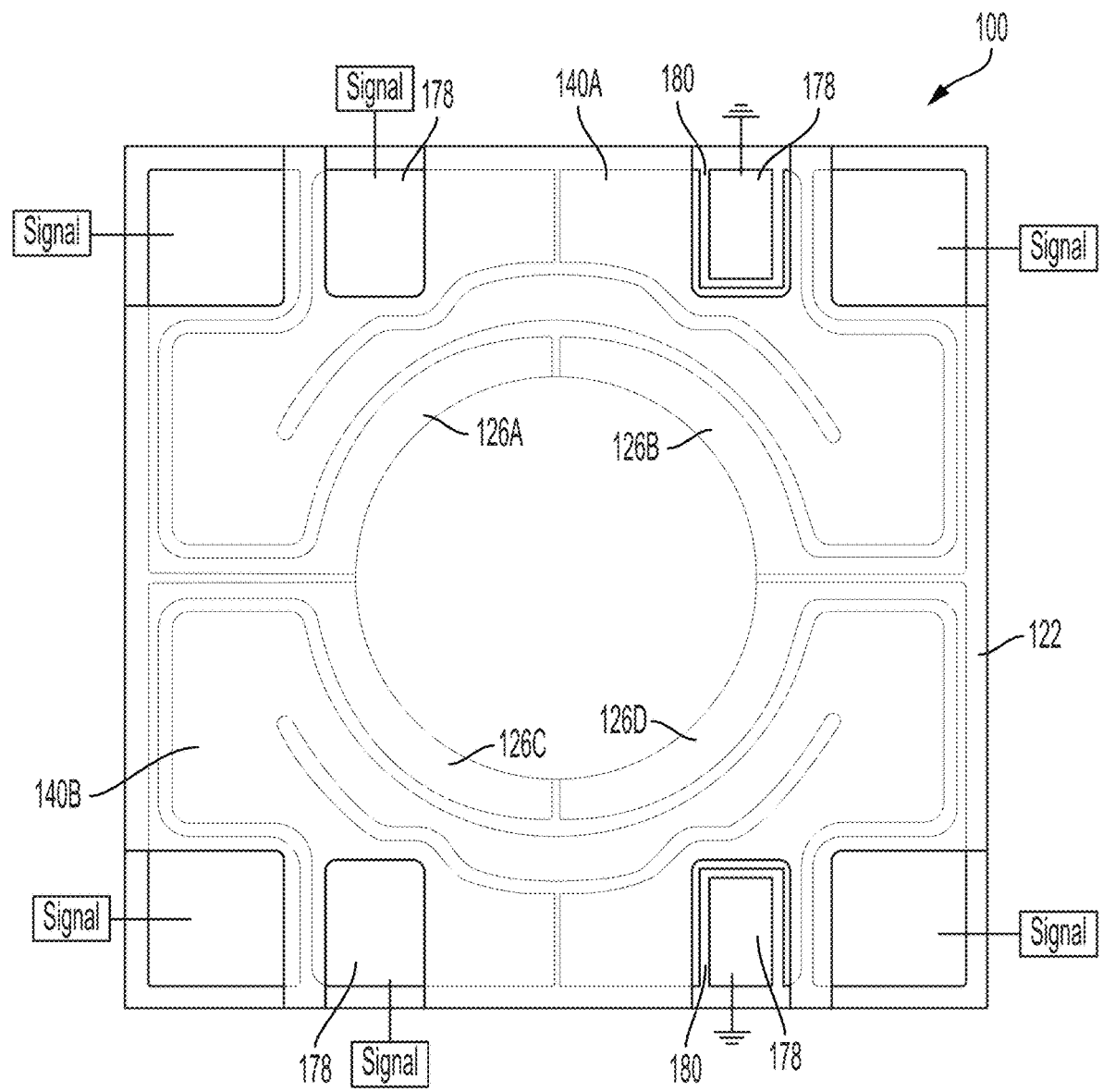
FIG. 38 shows an example embodiment of a liquid lens having a heater.

Although not shown, the common electrode 124 can be AC couple using an effective capacitor that is incorporated into the liquid lens in a manner similar to the discussion of FIG. 37. For example, an insulating gap can be disposed between a contact pad (e.g., on the upper portion of the liquid lens) and a lead that couples to the common electrode 124. Other designs are possible for AC coupling the common electrode, as discussed herein. Also, the heater 140 and/or the sensor 150 can be AC coupled (e.g., to ground) using a capacitor that is incorporated into the liquid lens, such as similar to the discussion of FIG. 37. With reference to FIG. 38, the heater 140 can have a first contact pad 178 that receives a heater signal, and a second contact pad 178 that is coupled to ground. The second contact pad 178 can be insulated from the conductive heater material by an insulating gap 180, or other dielectric barrier, such as similar to the discussion above. The sensor 150 can have a configuration similar to the heater 140 shown in FIG. 38. In some embodiments, the liquid lens can include additional electrical components (e.g., resistors, leads that can extend to a grounded contact pad, or other passive electrical components, etc.) to implement the high pass filters, low pass filters, band pass filters, snubbers, etc. disclosed herein coupled to the heater and/or sensor. In some alternative embodiments, the passive electrical components (e.g., capacitors, resistors, etc.) can be built into the driver, or can be included as discrete components between the driver (e.g., which can be an ASIC) and the liquid lens. In some cases, the driver can output an AC coupled signal, or a filtered signal, which can impede cross talk or DC current flow, as discussed herein.

In some embodiments, the heater 140, the sensor 150, and the driving electrodes 126A-D can be disposed on the same side of the liquid lens 100, such as on a lower side, or on the side at the narrow side of the truncated cone structure of the cavity. In some cases, this design can avoid trapping fluid in the upper areas of the liquid lens, which can occur in some embodiments during manufacturing of the heater or sensor in the upper area of the liquid lens. Also, the common electrode 124, which can be in electrical communication with the fluid 106, can be on the upper area of the liquid lens, so that disposing the heater 140 and/or sensor on the lower area of the liquid lens can reduce, impede, or prevent crosstalk between the common electrode 124 and the heater 140 and/or sensor 150. This can reduce, impede, or prevent electrolysis. For example, if crosstalk occurs with the driving electrodes 126A-D, that can result in less (or no) electrolysis, as compared to crosstalk with the common electrode 124 that is in electrical communication with the fluid 106.

Figure 39:
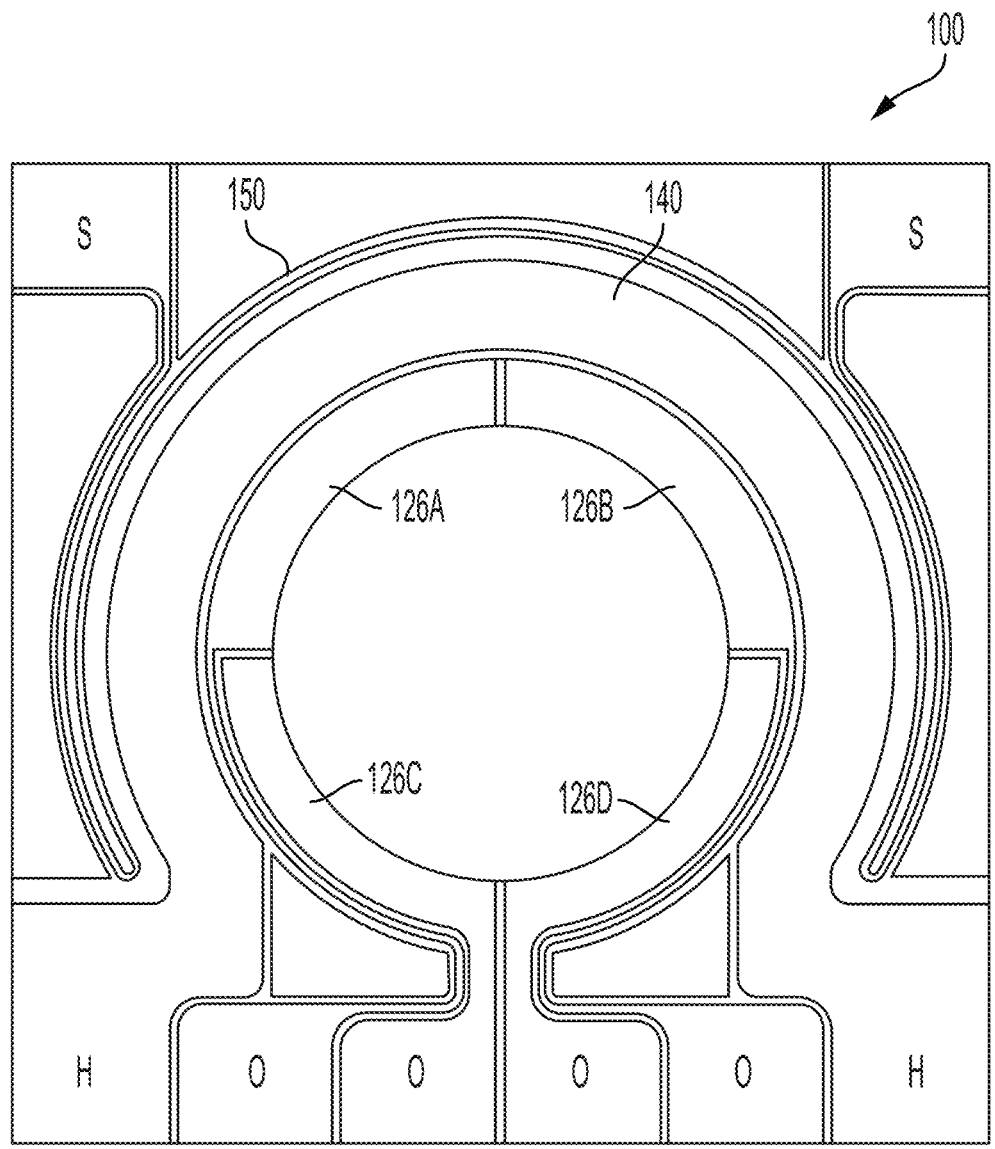
FIG. 39 shows an example embodiment of a liquid lens having a heater and temperature sensor.
Figure 40:
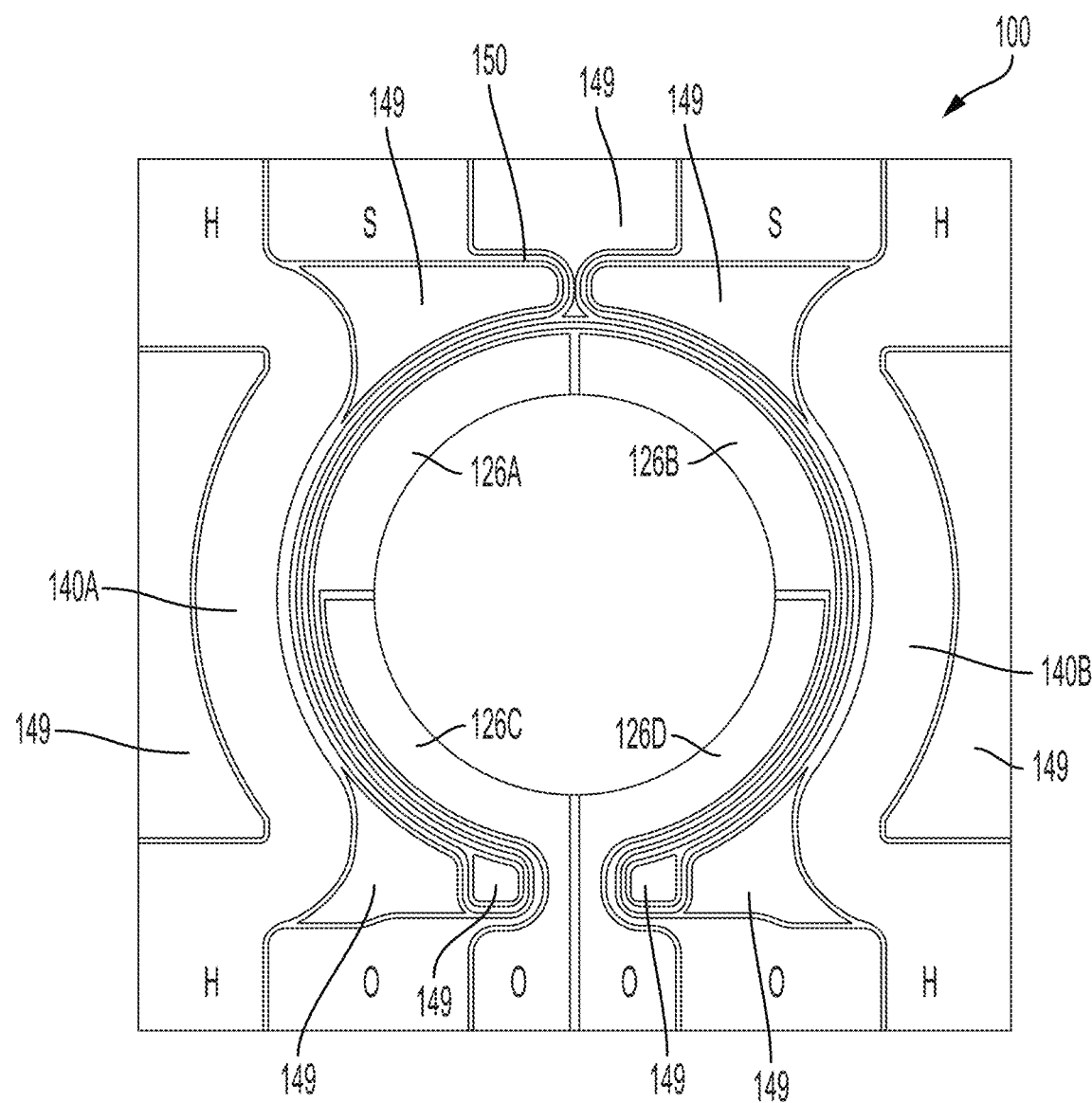
FIG. 40 shows an example embodiment of a liquid lens having a heater and temperature sensor.

FIGS. 39 and 40 show example embodiments of liquid lenses 100 with a heater 140 and sensor 150 incorporated into a lower area of the liquid lens 100 (e.g., between the intermediate layer 120 and the second outer layer 122). The one or more driving electrodes 126A-D can also be disposed in the lower area of the liquid lens 100. In FIG. 39, the heater 140 can be disposed radially inward of the sensor 150, which can provide the benefit of improved heating. Because the heater 140 is relatively close to the fluids, heat can more efficiently be transferred to the fluids, which can result in more efficient heating. The conductive path of the heater 140 extend around a significant portion of the liquid lens 100, such as about 90 degrees, about 120 degrees, about 150 degrees, about 180 degrees, about 210 degrees, about 240 degrees, about 270 degrees, about 300 degrees, or any values therebetween, or any ranges bounded therein, although other designs are possible, which can facilitate even distribution of heating. Also, the conductive path of the heater 140 can follow a substantially constant curvature around a significant portion of the circumference, which can facilitate even distribution of heating. The substantially constant curvature can extend about 90 degrees, about 120 degrees, about 150 degrees, about 180 degrees, about 210 degrees, about 240 degrees, about 270 degrees, about 300 degrees, or any values therebetween, or any ranges bounded therein, although other designs are possible. The embodiment of FIG. 39 includes a single heating element 140, which can use two contact pads. This can be advantageous as compared to a design such as in FIG. 40, which can use two heating elements 140A-B and four contact pads (which can be caused by the sensor 150 being positioned radially inward of the heating elements 140A-B). Fewer contact pads can be beneficial due to space constraints, especially as the overall size of the liquid lens 100 is made increasingly smaller. Also fewer contact pads for the heater 140 can provide more area for contact pads for the driving electrodes 126A-D, which can facilitate the use of more driving electrodes (e.g., 6, 8, 10, 12, 14, 16, or more electrodes 126), which can facilitate improved control over the fluid interface of the liquid lens.

The temperature sensor 150 can have an omega shape. The temperature sensor can have contact pads at a side opposite the contact pads of the heater 140. The conductive path of the temperature sensor can follow a first path (e.g., a curved or arched path) from the first sensor contact pad towards a heater contact pad on an opposing side. Then the conductive path and turn around and track a second path (e.g., a curved or arched path) that is radially inward of the first path and radially outward of the heater 140. The second path can extend towards the other heater contact pad, and can extend around about 120 degrees, about 150 degrees, about 180 degrees, about 210 degrees, about 240 degrees, about 270 degrees, about 300 degrees, or any values therebetween, or any ranges bounded therein, although other designs are possible. The conductive path can turn around again and track a third path (e.g., a curved or arched path) away from the second heater contact pad and to the second sensor contact pad. The combined first path, second path, and third path can cover about 270 degrees, about 300 degrees, about 330 degrees, about 360 degrees, about 390 degrees, about 420 degrees, about 450 degrees, about 480 degrees, or any values therebetween, or any ranged bounded thereby, although other configurations could be used.

The contact pads for the driving electrodes 126A-D can be disposed between the contact pads for the heater 140, such as on the same side of the liquid lens as the contact pads for the heater 140. The contact pads for the driving electrodes 126A-D can be aligned along a linear arrangement so that a straight line extends through the contact pads (e.g., all four contact pads for embodiments having four driving electrodes 126A-D). The driving electrodes 126A-D can be disposed radially inward of the sensor 150 and radially inward of the heater 140. Leads can extend from the driving electrodes 126A-D to the corresponding contact pads. The leads for the two electrodes 126C and 126D that are closer to the electrode contact pads can be disposed inside the leads for the two electrodes 126A and 126B that are positioned further from the electrode contact pads. The leads for the two electrodes 126A and 126B that are positioned further from the electrode contact pads can follow a path (e.g., a curved or arched path) along the radially outer edge of the electrodes 126C and 126D. Many variations are possible. The sensor contact pads can be moved closer together, which can provide a longer path length for the sensor conductive path.

In the embodiment illustrated in FIG. 40, the temperature sensor 150 can be radially inward of the heater 140. The sensor 150 in close proximity to the fluids can facilitate accurate temperature measurements. The sensor conductive path can extend from a first contact pad, along a first path towards the second contact pad, and the path can turn around and follow a second path (e.g., a curved or arched path) following the periphery of the electrodes 126A and 126C toward the electrode contact pads. The sensor conductive path can then turn around and follow a third path (e.g., a curved or arched path) that follows the periphery of the electrodes 126C, 126A, 126B, and 126D around to the other side of the electrode contact pads. Then the conductive path can turn around and extend back towards the sensor contact pads along a fourth path (e.g., a curved or arched path). The sensor conductive path can turn around and extend along a fifth path to the second sensor contact pad. The third path can be radially inward of the second path and the fourth path. In some embodiments, the first path and the fifth path can be omitted, and the second path and the fourth path can extend directly to the sensor contact pads. The third path can extend around about 180 degrees, about 210 degrees, about 240 degrees, about 270 degrees, about 300 degrees, about 330 degrees, about 340 degrees, about 350 degrees, or any values therebetween, or any ranges bounded therein, although other designs are possible. The combined conductive path length for the sensor can cover about 300 degrees, about 330 degrees, about 360 degrees, about 390 degrees, about 420 degrees, about 450 degrees, about 480 degrees, about 510 degrees, about 540 degrees, about 570 degrees, about 600 degrees, about 630 degrees, about 660 degrees, about 690 degrees, about 700 degrees, about 710 degrees, about 720 degrees, about 730 degrees, about 740 degrees, about 750 degrees, about 760 degrees, about 780 degrees, or any values therebetween, or any ranged bounded thereby, although other configurations could be used.

In some embodiments, the sensor conductive path can have turn arounds that are configured to avoid or impede excessive current density. For example, the turn arounds can have an area between the oppositely extending conductive paths that is wider than the thickness of the conductive path of the sensor, that is about 1.5 times, about 2 times, about 3 times, about 4 times, about 5 times, about 6 times, about 7 times, about 8 times, about 9 times, about 10 times, about 12 times, about 15 times, about 20 times, of the thickness of the conductive sensor path (or of the thickness of the insulating gap between the paths of the conductive sensor), or any values therebetween, or ranged bounded thereby, although other configurations are possible. These turn around configurations can be applied to any of the other sensor configurations disclosed herein. The heater embodiments disclosed herein can also have a wider gap at the turn around areas of the heater conductive paths.

The heater can include two heater elements 140A and 140B. Each of the heater elements 140A-B can have two contact pads. In some embodiments, more current can be delivered via the two heating elements 140A and 140B, which can result in faster heating, as compared to a single heating element 140. In some embodiments, the sensor contact pads can be moved closer together to make more room for the heating elements 140A-B to cover more area. In some cases, the heating elements 140A-B disposed radially outward of the sensor can have the benefit of more uniform distribution of heating as compared to embodiments with the heater closer to the liquid lens fluids. The driver electrodes 126A-D can be configured similar to the embodiment of FIG. 39.

The heater 140, sensor 150, and/or the electrodes 126A-D can be coplanar. The heater 140, sensor 150, and/or the electrodes 126A-D can be formed from the same layer of conductive material, which can be divided into the heater 140, sensor 150, and/or the electrodes 126A-D by insulating barriers (e.g., hard bonds, such as made by laser bonding, as discussed herein). Areas of inactive conductive material 149 can be disposed between the heater 140, sensor 150, and/or the electrodes 126A-D in some embodiments (as shown for example in FIG. 40).

Figure 41:
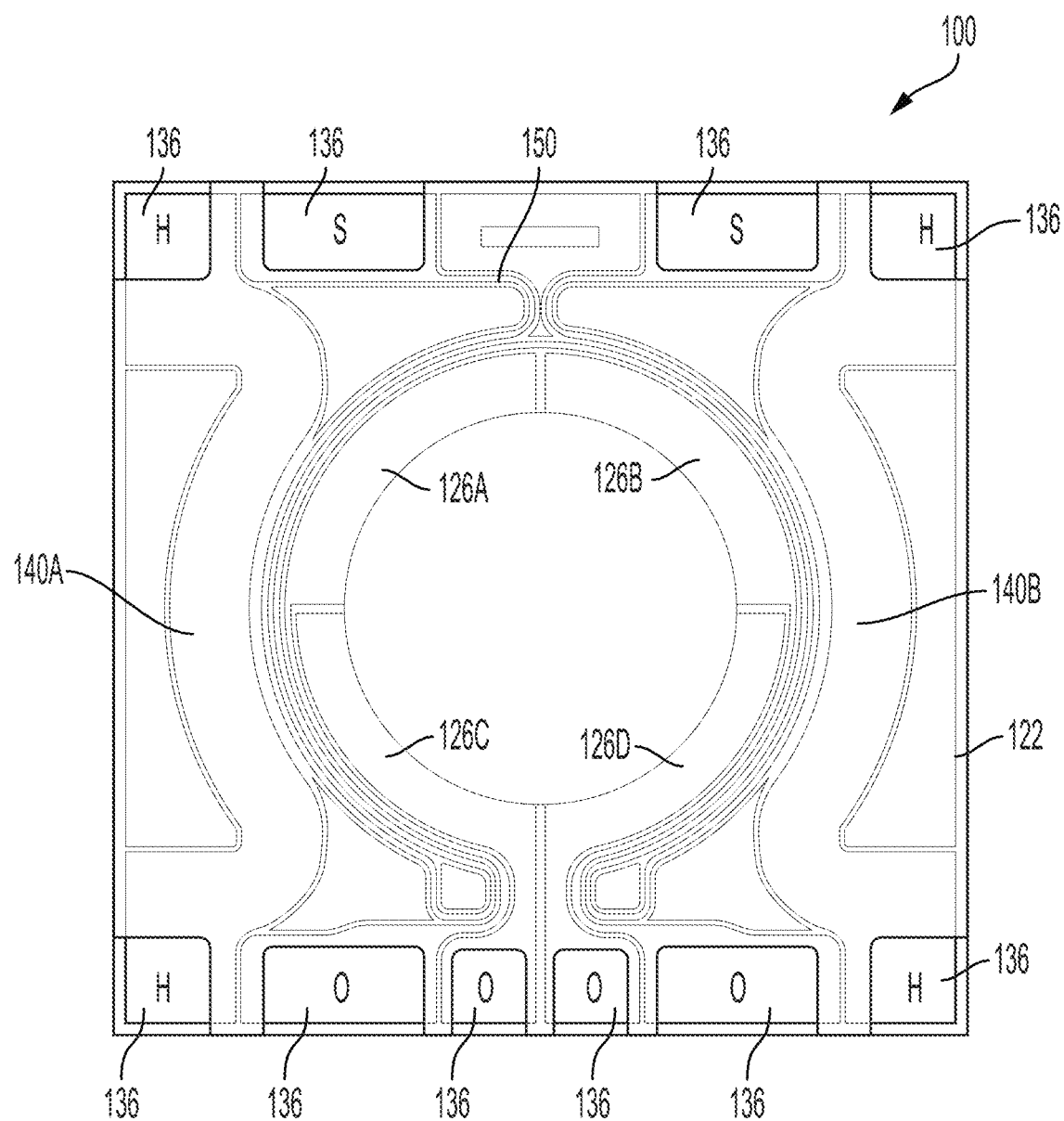
FIG. 41 shows an example embodiment of a liquid lens having a heater and temperature sensor.
Figure 42:
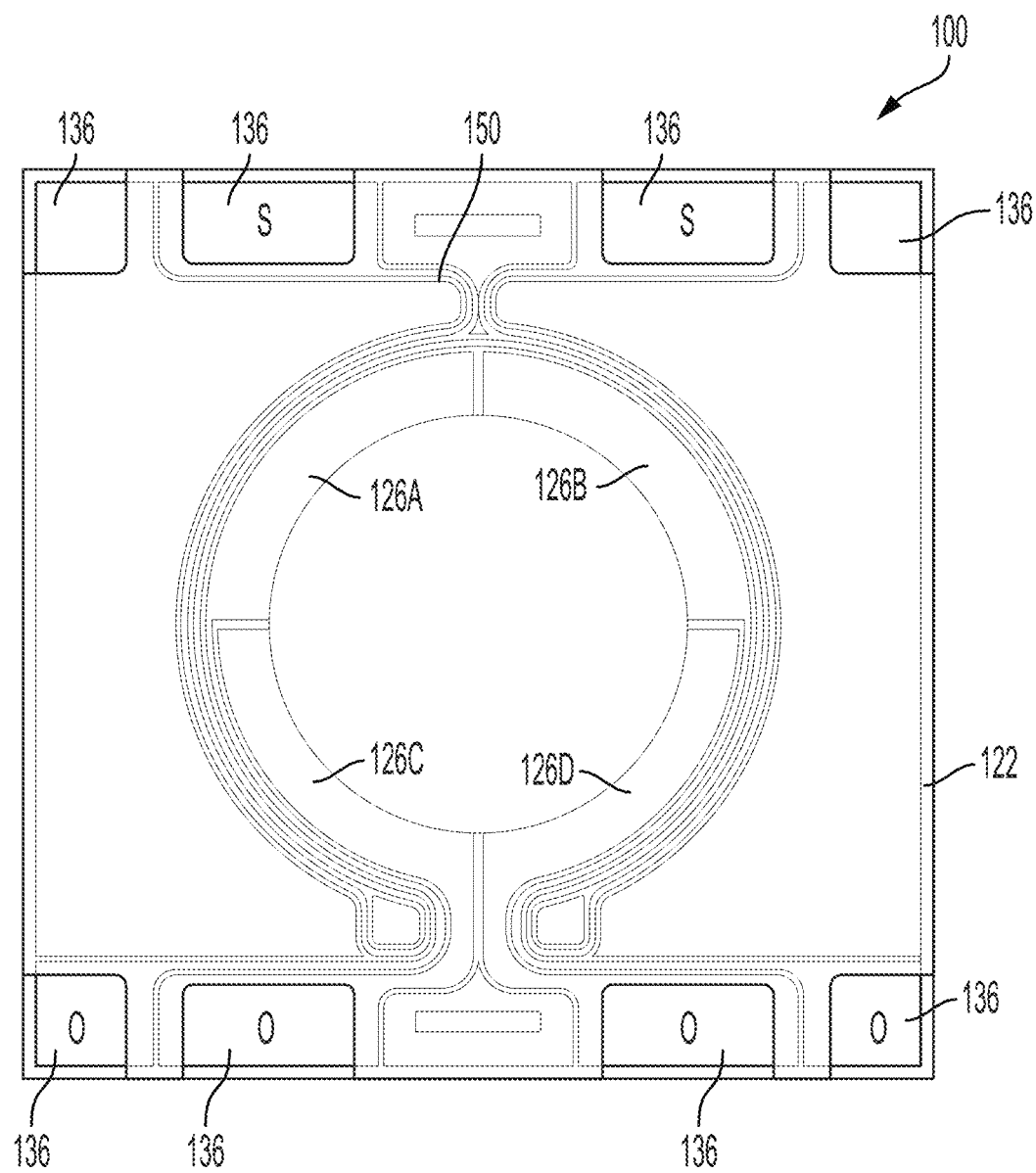
FIG. 42 shows an example embodiment of a liquid lens having temperature sensor.

The second outer layer 122, which can be a transparent window plate, and which can have cutouts 136 to provide access to the electrical contact pads for the heater 140, sensor 150, and/or the electrodes 126A-D. The second outer layer 122 is omitted from view in FIGS. 39 and 40. FIG. 41 shows the liquid lens of FIG. 40, with the second outer layer 122 having cutouts 136 for accessing the electrical contact pads. FIG. 42 shows an example embodiment having a sensor 150 and no heater on the lower area of the liquid lens (e.g., between the intermediate layer 120 and the second outer layer 122). A heater can be included on an upper area of the liquid lens (e.g., between the intermediate layer 120 and the first outer layer 118), or the heater can be omitted from the liquid lens. The sensor 150 can be similar to the sensor 150 described in connection with FIGS. 40 and 41. FIG. 42 shows cutouts at the top-right and top-left, which can be omitted. Various different implementations are possible for the heater and sensor, on the lower area of the liquid lens (e.g., between the intermediate layer 120 and the second outer layer 122) and/or the upper area of the liquid lens (e.g., between the intermediate layer 120 and the first outer layer 118) in any combination. In some cases, the lower area can have a heater and a sensor, and the upper area can additionally have a heater and a sensor. Either the lower area or the upper area can have both a heater and a sensor, while the other of the upper area or the lower area has neither. The upper area can have a heater while the lower area has a sensor, or the lower area can have a heater while the upper area has a sensor. Or in some cases either the upper area or the lower area can have both a heater and sensor while the other of the lower area or the upper area can have a heater only or a sensor only.

Figure 43:
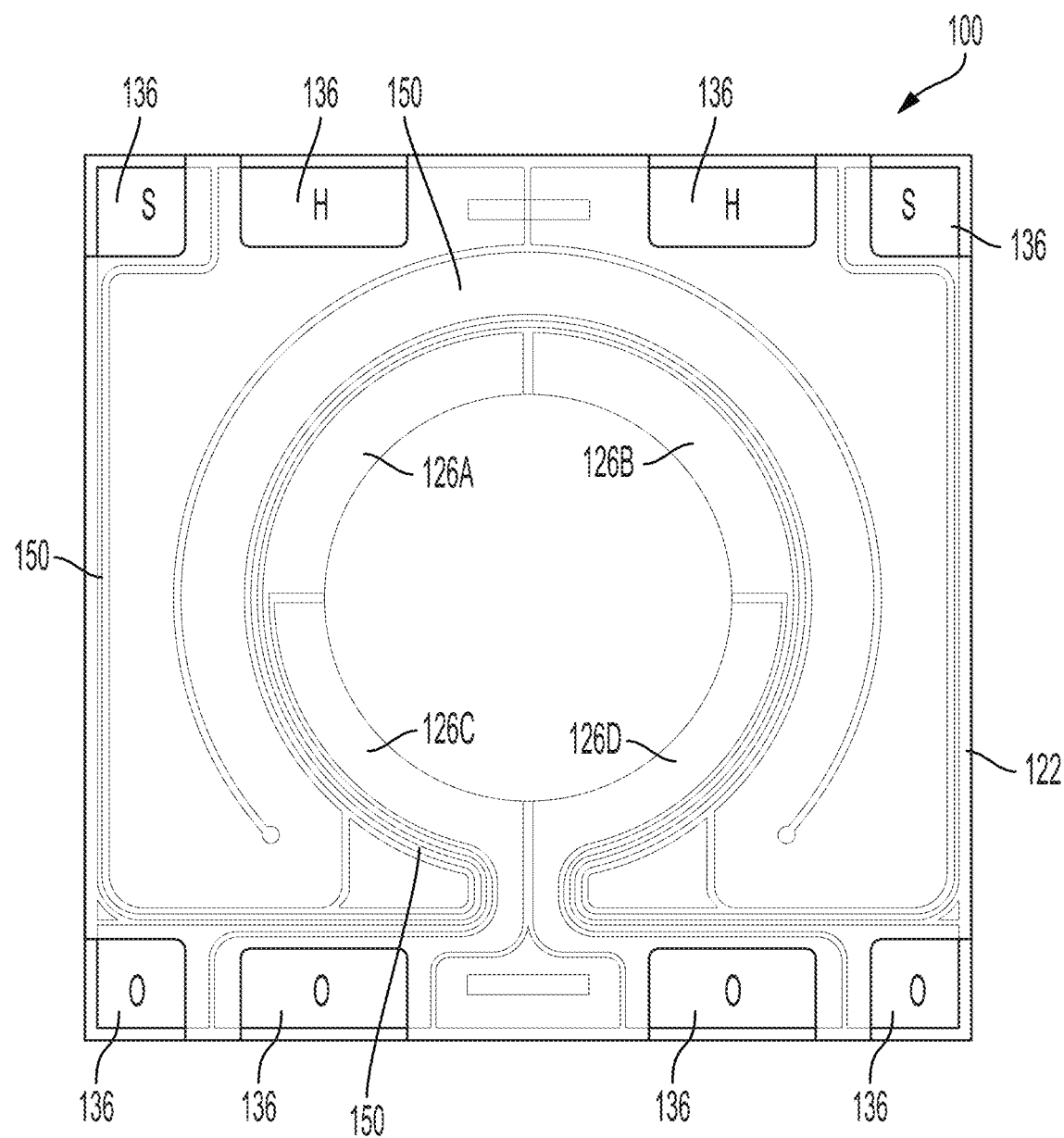
FIG. 43 shows an example embodiment of a liquid lens having a heater and temperature sensor.

FIG. 43 shows and example embodiment of a liquid lens having a heater 140, a temperature sensor 150, and electrodes 125A-D, which can be incorporated into a lower area of the liquid lens (e.g., between the intermediate layer 120 and the second outer layer 122). The heater 140 can have an omega shape. The heater 140 can have a first electrical contact pad, and a first path of the heater can extend from the contact pad across the liquid lens (e.g., from the top towards the bottom of FIG. 43) toward an opposing side (e.g., toward the contact pads of the electrodes 126A and 126C). The conductive path of the heater can turn around and follow a second path (e.g., a curved or arched path) that extends around at least a portion of the cavity (e.g., from the left side to the right side in FIG. 43), such as toward the contact pads for the electrodes 126B and 126D. Then the conductive path of the heater 140 can turn around and follow a third path away from the contact pads for the electrodes 126B and 126D and to the second contact pad of the heater 140 (e.g., along a direction from the bottom towards the top of FIG. 43). The second path of the heater 140 can extend around about 180 degrees, about 210 degrees, about 240 degrees, about 270 degrees, about 300 degrees, about 330 degrees, of the liquid lens, or any values therebetween, or any ranges bounded therein, although other designs are possible. The combined conductive path length for the heater can cover about 300 degrees, about 330 degrees, about 360 degrees, about 390 degrees, about 420 degrees, about 450 degrees, about 480 degrees, about 510 degrees, about 540 degrees, about 570 degrees, about 600 degrees, about 630 degrees, about 660 degrees, about 690 degrees, or any values therebetween, or any ranged bounded thereby, although other configurations could be used.

The contact pads for the heater 140 can be disposed between the contact pads for the sensor 150. The conductive path for the sensor 150 can extend outside the heater 140 conductive path for a first path area, and can extend inside the heater 140 (e.g., between the heater 140 and the cavity) for a second path area. The conductive material of the sensor can extend from a first sensor contact pad along a first path outside the heater, towards an opposing side of the liquid lens (e.g., toward the contact pads for the electrodes 126A and 126C. The sensor path can turn and follow a second path to a space between the heater material (e.g., between the two turn around areas of the heater material). The sensor material can follow a third path (e.g., a curved or arched path) that can follow the periphery of the cavity (e.g., between the heater 140 and the cavity). The sensor material can follow a fourth path through the space between the heater material and to the area outside the heater. The sensor material can follow a fifth path back across the liquid lens (e.g., away from the contact pads for the electrodes 126B and 126D to the second sensor contact pad). Leads for the electrodes 126A-D can extend through the space between the sensor material and the heater material.

Figure 44:
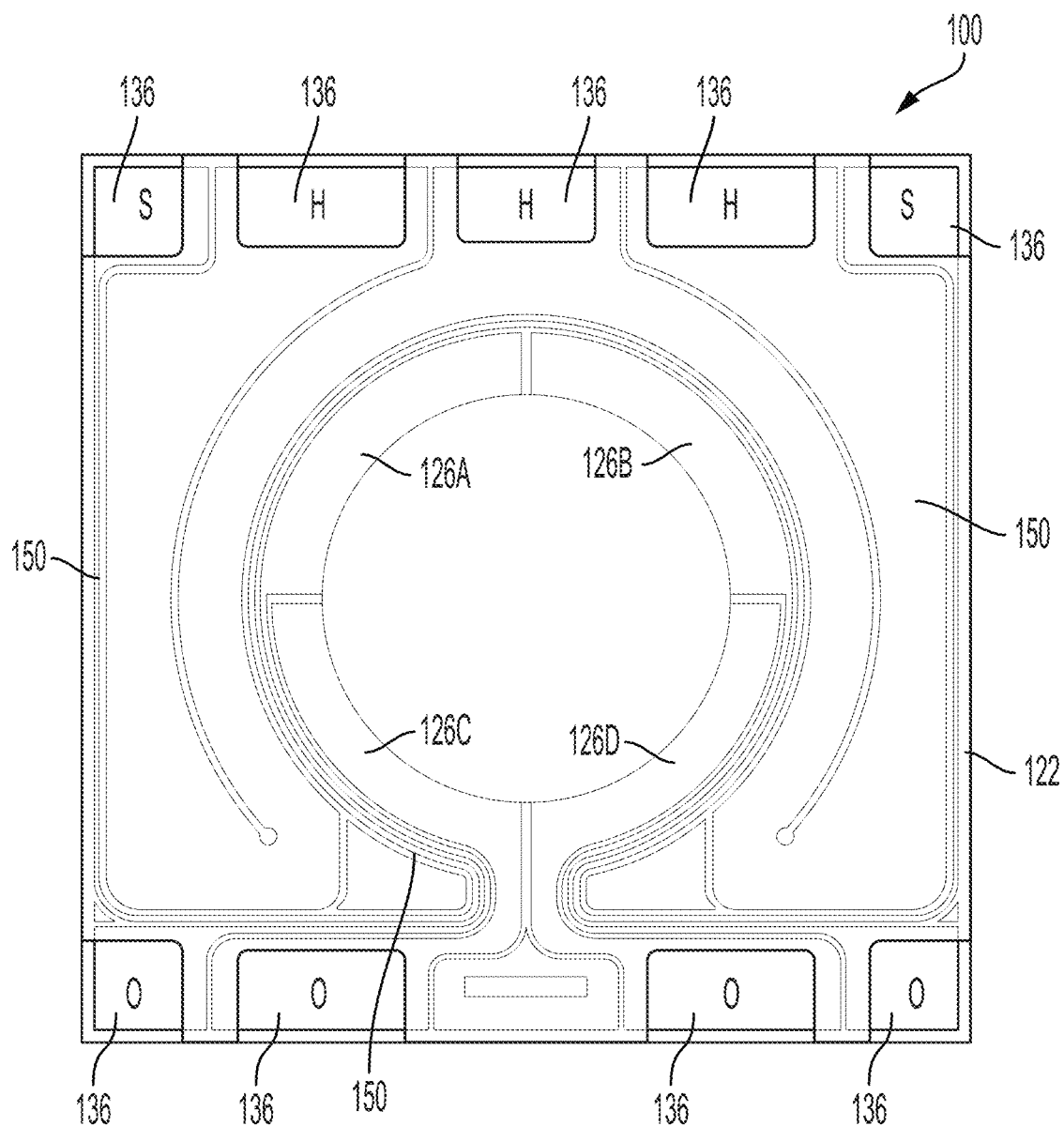
FIG. 44 shows an example embodiment of a liquid lens having a heater with three electrical contact pads and a temperature sensor.

FIG. 44 shows an embodiment of a liquid lens, which can be similar to the embodiment of FIG. 43, except as discussed herein. The heater 140 can have three contact pads (with three associated cutouts 136 to provide access thereto). The heater 140 can effectively have two heating elements, which can be electrically coupled, such as formed from a single continuous body of conductive material. One contact pad (e.g., the center contact pad) can be coupled to ground. Heater signals (e.g., current) can be delivered to the two other contact pads (e.g., the outer contact pads). Current can flow from the outer contact pads to the center contact pad. Current can be delivered to the heater at two contact pads, and the current travel through the heater along two paths that converge at a third contact pad. The heater 140 can have two heating elements, which can share a contact pad, which can be coupled to ground. In some embodiments, heater signals (e.g., current) can be delivered to one contact pad (e.g., the center contact pad), and the other two contact pads (e.g., the outer contact pads) can be grounded. The current can flow from the center contact pad to the two outer contact pads. Current can be delivered to a first contact pad, and the current can branch to travel along two paths to distinct contact pads. The heater 140 can have two heating elements, which can share a common contact pad, which can receive the heater driving signals. Comparing the embodiments of FIGS. 43 and 44, because the current can follow two paths through the heater conductive material, the heater of FIG. 44 can have lower resistance than the heater of FIG. 43 (e.g., about half the resistance). In some cases, more current can be applied through the heater of FIG. 44 than the heater of FIG. 43, which can enable faster heating.

Figure 45:
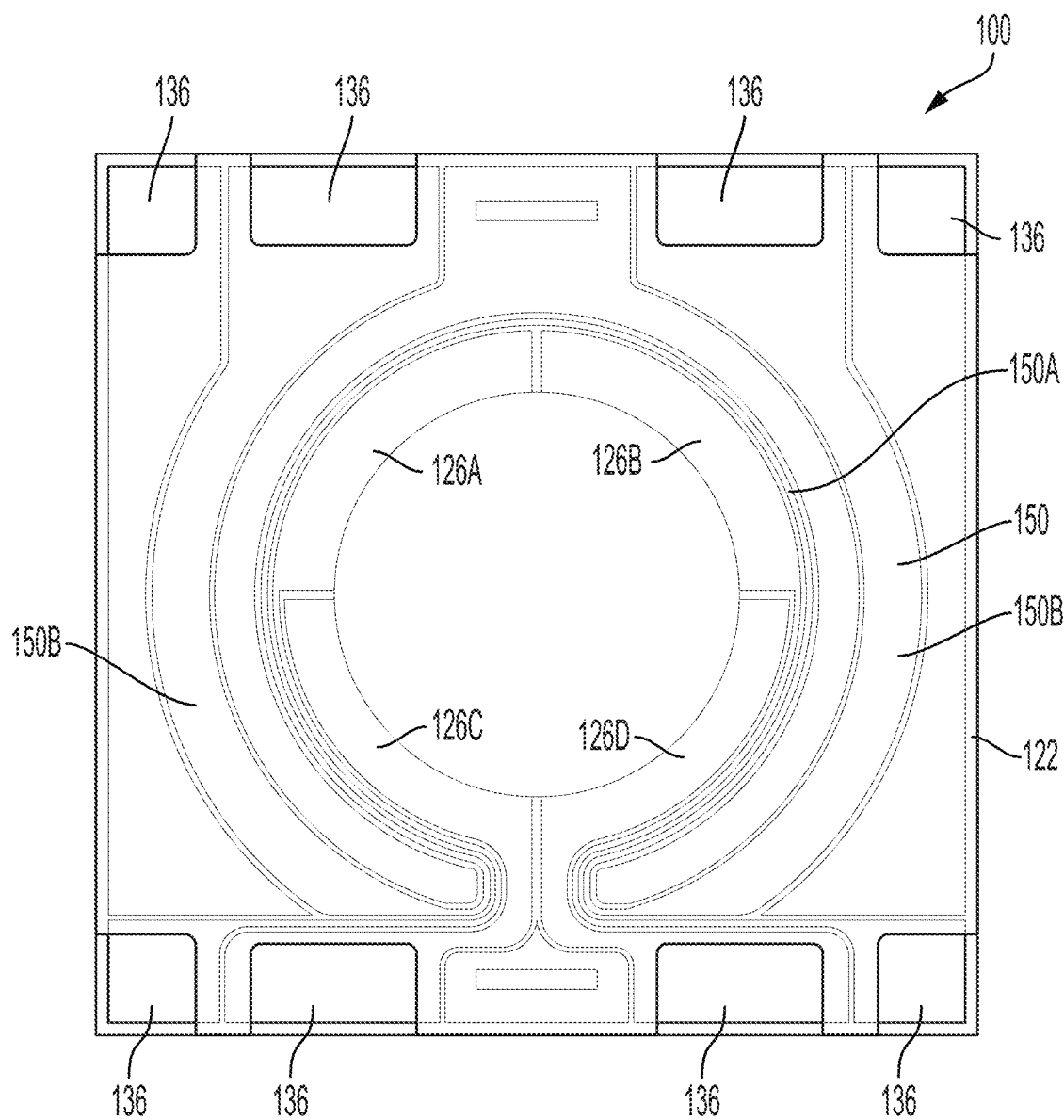
FIG. 45 shows an example embodiment of a liquid lens having a temperature sensor that has a wide area and a narrow area.

In some embodiments, the sensor material can have different thicknesses at different areas, which can affect the sensitivity of the temperature sensor. FIG. 45 shows an example embodiment of a liquid lens that can be similar to the embodiment of FIG. 42, except as discussed herein. The sensor conductive material can have an omega shape. The sensor conductive material can have a first portion 150A that that is thinner than a second portion 150B. The first portion 150A can be disposed closer to the cavity than the second portion 150B. The first portion 150A can be radially inward of the second portion 150B. The first portion 150A can extend along a path (e.g., a curved or arched path) that follows the periphery of the cavity. The first portion 150A can form a partial circle with an opening between two ends. The second portions 150B can extend from each end of the first portion to respective electrical contact pads. A first part of the second portion 150B can extend from the first end of the first portion 150A to a first contact pad. A second part of the second portion 150B can extend from the second end of the first portion 150A to a second contact pad. The first portion 150A can extend around an angular range of about 180 degrees, about 210 degrees, about 240 degrees, about 270 degrees, about 300 degrees, about 330 degrees, about 340 degrees, about 350 degrees, about 355 degrees, of the liquid lens, or any values therebetween, or any ranges bounded therein, although other designs are possible. The leads connecting the electrodes 126A-D to the respective contact pads can extend through the opening or gap between the two ends of the first portion 150A of the sensor conductive material. The combined conductive path length for the sensor can cover about 300 degrees, about 330 degrees, about 360 degrees, about 390 degrees, about 420 degrees, about 450 degrees, about 480 degrees, about 510 degrees, about 540 degrees, about 570 degrees, about 600 degrees, about 630 degrees, about 660 degrees, about 690 degrees, about 700 degrees, or any values therebetween, or any ranged bounded thereby, although other configurations could be used.

The resistance for the first portion 150A of the sensor conductive material can be different than the resistance for the second portion 150B of the sensor conductive material because of the wider width of the second portion 150A. The wider second portion 150B can have a lower resistance than the narrower first portion 150A, which can have a higher resistance. The first portion 150A of the sensor can be more sensitive than the second portion 150B. In some embodiments, because the first portion 150A is closer to the cavity, and the fluids, than the second portion 150B, the overall sensor design of FIG. 45 can be more sensitive and can more accurately measure the temperature of the fluids, as compared to sensor designs that have a more uniform width.

The width of the second area 150B of the sensor can be about 1.25 times, about 1.5 times, about 1.75 times, about 2 times, about 2.5 times, about 3 times, about 4 times, about 5 times, about 7 times, about 10 times, about 12 times, about 15 times, about 17 times, about 20 times, about 25 times, about 30 times, about 40 times, or about 50 times, the width of the first area 150A, or more, or any values therebetween, or any ranges bounded therein, although other configurations are possible. The resistance of the second area 150B of the sensor can be 1.25 times, about 1.5 times, about 1.75 times, about 2 times, about 2.5 times, about 3 times, about 4 times, about 5 times, about 7 times, about 10 times, about 12 times, about 15 times, about 17 times, about 20 times, about 25 times, about 30 times, about 40 times, or about 50 times the resistance of the first area 150A, or more, or any values therebetween, or any ranges bounded therein, although other configurations are also possible.

Figure 46:
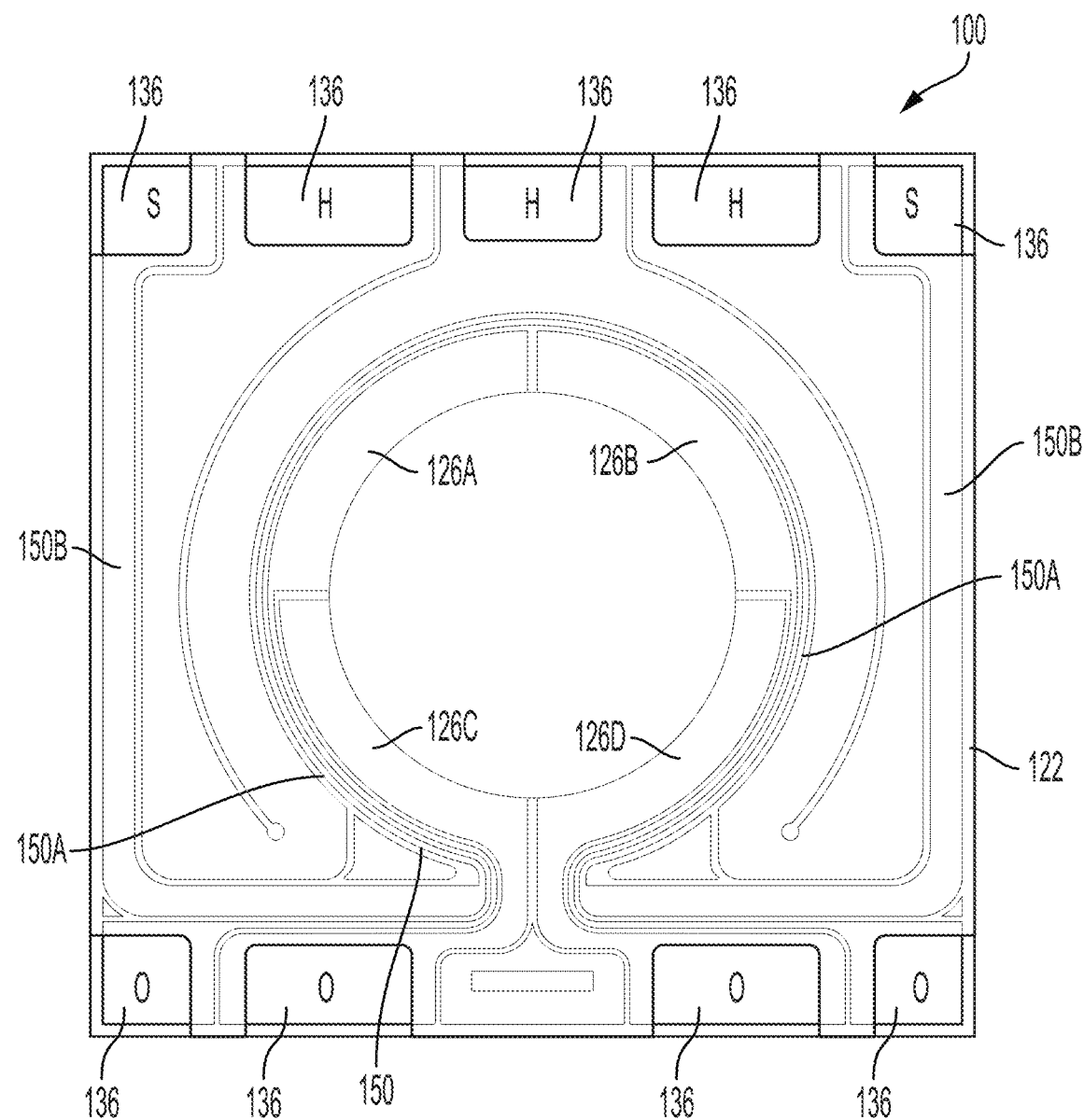
FIG. 46 shows an example embodiment of a liquid lens having a heater and a temperature sensor that has a wide area and a narrow area.

The other sensor and heater designed disclosed herein can also have different sensor areas of different widths, such as to provide a sensor that is more sensitive to measuring the fluid temperature. For example, a heater (e.g., similar to the heaters 140 of FIG. 43 or 44 can be disposed between the first portion 150A and the second portion 150B of the sensor. The embodiments of FIGS. 43 and 44 can be modified so that the portion of the sensor conductive material that is radially or laterally outward of the heater 140 is wider than the portion of the sensor conductive material that is radially or laterally inward of the heater 140. FIG. 46 shows and example embodiment of a liquid lens 100 that is similar to the embodiment of FIG. 44, except that the first portion 150A of the sensor conductive path has a narrower width than the second portion 150B of the sensor conductive path.

Figure 47:
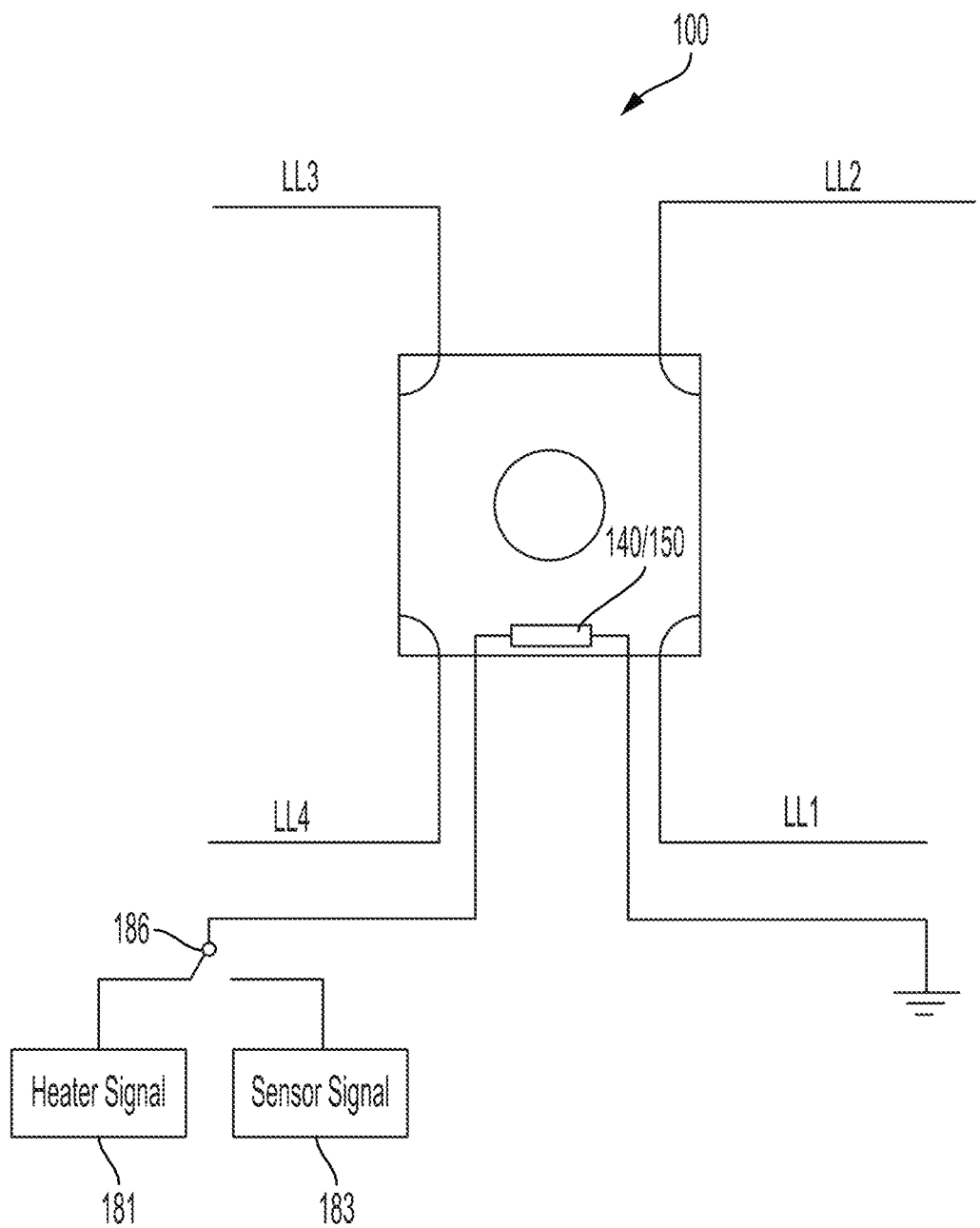
FIG. 47 shows an example embodiment of a liquid lens having a combined heater and temperature sensor.
Figure 48:
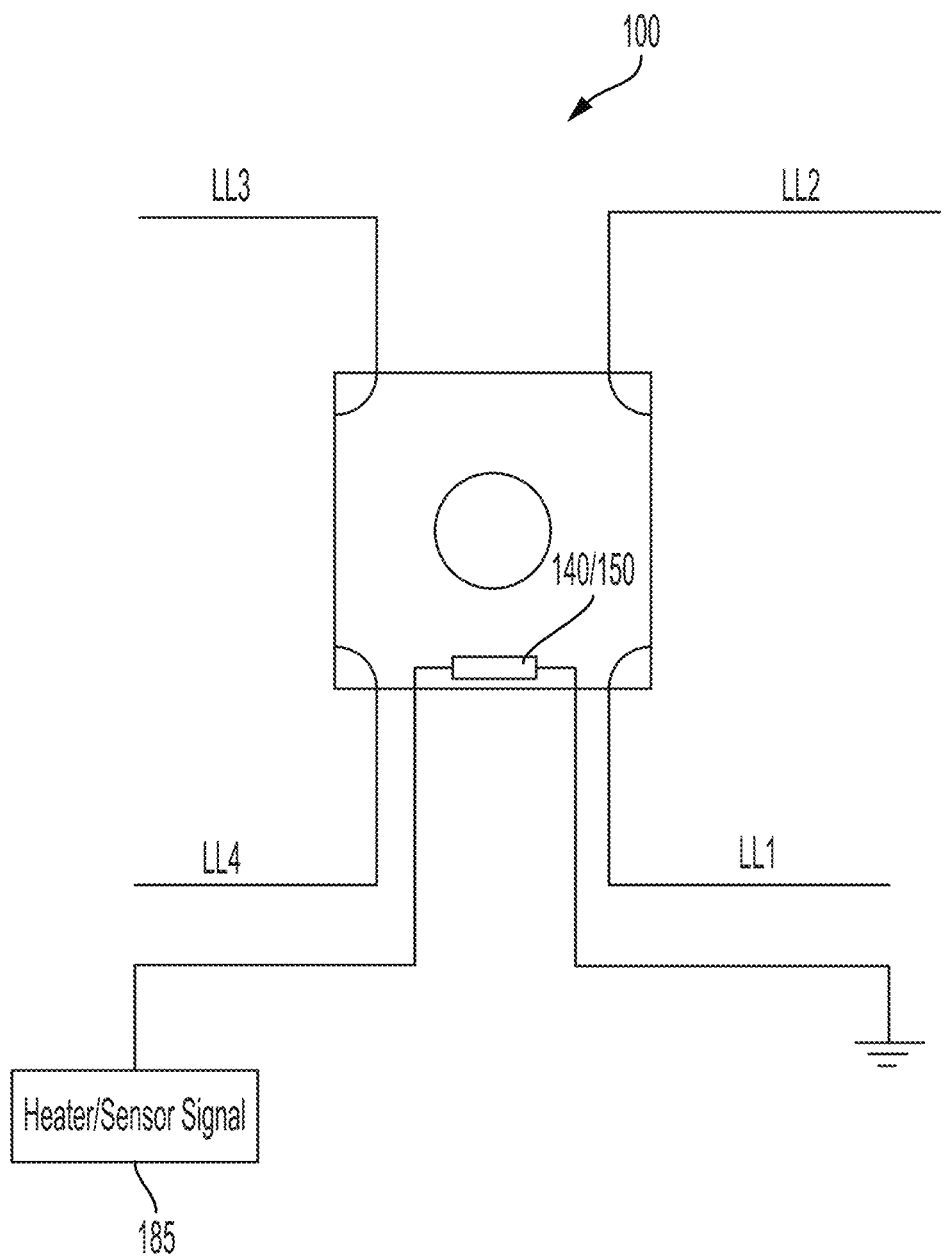
FIG. 48 shows an example embodiment of a liquid lens having a combined heater and temperature sensor.

In some embodiments, the liquid lens 100 can include a combined heater and temperature sensor, as shown, for example, in FIG. 47. The temperature sensor can be a resistance-based temperature sensor. The combined temperature sensor and heater 140/150 can result in fewer contact pads, as compared to embodiments that use separate heaters and temperature sensors, which can be advantageous due to space constraints, especially as the size of liquid lenses is reduced, or as the number of electrodes (and associated electrode contact pads) is increased. The liquid lens 100 can include a conductive (e.g., resistive) area or pathway, which can be similar to the embodiments of the heaters and/or sensors disclosed herein. For example, the various heater designs disclosed herein can be used to measure a temperature, and the various temperature sensor designs used herein can be driven so as to apply heat to the liquid lens. The system can include at least one switch 186, which can switch between a heater signal 181 and a sensor signal 183. When the switch is in the heater position (as shown in FIG. 47), the heater signal 181 can be delivered to the conductive area or pathway so that it operates as a heater. When the switch is in the sensor position, the sensor signal 183 can be delivered to the conductive area or pathway so that it operates as a sensor. Different drivers can be used to supply the heater signal 181 and the sensor signal 183. Additional circuitry and/or components can be included, such as a reference resistor, or other components such as those used to operate a resistance based temperature sensor. The switch 186, or another switch, can toggle to engage or disengage additional circuitry, such as for taking a temperature measurement (e.g. based on the determining the resistance of the heater/sensor). The conductive area or pathway for the heater/sensor 140/150 can be coupled to ground, although other embodiments are also possible. The sensor signal 183 can be a lower voltage than the heater signal 181. For various sensor embodiments disclosed herein, a known voltage can be applied through the sensor material, and a current can be measured to determine a resistance of the sensor material (which resistance can change with temperature). In some cases, a voltage is applied to produce a known current, and the voltage can be measured to determine the resistance of the sensor material. Any suitable technique can be used for measuring the temperature of the liquid lens.

In some embodiments, a single driver 185 can apply both the heater signal and the sensor signal. For example, a driver can apply a first voltage or current as a heater signal and can supply a second voltage or current (e.g., lower than the first voltage or current) as the sensor signal. A heater signal can be applied during a first period of time, and the sensor signal can be applied during a second period of time. In some cases, the heater signal can be stopped, and after a delay of time, the sensor signal can be used to take the temperature measurement. The delay of time can allow heat applied by the heater to dissipate or spread through the liquid lens before the temperature measurement is taken. In some cases, a pulse width modulated (PWM) heater signal can be applied, and the temperature measurement can be taken between pulses of the heater signal. For example, the duty cycle of the PWM heater signal can be modified to change the amount of heating applied. The signal can change between a high voltage state and a low voltage state, and the low voltage state of the heater signal can be used as the sensor signal. Various other approaches can be used to make a temperature measurement using the heater/sensor 140/150. For example, a faster signal (e.g., a mega Hz signal) with a lower amplitude can be applied over the PWM heater signal, and the eddy current can be measured to determine the temperature. In some cases, the temperature measurement can be made while a heater signal is being applied. For example, while a voltage is being applied for heating the liquid lens (e.g., a DC voltage a pulsed voltage, etc.) the current through the heater can be measured to determine the resistance which can be used to determine the temperature.

In some embodiments, a calibration can be applied to the sensor measurements to determine a temperature, and that calibration can depend on how the heater was driven for a time prior to the temperature sensor measurement, or at the time of the sensor measurement. For example, if the heater was off for a time, and then driven at a high level for a short period of time, and the temperature sensor measurement was taken right after that high level heater signal, the sensor measurement can be tempered to determine a liquid lens or fluid temperature that is lower than that sensor measurement could otherwise indicate. By comparison, if the heater was run at a low level for a longer period of time, and then a sensor measurement is taken, the calibration could interpret that sensor measurement differently, since the heat would have had more time to spread, such as to bring the liquid lens to or toward a steady state temperature. If a temperature measurement is taken while the heater/sensor 140/150 is actively heating (e.g., by measuring the current when a known heating voltage signal is applied), then the calibration could interpret that sensor measurement differently than for temperature measurements taken when no heating voltage signal is applied, or depending on the duty cycle applied at that time.

In some embodiments, a sensor signal can have a voltage that is sufficiently low to avoid, impede, or reduce electrolysis. For example, the sensor signal can have a voltage of less than about 2 volts, less than about 1.75 volts, less than about 1.5 volts, less than about 1.4 volts, less than about 1.3 volts, less than about 1.25 volts, less than about 1.2 volts, less than about 1.15 volts, less than about 1.1 volts, less than about 1 volt, or any values therebetween, or any ranges bounded herein, although other voltages can be used in some implementations. In some cases, a driver can supply the low sensor signal voltage. In some cases, a voltage divider can be used to reduce the voltage so as to supply the low sensor signal voltage. In some embodiments, a DC/DC converter (e.g., a buck converter) can be used, or any voltage modifier can be used to reduce the voltage to supply the low sensor signal voltage.

Figure 49:
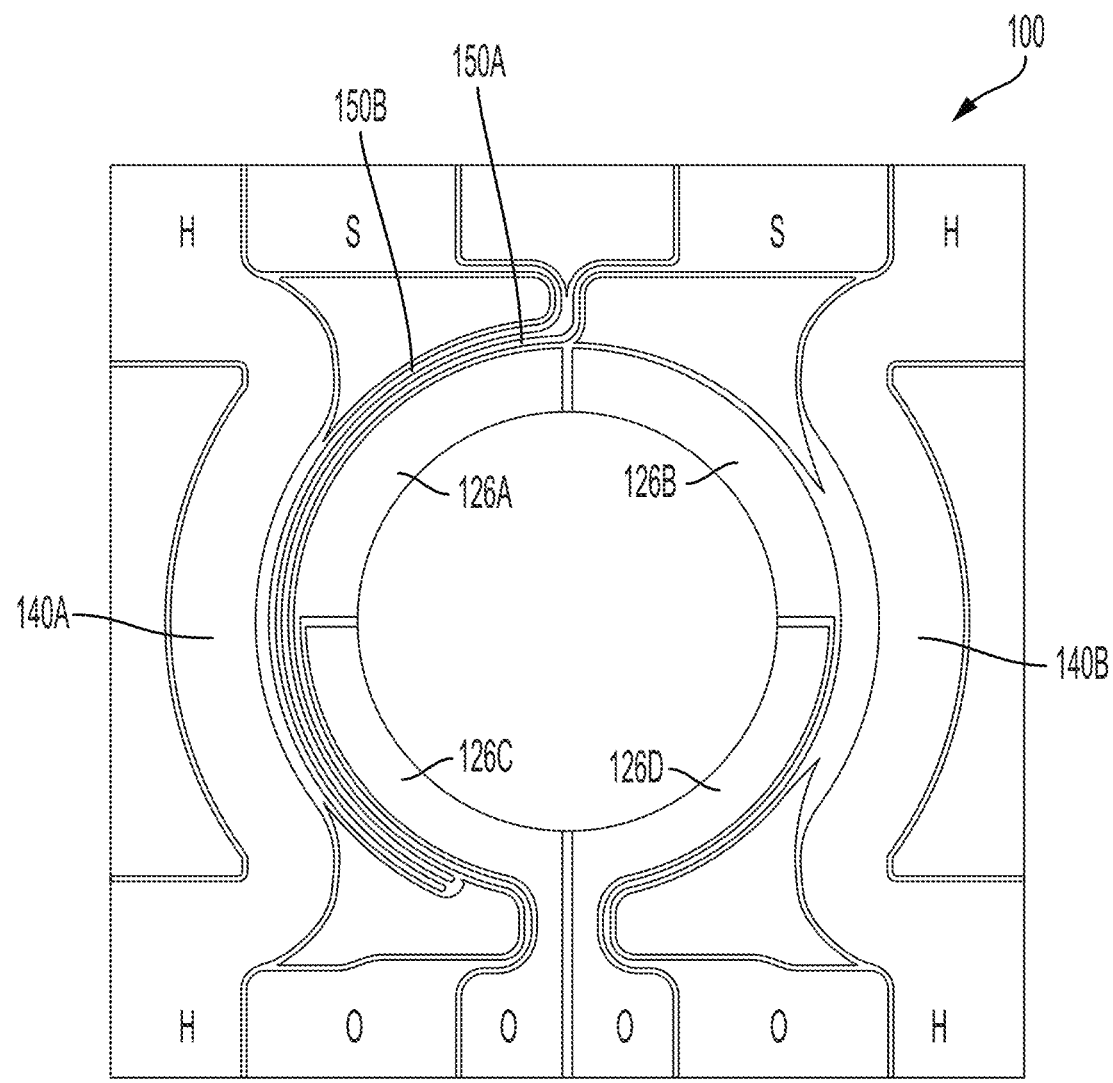
FIG. 49 shows an example embodiment of a liquid lens having a heater and a capacitance-based temperature sensor.

FIG. 49 is an example embodiment of a liquid lens 100 that can include a capacitance-based temperature sensor 150, which can be similar to the embodiment of FIG. 32. The sensor can include a first conductive path 150A and a second conductive path 150B, which can be electrically insulated from each other. The first conductive path 150A can be coupled to a first contact pad, and the second conductive path 150B can be coupled to a second contact pad. In some embodiments, there is no direct electrical connection between the first conductive path 150A and the second conductive path 150B. The first conductive path 150A and the second conductive path 150B can be capacitively coupled. The first conductive path 150A and the second conductive path 150B and be substantially parallel, for at least a portion thereof, for example to form an effective parallel plate capacitor. The first conductive path 150A can be a curved or arched path, and can follow the periphery of the cavity. The second conductive path 150B can be a curved or arched path, which can follow the first conductive path 150A. The first conductive path 150A and the second conductive path 150B can follow concentric arched paths. The second conductive path 150B can be positioned radially or laterally outward of the first conductive path.

A dielectric barrier (e.g., an insulating gap) can be between the first conductive path and the second conductive path. The dielectric barrier can include glass, can include a hard or soft bond (e.g., formed by laser bonding, as discussed herein), can include air, or can include the polar fluid 106 (e.g., if there capacitive sensor 150 were incorporated into the upper portion of the liquid lens), or any other suitable dielectric material. If a portion of the polar fluid is disposed between the first conductive path 150A and the second conductive path 150B, that polar fluid can be insulated from direct contact with the first conductive path 150A and/or the second conductive path 150B. In some embodiments, the capacitance between the first conductive path 150A and the second conductive path 150B can be measured, and that measurement can be used to determine the temperature.

Figure 50:
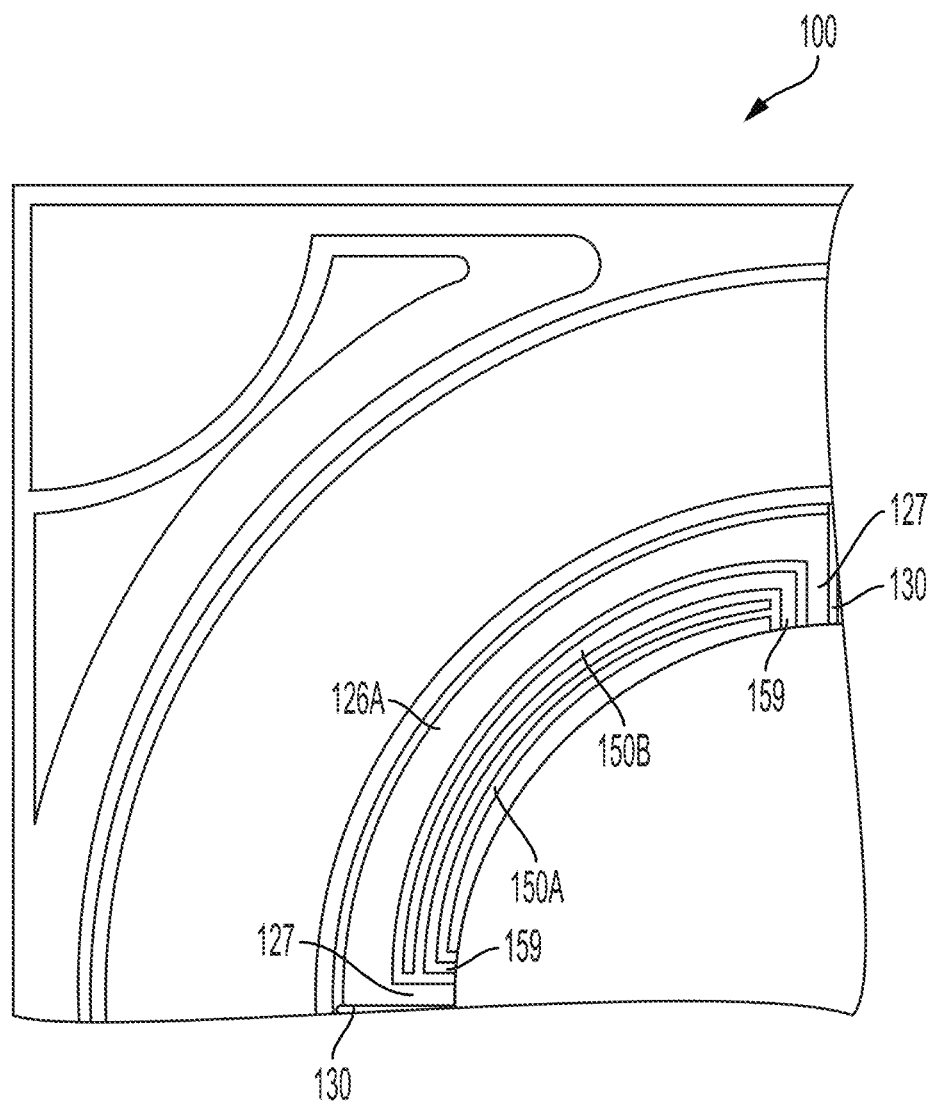
FIG. 50 shows an example embodiment of a liquid lens having a capacitance-based temperature sensor.

The capacitance-based temperature sensor can be incorporated in the lower area of the liquid lens (as shown in FIG. 49), and/or the capacitance-based temperature sensor can be incorporated into the upper area of the liquid lens. The sensors disclosed herein can be disposed on the side wall of the truncated cone structure in some embodiments. FIG. 50 shows an example embodiment of a liquid lens that has a sensor on the cone wall. FIG. 50 is a top-down view of one quadrant of the liquid lens. In FIG. 50, some of the insulating material is omitted from view, to facilitate viewing of the conductive layer. Insulating barriers can be used to separate the conductive layer into the electrode 126A and the sensor 150. Insulating barriers 130 (e.g., scribes) can separate the electrodes 126A-D, such as into quadrant electrodes. The sensor 150 can be disposed between two of the insulating barriers 130 that separate the electrodes 126A-D. A first conductive path 150A can extend along (e.g., substantially parallel to) a second conductive path 150B. An insulating barrier can be between the first conductive path 150A and the second conductive path 150B, as discussed herein. The first conductive path 150A and the second conductive path 150B can be on the side wall of the truncated cone structure. Leads 159 can connect the corresponding first conductive path 150A and second conductive path 150B to electrical contact pads (not shown in the top-down view of FIG. 50). The leads 159 can extend to the bottom of the truncated cone structure and wrap onto the bottom are of the liquid lens (e.g. between the intermediate layer 120 and the second outer layer 122). The leads 159 can extend to contact pads on the bottom area similar to the other embodiments disclosed herein. The side wall of the truncated cone structure can also have the electrode 126A. The electrode 126A can be disposed above the sensor 150 (e.g., closer to the wide end of the cone structure). Leads 127 can extend from the electrode 126A down the sidewall of the truncated cone, past the sensor 150, and can wrap around onto the bottom area of the liquid lens, and can connect the electrode 126A to a contact pad similar to other embodiments disclosed herein. The insulating material (e.g., parylene) can be disposed over the electrode 126A and the sensor 150, which can insulate the electrode 126A and the sensor 150 from the fluids in the liquid lens.

The insulating barriers 130 can contain the sensor 150 to a single quadrant or area of the liquid lens. In some embodiments, the other quadrants (or areas between electrode-separating barriers 130) can also have similar sensors. In some embodiments, the other quadrants (or areas between electrode-separating barriers 130) do not have corresponding sensors. The electrodes 126B-D of the other quadrants or areas that do not have corresponding sensors can be made of similar size to the electrode 126A that is in the same quadrant or area as the sensor 150, such as be insulating an inactive area of conductive material that is similar in size and/or corresponding location to the sensor 150.

Various other types of sensors can be used. For example, the first conductive path 150A and the second conductive path 150B can be replaced with a single continuous conductive path that extends onto the sidewall of the truncated cone (e.g., similar to FIG. 50), and that conductive path can be used as a resistance-based temperature sensor, as discussed herein.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor or heater that is insulated from the first and second electrodes by at least about 0.1 gigaohm. The temperature sensor or heater can be insulated from the first and second electrodes by at least about 1 gigaohms. The temperature sensor or heater can be insulated from the first and second electrodes by at least about 5 gigaohms. The temperature sensor or heater can be insulated from the first and second electrodes by at least about 10 gigaohms. The temperature sensor or heater can be insulated from one of the first and second electrodes by not more than about 25 gigaohms. The temperature sensor and/or heater can be coplanar with at least a portion of the first one or more electrodes. The temperature sensor or heater can be insulated from the first one or more electrodes by a distance of at least about 30 microns. The temperature sensor or heater can be insulated from the first one or more electrodes by a distance of at least about 50 microns. The temperature sensor and/or heater can be coplanar with the second electrode. The temperature sensor or heater can be insulated from the second electrode by a distance of at least about 30 microns. The temperature sensor or heater can be insulated from the second electrode by a distance of at least about 50 microns. The temperature sensor or heater can be insulated from the first fluid by a distance of at least about 30 microns. Contact area between the second electrode and the first fluid can be less than about 1% of the footprint of the liquid lens. The contact area between the second electrode and the first fluid can extend around less than about 15 degrees of the chamber. The liquid lens can comprise a temperature sensor that is coplanar with at least a portion of the one or more first electrodes and a heater that is coplanar with the temperature sensor. The liquid lens can comprise an intermediate layer having a truncated cone cavity having a wide end and a narrow end, the intermediate layer comprising glass; a glass first outer layer bonded to the intermediate layer at the wide end of the truncated cone cavity; and a glass second outer layer bonded to the intermediate layer at the narrow end of the truncated cone cavity. A temperature sensor can be positioned between the intermediate layer and the glass second outer layer. A heater can be positioned between the intermediate layer and the glass second outer layer.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor or heater. The liquid lens can be configured to impede crosstalk between the temperature sensor or heater and the first and second electrodes. The liquid lens can comprise a temperature sensor that comprises conductive material in the same layer as conductive material of the second electrode and an insulating barrier between the conductive material of the temperature sensor and the conductive material of the second electrode. The insulating barrier can have a thickness of at least about 30 microns. The insulating barrier can have a thickness of at least about 50 microns. The insulating barrier can have a thickness of at least about 100 microns. The insulating barrier can have an insulating resistance of at least about 0.1 gigaohm. The insulating barrier can have an insulating resistance of at least about 1 gigaohms. The insulating barrier can have an insulating resistance of at least about 5 gigaohms. The insulating barrier can have an insulating resistance of at least about 10 gigaohms. Contact area between the second electrode and the first fluid can be less than about 1% of the footprint of the liquid lens. The contact area between the second electrode and the first fluid can extend around less than about 15 degrees of the chamber. The liquid lens can comprise an intermediate layer having a truncated cone cavity having a wide end and a narrow end, the intermediate layer comprising glass; a glass first outer layer bonded to the intermediate layer at the wide end of the truncated cone cavity; and a glass second outer layer bonded to the intermediate layer at the narrow end of the truncated cone cavity. The temperature sensor can be positioned between the intermediate layer and the second glass outer layer. The liquid lens can comprise a heater instead of or in addition to the temperature sensor. The heater can comprise conductive material in the same layer as conductive material of the one or more first electrodes. The heater can comprise an insulating barrier between the conductive material of the heater and the conductive material of the one or more first electrodes. The insulating barrier can have a thickness of at least about 30 microns. The insulating barrier can have a thickness of at least about 50 microns. The insulating barrier can have a thickness of at least about 100 microns. The insulating barrier can have an insulating resistance of at least about 0.1 gigaohm. The insulating barrier can have an insulating resistance of at least about 1 gigaohms. The insulating barrier can have an insulating resistance of at least about 5 gigaohms. The insulating barrier can have an insulating resistance of at least about 10 gigaohms. The liquid lens can comprise an intermediate layer having a truncated cone cavity having a wide end and a narrow end, the intermediate layer comprising glass; a glass first outer layer bonded to the intermediate layer at the wide end of the truncated cone cavity; and a glass second outer layer bonded to the intermediate layer at the narrow end of the truncated cone cavity. The heater can be positioned between the intermediate layer and the second glass outer layer. The liquid lens can comprise a temperature sensor instead of or in addition to the heater.

In various embodiments, the temperature sensor or heater can be grounded. The temperature sensor or heater can be AC coupled to ground. The temperature sensor or heater can be coupled to electrical circuitry comprising at least one capacitor between the temperature sensor or heater and ground. The at least one capacitor can be configured to pass signals of the temperature sensor or heater to ground while impeding a crosstalk signal from one or more of the electrodes of the liquid lens. The at least one capacitor can be integrated into the liquid lens between the temperature sensor or heater and ground. The at least one capacitor can operate as a high pass filter that passes signals having a frequency over a threshold and impedes signals having a frequency below a threshold. The liquid lens can comprise driver circuitry configured to produce rectangle wave driving signals and one or more snubbers. The temperature sensor or heater can be coupled to electrical circuitry, and the temperature sensor or heater can be configured to use a floating voltage that is not grounded.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode comprising conductive material in electrical communication with the first fluid, wherein the second electrode covers an area of about 10% or less of a footprint of the liquid lens, wherein the liquid lens is configured such that a position of the fluid interface is based at least in part on voltage applied between the first and second electrodes, and a temperature sensor or heater comprising conductive material in a same layer as the conductive material of the second electrode. The second electrode can cover an area of about 5% or less of the footprint of the liquid lens. The second electrode can cover an area of about 2% or less of the footprint of the liquid lens. The second electrode can cover an area of at least about 0.5% of the footprint of the liquid lens. The contact area between the second electrode and the first fluid can be less than about 1% of the footprint of the liquid lens. The contact area between the second electrode and the first fluid can be less than about 0.25% of the footprint of the liquid lens. The contact area between the second electrode and the first fluid can be less than about 0.1% of the footprint of the liquid lens. The contact area between the second electrode and the first fluid can be at least about 0.01% of the footprint of the liquid lens. The contact area between the second electrode and the first fluid can extend around less than 360 degrees of the chamber. The contact area between the second electrode and the first fluid can extend around less than about 90 degrees of the chamber. The contact area between the second electrode and the first fluid can extend around less than about 15 degrees of the chamber. The contact area between the second electrode and the first fluid can extend around less than about 5 degrees of the chamber. The contact area between the second electrode and the first fluid can extend around at least about 1 degrees of the chamber.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor or heater that is AC coupled to ground. The temperature sensor or heater can be coupled to electrical circuitry comprising at least one capacitor between the temperature sensor or heater and ground. The at least one capacitor can be configured to pass signals of the temperature sensor or heater to ground while impeding a crosstalk signal from one or more of the electrodes from passing to ground. The at least one capacitor can be configured to operate as a high pass filter to pass signals having a frequency over a threshold and to impede signals having a frequency below a threshold. The at least one capacitor can be integrated into the liquid lens between the temperature sensor or heater and ground. The electrodes of the liquid lens can be driven at a first frequency, and the heater or temperature sensor can be driven at a second frequency that is higher than the first frequency. The at least one capacitor can comprise a first capacitor on a signal side of circuitry coupled to the heater or temperature sensor and a second capacitor on a reference side of the circuitry coupled to the heater or temperature sensor. The temperature sensor or heater can be configured to operate using alternating current (AC). The liquid lens can comprise driver circuitry that comprises one or more snubbers. The snubbers can be configured to reduce oscillations in rectangle wave drive signals.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a temperature sensor or heater, driver circuitry configured to produce rectangle wave driving signals, and one or more snubbers configured to reduce a rate of voltage change of the driving signals, wherein the driver circuitry is coupled to the electrodes to drive the liquid lens. The one or more snubbers can comprise one or more capacitors.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor or heater coupled to circuitry such that the temperature sensor is configured to use a floating voltage that is not grounded.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a capacitive temperature sensor. The capacitive temperature sensor can comprise a first conductive pathway and a second conductive pathway spaced apart from the first conductive pathway. The liquid lens can comprise an intermediate layer having a truncated cone cavity having a wide end and a narrow end, the intermediate layer comprising glass; a glass first outer layer bonded to the intermediate layer at the wide end of the truncated cone cavity; and a glass second outer layer bonded to the intermediate layer at the narrow end of the truncated cone cavity; wherein the conductive pathways are between the intermediate layer and the first glass outer layer or between the intermediate layer and the second glass outer layer. A fluid can be contained in a chamber between the first and second conductive pathways. The fluid can be the same as the first fluid of the liquid lens. The liquid lens can comprise circuitry for determining a capacitance between the first and second conductive pathways.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and an inductive temperature sensor. The inductive temperature sensor can comprise a first winding pathway of conductive material and a second winding pathway of conductive material that is spaced apart from the first winding pathway of conductive material. The first winding pathway of conductive material and the second winding pathway of conductive material can be formed from the same layer. The inductive temperature sensor can comprise a circuitry for measuring eddy currents.

In some embodiments, a liquid lens system comprises a liquid lens comprising a chamber, a first fluid contained in the chamber, a second fluid contained in the chamber, a fluid interface between the first fluid and the second fluid, one or more first electrodes insulated from the first and second fluids, and a second electrode in electrical communication with the first fluid, wherein the liquid lens is configured such that a position of the fluid interface is based at least in part on voltage applied between the first and second electrodes. The liquid lens system can comprise a liquid lens driver, wherein one or more of the first and second electrodes are AC coupled to the driver.

In some embodiments, a liquid lens system comprises a liquid lens comprising a chamber, a first fluid contained in the chamber, a second fluid contained in the chamber, a fluid interface between the first fluid and the second fluid, one or more first electrodes insulated from the first and second fluids, and a second electrode in electrical communication with the first fluid, wherein the liquid lens is configured such that a position of the fluid interface is based at least in part on voltage applied between the first and second electrodes. The liquid lens system can comprise a liquid lens driver, wherein one or more of the first and second electrodes are coupled to one or more capacitors, such that the one or more of the first and second electrodes receive driver signals through the one or more capacitors. One or more capacitors can be coupled between the driver and the one or more of the first and second electrodes. One or more resistors can be positioned in series between the corresponding one or more capacitors and ground. The one or more resistors can be on one or more corresponding branched paths off of the paths between the one or more capacitors and the one or more of the first and second electrodes. One or more high pass filters can be positioned between the one or more of the first and second electrodes and the driver. The one or more capacitors can be incorporated into the liquid lens. The liquid lens can comprise one or more electrical contact pads corresponding to the one or more of the first and second electrodes and one or more dielectric barriers between the one or more electrical contact pads and the corresponding one or more of the first and second electrodes. The liquid lens system can comprise a temperature sensor or heater. The temperature sensor or heater can be direct coupled to ground.

In some embodiments, a liquid lens comprises a chamber, a first fluid contained in the chamber, a second fluid contained in the chamber, a fluid interface between the first fluid and the second fluid, one or more first electrodes insulated from the first and second fluids, and a second electrode in electrical communication with the first fluid, wherein the liquid lens is configured such that a position of the fluid interface is based at least in part on voltage applied between the first and second electrodes. One or more of the first or second electrodes can be coupled to one or more capacitors that are incorporated into the liquid lens, such that the one or more of the first or second electrodes receive driver signals through the one or more capacitors. One or more electrical contact pads can correspond to the one or more of the first or second electrodes. One or more dielectric barriers can be positioned between the one or more electrical contact pads and the corresponding one or more of the first or second electrodes to form the one or more capacitors. One or more resistors can be coupled between the one or more capacitors and ground to produce one or more high pass filters. The liquid lens can comprise a temperature sensor or heater. The temperature sensor or heater can be direct coupled to ground.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a temperature sensor or heater, and a capacitor integrated into the liquid lens between the temperature sensor or heater and ground. An electrical contact pad can be coupled to ground. A dielectric barrier can be disposed between the heater or temperature sensor and the electrical contact pad to thereby implement the capacitor.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a conductive pathway through the liquid lens that can be operated as a heater in a heater mode of operation and can be operated as a temperature sensor in a sensor mode of operation. A switch can have a heater position configured to provide a heater signal to the conductive pathway and a sensor position configured to provide a sensor signal to the conductive pathway.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a temperature sensor, and a heater, wherein the heater and the temperature sensor are coplanar with at least a portion of the first one or more electrodes. The heater, the temperature sensor, and the one or more electrodes can comprise conductive material of the same layer with insulating barriers between the conductive material of the heater, temperature sensor, and the first one or more electrodes. The liquid lens can comprise an intermediate layer having a truncated cone cavity having a wide end and a narrow end, a first outer layer bonded to the intermediate layer at the wide end of the truncated cone cavity, and a second outer layer bonded to the intermediate layer at the narrow end of the truncated cone cavity. The heater, the temperature sensor, and the at least a portion of the first one or more electrodes can be disposed between the intermediate layer and the second outer layer. The temperature sensor can be disposed radially inward of the heater. The temperature sensor can be disposed radially outward of the heater.

In some embodiments, a liquid lens comprises a chamber, an intermediate layer having a truncated cone cavity having a wide end and a narrow end, the truncated cone cavity forming a portion of the chamber, a first outer layer bonded to the intermediate layer at the wide end of the truncated cone cavity, and a second outer layer bonded to the intermediate layer at the narrow end of the truncated cone cavity, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a temperature sensor disposed between the intermediate layer and the second outer layer.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a heater, and a temperature sensor, wherein a first portion of the temperature sensor is disposed laterally inward of the heater, and wherein a second portion of the temperature sensor is disposed laterally outward of the heater. The second portion of the temperature sensor can be wider than the first portion of the temperature sensor. The heater can comprise a continuous area of conductive material with three electrical contact pads.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor, comprising a first portion of conductive material and a second portion of conductive material, wherein the second portion is wider than the first portion. The first portion can be disposed laterally inward of the second portion. The first portion can be disposed closer to the chamber than the second portion. The second portion of the conductive material can be disposed between the first portion of the conductive material and two electrical contact pads. The second portion of the conductive material can comprise a first conductive path that couples a first end of the first portion to a first electrical contact pad. The second portion of the conductive material comprises a second conductive path that couples a second end of the first portion to a second electrical contact pad.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a heater comprising a continuous area of conductive material and three electrical contact pads. A first electrical contact pad can be coupled to a first heater driving signal. A second electrical contact pad can be coupled to ground. A third electrical contact pad can be coupled to a second heater driving signal. A first electrical contact pad can be coupled to ground. A second electrical contact pad can be coupled to a heater driving signal. A third electrical contact pad can be coupled to ground. The second electrical contact pad can be disposed between the first electrical contact pad and the third electrical contact pad. The heater can comprise a first heating element extending from the first electrical contact pad to the second electrical contact pad and a second heating element extending from the third electrical contact pad to the second electrical contact pad.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a capacitive temperature sensor having a first conductive pathway and a second conductive pathway spaced apart from the first conductive pathway. The liquid lens can comprise a truncated cone cavity that forms at least a portion of the chamber, wherein at least a portion of the first conductive pathway and at least a portion of the second conductive pathway are on a sidewall of the truncated cone.

In some embodiments, a liquid lens comprises a chamber that includes a truncated cone cavity, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, and a temperature sensor having at least one conductive pathway on a sidewall of the truncated cone. The temperature sensor can comprise a resistive temperature sensor. The temperature sensor can comprise a capacitive temperature sensor.

In some embodiments, a liquid lens comprises a chamber, a first fluid contained in the chamber, a second fluid contained in the chamber, a fluid interface between the first fluid and the second fluid, one or more first electrodes insulated from the first and second fluids, a second electrode in electrical communication with the first fluid, wherein the liquid lens is configured such that a position of the fluid interface is based at least in part on voltage applied between the first and second electrodes, a temperature sensor, and a voltage divider coupled to the temperature sensor.

It will be apparent to those skilled in the art that various modifications and variations can be made without departing from the spirit or scope of the claimed subject matter. Accordingly, the claimed subject matter is not to be restricted except in light of the attached claims and their equivalents. Other embodiments and combinations are contemplated, which are not specifically set forth in the claims.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, is intended to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A liquid lens comprising:
   a chamber;
   a first fluid contained in the chamber;
   a second fluid contained in the chamber;
   a fluid interface between the first fluid and the second fluid;
   one or more first electrodes insulated from the first and second fluids;
   a second electrode in electrical communication with the first fluid, wherein a position of the fluid interface is based at least in part on voltage applied between the first and second electrodes;
   a temperature sensor;
   a heater; and
   a layer of conductive material that is segmented such that the heater, the temperature sensor, and the portion of the one or more first electrodes are disposed in the layer of conductive material with insulating barriers separating the heater, the temperature sensor, and the one or more first electrodes,
   wherein the temperature sensor is coplanar with at least a portion of one of (a) the one or more first electrodes or (b) the second electrode; and
   wherein the heater is coplanar with at least a portion of one of (a) the one or more first electrodes or (b) the second electrode.

2. The liquid lens of claim 1, wherein:
   the temperature sensor is coplanar with the heater; and
   each of the temperature sensor and the heater is coplanar with at least a portion of the one or more first electrodes.

3. The liquid lens of claim 1, comprising:
   an intermediate layer comprising a tapered cavity having a wide end and a narrow end;
   a first outer layer bonded to the intermediate layer at the wide end of the tapered cavity; and
   a second outer layer bonded to the intermediate layer at the narrow end of the tapered cavity;
   wherein each of the heater, the temperature sensor, and the portion of the one or more first electrodes is disposed between the intermediate layer and the second outer layer.

4. The liquid lens of claim 1, wherein the temperature sensor is insulated from the one or more first electrodes by at least about 0.1 gigaohm.

5. The liquid lens of claim 1, wherein the temperature sensor or heater is insulated from the one or more first electrodes by a distance of at least about 30 microns.

6. The liquid lens of claim 1, wherein at least one of the temperature sensor or the heater is AC coupled to ground.

7. The liquid lens of claim 1, wherein the liquid lens is configured to impede crosstalk between at least one of the temperature sensor or the heater and the one or more first electrodes.

8. The liquid lens of claim 1, wherein:
at least one of the temperature sensor or the heater is coupled to electrical circuitry comprising at least one capacitor between the respective temperature sensor or heater and ground; and
the at least one capacitor is configured to pass signals of the respective temperature sensor or heater to ground while impeding a crosstalk signal from the one or more first electrodes.

9. The liquid lens of claim 8, wherein the at least one capacitor is integrated into the liquid lens.

10. The liquid lens of claim 8, wherein the at least one capacitor comprises a first capacitor on a signal side of circuitry coupled to the respective temperature sensor or heater and a second capacitor on a reference side of the circuitry coupled to the respective temperature sensor or heater.

11. The liquid lens of claim 1, wherein:
the liquid lens comprises driver circuitry configured to produce rectangle wave driving signals; and
the liquid lens comprises one or more snubbers.

12. The liquid lens of claim 1, wherein:
at least one of the temperature sensor or the heater is coupled to electrical circuitry; and
the respective temperature sensor or heater is configured to use a floating voltage that is not grounded.

13. The liquid lens of claim 1, wherein the temperature sensor is a capacitive temperature sensor.

14. The liquid lens of claim 13, wherein:
the capacitive temperature sensor comprises a first conductive pathway and a second conductive pathway spaced apart from the first conductive pathway; and
a fluid contained in a chamber between the first conductive pathway and the second conductive pathway;
wherein the fluid of the capacitive temperature sensor is the same as the first fluid of the liquid lens.

15. The liquid lens of claim 1, wherein the temperature sensor is an inductive temperature sensor.

16. The liquid lens of claim 1, wherein the temperature sensor is a resistive temperature sensor.

17. The liquid lens of claim 1, wherein:
the heater comprises a continuous area of conductive material and three electrical contact pads;
a first electrical contact pad is coupled to a first heater driving signal;
a second electrical contact pad is coupled to ground;
a third electrical contact pad is coupled to a second heater driving signal;
the second electrical contact pad is positioned between the first electrical contact pad and the third electrical contact pad;
a first heating element of the heater extends from the first electrical contact pad to the second electrical contact pad; and
a second heating element of the heater extends from the third electrical contact pad to the second electrical contact pad.

18. The liquid lens of claim 1, wherein:
the heater comprises a continuous area of conductive material and three electrical contact pads;
a first electrical contact pad is coupled to ground;
a second electrical contact pad is coupled to a heater driving signal;
a third electrical contact pad is coupled to ground;
the second electrical contact pad is positioned between the first electrical contact pad and the third electrical contact pad;
a first heating element of the heater extends from the first electrical contact pad to the second electrical contact pad; and
a second heating element of the heater extends from the third electrical contact pad to the second electrical contact pad.

19. A liquid lens comprising:
a chamber;
a first fluid contained in the chamber;
a second fluid contained in the chamber;
a fluid interface between the first fluid and the second fluid;
one or more first electrodes insulated from the first and second fluids;
a second electrode in electrical communication with the first fluid, wherein a position of the fluid interface is based at least in part on voltage applied between the first and second electrodes;
an intermediate layer comprising a tapered cavity having a wide end and a narrow end;
a first outer layer bonded to the intermediate layer at the wide end of the tapered cavity;
a second outer layer bonded to the intermediate layer at the narrow end of the tapered cavity, wherein each of the heater, the temperature sensor, and the portion of the one or more first electrodes is disposed between the intermediate layer and the second outer layer;
a temperature sensor; and
a heater;
wherein the temperature sensor is coplanar with at least a portion of one of (a) the one or more first electrodes or (b) the second electrode; and
wherein the heater is coplanar with at least a portion of one of (a) the one or more first electrodes or (b) the second electrode.

20. A liquid lens comprising:
a chamber;
a first fluid contained in the chamber;
a second fluid contained in the chamber;
a fluid interface between the first fluid and the second fluid;
one or more first electrodes insulated from the first and second fluids;
a second electrode in electrical communication with the first fluid, wherein a position of the fluid interface is based at least in part on voltage applied between the first and second electrodes;
a temperature sensor; and
a heater;
wherein the temperature sensor is coplanar with at least a portion of one of (a) the one or more first electrodes or (b) the second electrode, wherein the heater is coplanar with at least a portion of one of (a) the one or more first electrodes or (b) the second electrode, and wherein the liquid lens is configured to impede crosstalk between at least one of the temperature sensor or the heater and the one or more first electrodes.

* * * * *